US010674551B2

United States Patent
Kuge et al.

(10) Patent No.: US 10,674,551 B2
(45) Date of Patent: Jun. 2, 2020

(54) UE, SERVER DEVICE, AND COMMUNICATION CONTROL METHOD, FOR PERFORMING PROSE SERVICE

(71) Applicant: SHARP KABUSHIKI KAISHA, Sakai, Osaka (JP)

(72) Inventors: Yoko Kuge, Osaka (JP); Masafumi Aramoto, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 46 days.

(21) Appl. No.: 15/310,747

(22) PCT Filed: May 12, 2015

(86) PCT No.: PCT/JP2015/063656
§ 371 (c)(1),
(2) Date: Nov. 11, 2016

(87) PCT Pub. No.: WO2015/174418
PCT Pub. Date: Nov. 19, 2015

(65) Prior Publication Data
US 2017/0079086 A1 Mar. 16, 2017

(30) Foreign Application Priority Data
May 12, 2014 (JP) ................................ 2014-098221

(51) Int. Cl.
*H04W 76/14* (2018.01)
*H04W 76/38* (2018.01)
(Continued)

(52) U.S. Cl.
CPC ........... *H04W 76/14* (2018.02); *H04W 8/005* (2013.01); *H04W 24/08* (2013.01); *H04W 76/11* (2018.02);
(Continued)

(58) Field of Classification Search
CPC ..... H04W 76/11; H04W 76/14; H04W 76/38; H04W 24/08; H04W 8/00; H04W 8/005; H04W 92/18; H04W 84/12
See application file for complete search history.

(56) References Cited

U.S. PATENT DOCUMENTS

2015/0230076 A1* 8/2015 Hedman ............... H04W 8/005
370/254
2015/0264663 A1* 9/2015 Chen ..................... H04W 48/06
455/450

FOREIGN PATENT DOCUMENTS

WO 2014034571 A1 3/2014

OTHER PUBLICATIONS

"3GPP TS 23.303 V12.0.0 (Feb. 2014) Technical Report: $3^{rd}$ Generation Partnership Project; Technical Specification Group Services and System Aspects; Proximity-based Services (ProSe) Stage 2 (Release 12)," 2014, pp. 1-53, 3GPP Organizational Partners, Valbonne, France.
(Continued)

*Primary Examiner* — Joshua Kading
(74) *Attorney, Agent, or Firm* — Kilpatrick Townsend & Stockton

(57) ABSTRACT

There is provided a communication system that performs a service based on ProSe under management of a communication operator. A process based on a procedure such as an announcement request, a monitoring request, or match reporting for discovering a proximity terminal is performed based on authentication of a server device operated by the communication operator. The communication operator includes means for requesting that the process based on the procedure such as the announcement request, the monitoring request, or the match reporting is stopped based on a policy of the communication operator.

16 Claims, 12 Drawing Sheets

(51) Int. Cl.
  *H04W 76/11*  (2018.01)
  *H04W 8/00*  (2009.01)
  *H04W 24/08*  (2009.01)
  *H04W 84/12*  (2009.01)
  *H04W 12/00*  (2009.01)

(52) U.S. Cl.
  CPC ...... *H04W 76/38* (2018.02); *H04W 12/00502* (2019.01); *H04W 12/00512* (2019.01); *H04W 84/12* (2013.01)

(56) References Cited

OTHER PUBLICATIONS

"Cell ID announcement in ProSe UE-to-Network relays," SA WG2 Meeting #104, Dublin, Ireland, Jul. 7-11, 2014, pp. 1-2, S2-142374, Alcatel-lucent.

"3GPP TS 23.401 V12.4.0 (Mar. 2014) Technical Specification: $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)," 2014, pp. 1-306, 3GPP Organizational Partners, Valbonne, France.

International Patent Application No. PCT/JP2015/063656, International Search Report dated Aug. 11, 2015, 5 pages.

"3GPP TS 24.334 V0.1.0 (Apr. 2014) Technical Specification: $3^{rd}$ Generation Partnership Project; Technical Specification Group Core Network and Terminals; Proximity-services (ProSe) User Equipment (UE) to Proximity-services (ProSe) Function Protocol aspects; Stage 3 (Released 12)," 2014, pp. 1-25, 3GPP Organizational Partners, Valbonne, France.

\* cited by examiner

FIG. 3
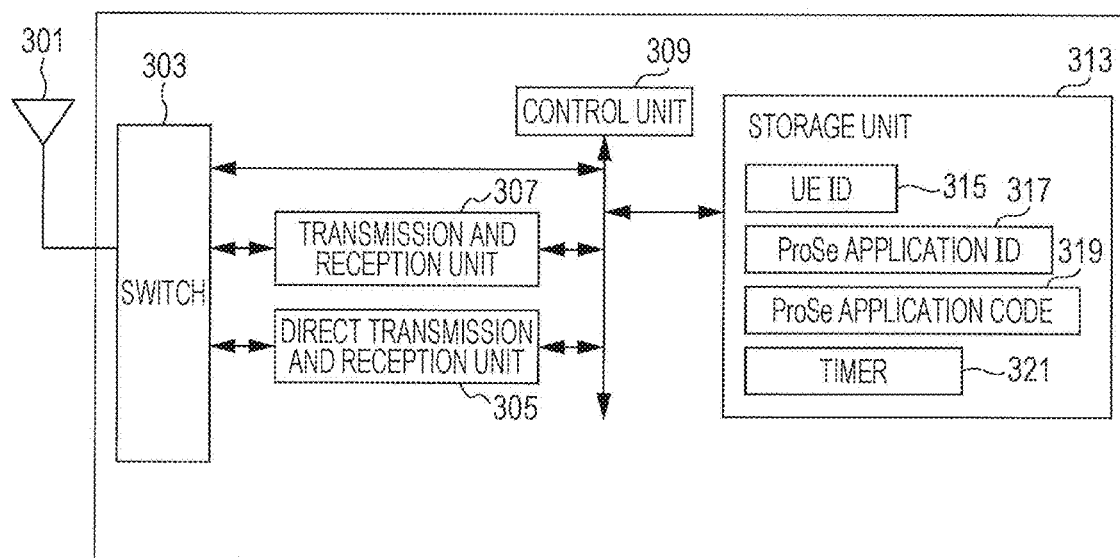
FIG.4A
FIG.4B
| ProSe APPLICATION ID | ProSe APPLICATION CODE | TIMER (ANNOUNCEMENT) | TIMER (MONITORING) |
|---|---|---|---|
| ProSe App ID A | C1 | Ta1 | Tm1 |
| ProSe App ID A | C2 | Ta2 | Tm2 |

| UE ID | UE ID A |
|---|---|
| UE ID | UE ID B |
| UE ID | UE ID C |

| ProSe APPLICATION ID | ProSe APPLICATION CODE | TIMER (ANNOUNCEMENT) | TIMER (MONITORING) |
|---|---|---|---|
| ProSe App ID A | C1 | Ta1 | Tm1 |
| ProSe App ID A | C2 | Ta2 | Tm2 |

FIG.8A

| UE ID | UE ID A |
|---|---|
| UE ID | UE ID B |
| UE ID | UE ID C |

FIG.8B

| ProSe APPLICATION ID | ProSe APPLICATION CODE |
|---|---|
| ProSe App ID A | C1 |
| ProSe App ID A | C2 |

FIG.8C

| UE ID | PERMISSION INFORMATION | | |
|---|---|---|---|
| | ANNOUNCEMENT | MONITORING | MATCH REPORTING |
| UE ID A | PERMISSION | PROHIBITION | PROHIBITION |
| UE ID B | PERMISSION | PERMISSION | PERMISSION |
| UE ID C | PROHIBITION | PERMISSION | PERMISSION |

UE, SERVER DEVICE, AND COMMUNICATION CONTROL METHOD, FOR PERFORMING PROSE SERVICE

CROSS REFERENCE TO RELATED APPLICATIONS

This application is the U.S. national phase of International Application No. PCT/JP2015/063656 filed on May 12, 2015, and published in Japanese on Nov. 19, 2015, as International Publication No. WO 2015/174418 A1, which application claims priority to Japanese Patent Application No. 2014-098221 filed on May 12, 2014, the contents of all of which are incorporated herein by reference.

TECHNICAL FIELD

The present invention relates to a terminal device, a server device, and a communication control method.

BACKGROUND ART

In the 3rd Generation Partnership Project (3GPP) that standardizes recent mobile communication systems, the specification of an Evolved Packet System (EPS) described in NPL 1, which realizes an all-IP network, has progressed. In the 3GPP, an access system connected to the EPS has also been examined in the case of a wireless LAN in addition to LTE.

The 3GPP has examined a proximity-based service (ProSe) described in NPL 2 in the specifications of the EPS. ProSe seek the realization of a service that provides a function (discovery) of detecting a proximity communication terminal between user equipment (UEs) which are communication terminals or a function (direct communication) of establishing direct communication without using a core network or a base station between the UEs.

In ProSe, since communication is performed without using the core network to which the base station or the access network is connected, it is possible to avoid the concentration in the access network or the core network (congestion avoidance), and it is possible to expect an offloading effect.

In ProSe, a service that searches for and detects communication target UE of the direct communication is required to establish a direct communication path. In ProSe, two methods have been examined as the detection method. The first method is a method (hereinafter, referred to as direct discovery) in which the UE directly detects the communication target UE. The second method is a method (hereinafter, referred to as EPS discodirect discovery) in which the UE detects the communication target UE via the access network or the core network. The second method is a method (hereinafter, referred to as EPS discovery) in which the UE detects the communication target UE via the access network or the core network. However, a ProSe service is provided by a mobile communication operator, and needs to be approved by the mobile communication operator for commercial use.

In ProSe, the use of two methods as the direct communication path between the UEs has been examined. The first method is a method of using an LTE access technology. The second method is a method of using a wireless LAN (WLAN) access technology.

In ProSe, non-public safety and public safety are defined. In the non-public safety, a commercial service provided by the mobile communication operator is assumed, and can be used only in a case where the UE is served by an LTE base station. Meanwhile, in the public safety, the use of a wireless disaster-prevention system is assumed, and can be used both in a case where the UE is served by the LTE base station and a case where the UE is not served by the LTE base station (eNB).

CITATION LIST

Non Patent Literature

NPL 1: 3GPP TS23.401 Technical Specification Group Services and System Aspects, General Packet Radio Service (GPRS) enhancements for Evolved Universal Terrestrial Radio Access Study for Proximity Services (ProSe)

NPL 2: 3GPP TR23.303 Technical Specification Group Services and System Aspects, Proximity-based Services (ProSe), Stage2 (Release 12)

SUMMARY OF INVENTION

Technical Problem

In ProSe, means for realizing a function (discovery) of detecting UE positioned in proximity or a function (direct communication) of establishing direct communication without using the core network or the base station between the UEs has been examined.

In order to realize the function (discovery) of detecting the UE positioned in proximity, an announcement function of allowing the UE to notify the proximity terminal of the presence of this UE, a monitoring function of receiving the notification based on the announcement function to detect the proximity terminal, and a match reporting function of receiving the notification based on the announcement function to check the content of the received notification have been examined.

The UE performs the announcement function or the monitoring function for a period of time based on a timer by using a ProSe application code notified from a management server of a ProSe function.

A plurality of ProSe application codes may be associated with one application. Thus, the UE needs to assume that the plurality of ProSe application codes and timers associated with the same application are notified from the server device.

Thus, in a case where a plurality of different ProSe application codes and timers for the same ProSe application are notified from the server device, the UE needs to determine a timing when the user of the old ProSe application code is stopped and a timing when the use of a new ProSe application code is started.

However, specific means of a method of determining these timings is not currently apparent.

The present invention has been made in view of such circumstances, and it is an object of the invention to provide desirable means for determining a start or stop timing of a service based on ProSe such as an announcement function of allowing UE to notify a proximity terminal of the presence of this UE, a monitoring function of allowing the UE to receive the notification based on the announcement function to detect the proximity terminal, or a match reporting function of allowing the UE to receive the notification based on the announcement function to check the content of the received notification under the management of a communication operator in order to realize the function (discovery) of detecting the UE positioned in proximity.

Solution to Problem

There is provided a terminal device according to the present embodiment. A first code and a second code are codes used by the terminal device to perform announcement. The terminal device includes: a reception unit that receives a value of a first timer which is associated with the first code for an application ID and indicates for how long the first code is valid and the first code; and a control unit that stops counting a second timer which is associated with the second code for the same application ID and indicates for how long the second code is valid based on the reception of the value of the first timer, and starts to count the first timer based on the reception of the first code.

There is provided a terminal device according to the present embodiment. A first code and a second code are codes for monitoring, and a first discovery filter includes at least a first code associated with an application ID, and a value of a first timer indicating for how long the first discovery filter is valid. The terminal device includes: a reception unit that receives at least the first discovery filter; and a control unit that stops counting a second timer for the second code associated with the same application ID based on the reception of the value of the first timer, and starts to count the first timer based on the reception of the first code and the value of the first timer.

There is provided a server device according to the present embodiment. A first code and a second code are codes used by a terminal device to perform announcement. The server device includes: an interface unit that receives a request message including at least an application ID, identification information of the terminal device, and a command indicating announcement from the terminal device before counting of a first timer indicating for how long the first code for the same application ID is valid is ended, and transmits at least the second code associated with the same application ID and a value of a second timer indicating for how long the second code is valid to the terminal device.

There is provided a server device according to the present embodiment. A first code and a second code are codes for monitoring, and a second discovery filter includes at least the second code associated with an application ID and a value of a second timer indicating for how long the second discovery filter is valid. The server device includes: an interface unit that receives a request message including at least the same application ID, identification information of the terminal device, and a command indicating monitoring from the terminal device before counting of a first timer indicating for how long the first discovery filter corresponding to the same application ID is valid is ended, and transmits a control message including at least the second discovery filter to the terminal device. The control message is control information for causing the terminal device to start to count the second timer based on the reception of the second code and the value of the second timer.

There is provided a communication control method of a terminal device according to the present embodiment. A first code and a second code are codes used by the terminal device to perform announcement. The communication control method includes: a step of receiving a first code and a value of a first timer which is associated with the first code for an application ID and indicates for how long the first code is valid; a step of starting to count the first timer based on the reception of the first code; and a step of stopping counting a second timer which is associated with the second code for the same application ID and indicates for how long the second code is valid based on the reception of the value of the first timer.

There is provided a communication control method of a terminal device according to the present embodiment. A first code and a second code are codes for monitoring. The communication control method includes: a step of receiving at least a first discovery filter, the first discovery filter including at least the first code associated with an application ID and a value of a first timer indicating for how long the first discovery filter is valid; a step of starting to count the first timer based on the reception of the first code and the value of the first timer; and a step of stopping counting a second timer for the second code associated with the same application ID based on the reception of the value of the first timer.

There is provided a communication control method of a server device according to the present embodiment. A first code and a second code are codes used by a terminal device to perform announcement. The communication control method includes: a step of receiving a request message including at least an application ID, identification information of the terminal device, and a command indicating announcement from the terminal device before counting of a first timer indicating for how long the first code for the same application ID is valid is ended; and a step of transmitting at least the second code associated with the same application ID and a value of a second timer indicating for how long the second code is valid to the terminal device.

There is provided a communication control method of a server device according to the present embodiment. A first code and a second code are codes for monitoring. The communication control method includes: a step of receiving a request message including at least an application ID, identification information of a terminal device, and a command indicating monitoring from the terminal device before counting of a first timer indicating for how long a first discovery filter corresponding to the same application ID is valid is ended; and a step of transmitting a control message including at least a second discovery filter corresponding to the same application ID to the terminal device. The second discovery filter includes at least the second code associated with the same application ID and a value of a second timer indicating for how long the second discovery filter is valid, and the control message is control information for causing the terminal device to start to count the second timer based on the reception of the second code and the value of the second timer.

Advantageous Effects of Invention

According to the present invention, it is possible to update an expiration date when a service based on ProSe can be performed under the management of a communication operator.

BRIEF DESCRIPTION OF DRAWINGS

FIG. 3 is a diagram for describing a functional structure of UE.

FIG. 4A is a diagram showing an example of a UE ID stored in a storage unit.

FIG. 4B is a diagram showing an example of an association table stored in the storage unit.

FIG. 8A is a diagram showing an example of a UE list stored in a storage unit.

FIG. 8B is a diagram showing an example of an association table stored in a storage unit.

FIG. 8C is a diagram showing an example of permission information stored for each UE in a storage unit.

DESCRIPTION OF EMBODIMENTS

Hereinafter, preferred embodiments for implementing the present invention will be described with reference to the drawings. As an example in the present embodiment, an embodiment of a mobile communication system in a case where the present invention is applied will be described.

1. First Embodiment

Hereinafter, a wireless communication technology according to an embodiment of the present invention will be described in detail with reference to the drawings.

[1.1 Outline of Communication System]

Figure 1:
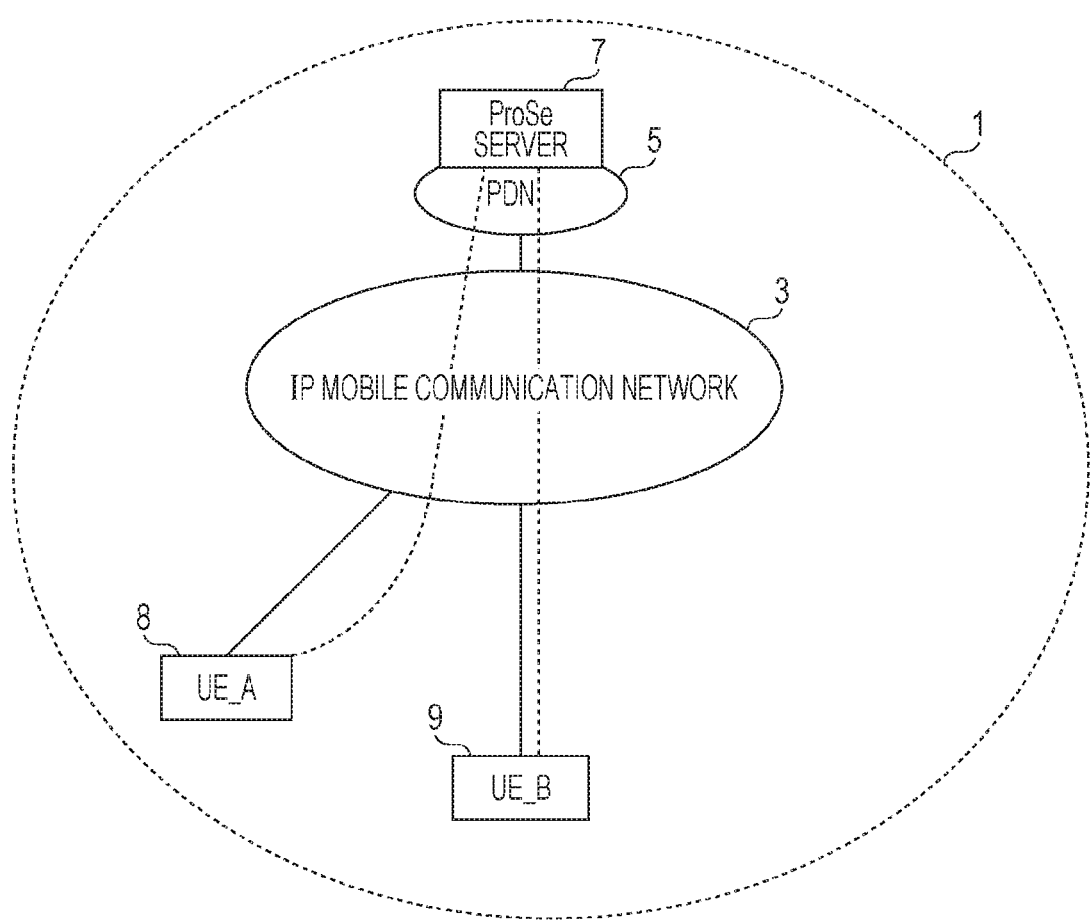
FIG. 1 is a schematic diagram for describing a mobile communication system.

FIG. 1 is a functional block diagram showing a schematic structure example of a communication system 1 according to the embodiment of the present invention.

The communication system 1 shown in FIG. 1 includes UE_A 8 which is a communication terminal (ProSe enabled UE) having a function of ProSe, a packet data network (PDN) 5, an IP mobile communication network 3, and a ProSe server 7.

A plurality of communication terminals, such as UE_B 9, having a function of ProSe may be included.

The PDN 5 and the UE such as the UE_A 8 or the UE_B 9 are connected to each other via the IP mobile communication network 3. Services are provided to the UE_A 8 and the UE_B 9 based on ProSe.

The ProSe server 7 is a server device that manages communication of the UE_A 8 or the UE_B 9, and performs authentication when ProSe services are provided. The ProSe server 7 is included in the PDN 5 as shown in FIG. 1, but may be independent of the PDN 5. The UE_A 8 and the UE_B 9 may be connected to the same mobile communication operator network, may be connected to different mobile communication operator networks, or may be a broadband network operated by a fixed communication operator.

For example, the UE_A 8 may be connected to the IP mobile communication network 3 operated and managed by a first communication operator (mobile operator), and the UEA 9 may be connected an IP mobile communication network different from the IP mobile communication network 3 operated and managed by a second communication operator. The IP mobile communication network operated by the second communication operator in this case may be connected to the PDN 5. The internal structure thereof is the same as that of the IP mobile communication network 3, and the detailed description thereof will be omitted.

These IP mobile communication networks may be two IP mobile communication networks in which a roaming agreement is signed, or may be two IP mobile communication networks within the same nation.

The ProSe server 7 that manages the communication of the UE_A 8 or the UE_B 9 may be a ProSe server that manages a communication operator that the UE_A 8 or the UE_B 9 contracts with, may be a server which has a contract relationship with a communication operator to be contracted and is managed by the communication operator, or may be a server managed by the communication operator within the same nation.

The broadband network is an IP communication network which is operated by a communication operator that is connected through asymmetric digital subscriber line (ADSL) to provide high-speed communication through a digital line such as an optical fiber. The broadband network is not limited to the above-described example, and may be a network that is wirelessly accessed through worldwide interoperability for microwave access (WiMAX).

Each UE such as the UE_A 8 or the UE_B 9 is a communication terminal that is connected using an access system such as LTE or WLAN, and may be accessed to the IP mobile communication network 3 through connection by including 3GPP LTE communication interface or WLAN communication interface.

However, the PDN is not limited to the above-described example, and may be connected using a different radio system such as worldwide interoperability for microwave access (WiMAX).

The PDN 5 is a network that provides network services for performing transmission and reception of data in packets, and is, for example, a network such as the Internet or IMS that provides a specific communication service.

The PDN 5 is connected to the IP mobile communication network 3 by using a wired line. For example, the PDN is established using the ADSL or the optical fiber. However, the PDN is not limited to the above-described example, and may be a radio access network such as LTE, WLAN or worldwide interoperability for microwave access (WiMAX).

Figure 2A:
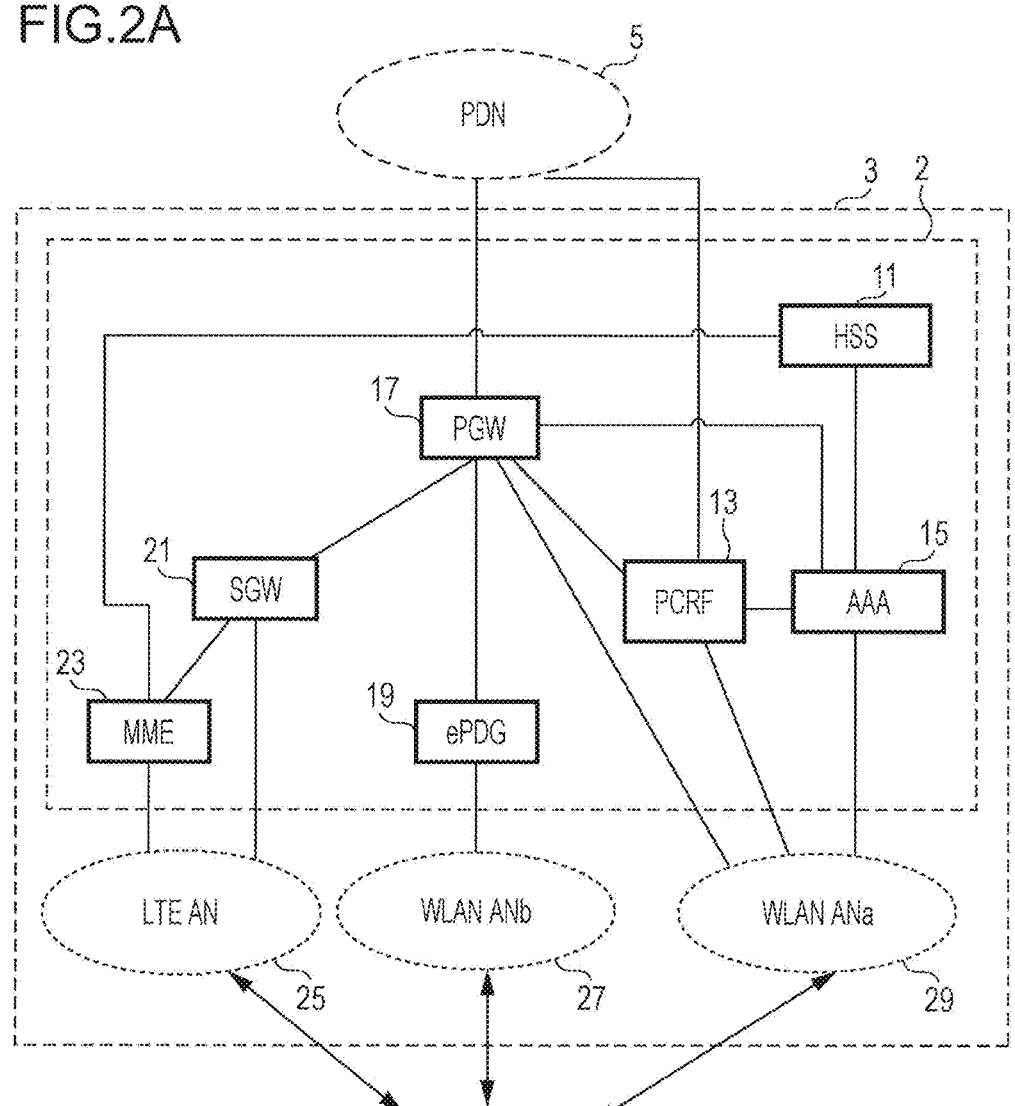
FIG. 2A is a diagram for describing a structure of an IP mobile communication network.

FIG. 2A is a detailed structure example of the communication system 1 shown in FIG. 1. The structure example of the system shown in FIG. 2A includes the UE_A 8, the IP mobile communication network 3, and the PDN 5. A plurality of UEs in addition to the UE_A 8 may be connected to the IP mobile communication network 3. Here, although FIG. 2A shows the example in which the UE_A 8 is connected, the UE_B 9 may have the same structure as that of the UE_A 8.

The IP mobile communication network 3 includes a core network 2, and radio access networks (LTE AN 25, WLAN ANb 27, and WLAN ANa 29). The core network 2 includes a home subscriber server (HSS) 11, Authentication, Authorization and Accounting (AAA) 15, a policy and charging rules function (PCRF) 13, a packet data network gateway (PGW) 17, an enhanced packet data gateway (ePDG) 19, a serving gateway (SGW) 21, and a mobile management entity (MME) 23.

The ProSe server 7 described using FIG. 1 may be included in the PDN 5 as shown in FIG. 1, may be included in the IP mobile communication network 3 independently from the PDN 5, or may be included in the core network 2.

The radio access network may include a plurality of different access networks. The access networks are connected to the core network 2. The UE_A 8 may be wirelessly connected to the radio access network.

The radio access network may include the LTE access network (LTE AN 25) capable of being connected by an LTE access system, and the access networks (WLAN ANb 27 and WLAN ANa 29) capable of being connected by a WLAN access system.

The access network capable of being connected by the WLAN access system may include the WLAN access network b (WLAN ANb 27) that is connected using the ePDG 19 as a connection apparatus to the core network 2, and the WLAN access network a (WLAN ANa 29) that is connected to the PGW 17, the PCRF 13 and the AAA 15.

Since the apparatuses have the same structure as that of the apparatus of the related art in the mobile communication system using EPS, the detailed description will be omitted. Hereinafter, the respective apparatuses may be simply described.

The PGW 17 is connected to the PDN 5, the SGW 21, the ePDG 19, the WLAN ANa 29, the PCRF 13, and the AAA 15, and serves as a gateway apparatus between the PDN 5 and the core network 2 to deliver user data.

The SGW 21 is connected to the PGW 17, the MME 23, and the LTE AN 25, and serves as a gateway apparatus between the core network 2 and the LTE AN 25 to deliver user data.

The MME 23 is connected to the SGW 21, the LTE AN 25, and the HSS 11, and is an access control apparatus that performs access control of the UE_A 8 via the LTE AN 25.

The HSS 11 is connected to the MME 23 and the AAA 15, and is a management node that manages subscriber information. For example, the subscriber information of the HSS 11 is referred to when access control of the MME 23 is performed.

The AAA 15 is connected to the PGW 17, the HSS 11, the PCRF 13, and the WLAN ANa 29, and performs the access control of the UE_A 8 that is connected via the WLAN ANa 29.

The PCRF 13 is connected to the PGW 17, the WLAN ANa 29, the AAA 15 and the PDN 5, and performs quality of service (QoS) management for data delivery. For example, the PCRF performs the QoS management of a communication path between the UE_A 8 and the PDN 5.

The ePDG 19 is connected to the PGW 17 and the WLAN ANb 27, and serves as a gateway apparatus between the core network 2 and the WLAN ANb 27 to deliver user data.

Figure 2B:
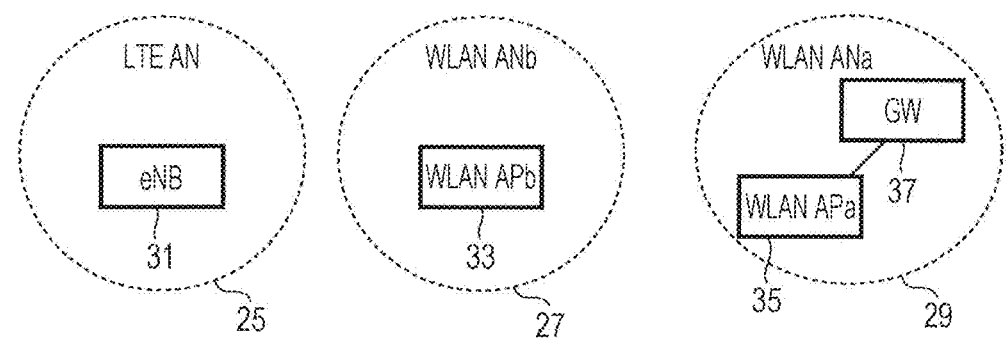
FIG. 2B is another diagram for describing a structure of an IP mobile communication network.

As shown in FIG. 2B, an apparatus (for example, a base station apparatus or an access point apparatus) to which the UE_A 8 is actually connected is included in each radio access network. As the apparatus used in the connection, an apparatus adapted to the radio access network is considered.

In the present embodiment, the LTE AN 25 includes an eNB 31. The eNB 31 is a radio base station to which the UE_A 8 is connected by the LTE access system, and the LTE AN 25 may include one or a plurality of radio base stations.

The WLAN ANa 29 includes a WLAN APa 35, and a gateway (GW) 37. The WLAN APa 35 is a radio base station to which the UE_A 8 is connected in the WLAN access system having reliability against an operator that operates the core network 2, and the WLAN ANa 29 may include one or a plurality of radio base stations. The GW 37 is a gateway apparatus between the core network 2 and the WLAN ANa 29. The WLAN APa 35 and the GW 37 may be realized as a single apparatus.

Even though an operator that operates the core network 2 and an operator that operates the WLAN ANa 29 are different, such a structure may be realized by a contract or an agreement between the operators.

The WLAN ANb 27 includes a WLAN APb 33. In a case where there is no trusting relationship with the operator that operates the core network 2, the WLAN APb 33 is a radio base station to which the UE_A 8 is connected in the WLAN access system, and the WLAN ANb 27 may include one or a plurality of radio base stations.

As stated above, the WLAN ANb 27 is connected to the core network 2 by using the ePDG 19 which is an apparatus included in the core network 2, as a gateway. The ePDG 19 has a security function for ensuring safety.

In the present specification, a case where the UE_A 8 is connected to each radio access network is a case where this UE is connected to a base station apparatus or an access point included in each radio access network, and data or a signal is also transmitted or received via the base station apparatus or the access point.

[1.2 Structures of Devices]

The device structures of the UE_A 8, the UE_B 9 and the ProSe server 7 of FIG. 1 will be simply described with reference to the drawings.

[1.2.1 Structure of UE]

The UE_A 8 and the UE_B 9 may have the same structure. The UE_A 8 and the UE_B 9 may be wireless communication terminals having the ProSe function, may be mobile phone terminals that transmit and receive data through wireless communication by an LTE access method, or may be communication terminals that mutually exchange information in the form of the so-called machine to machine.

FIG. 3 shows a functional structure of the UE_A 8 according to the present embodiment. Since the functional structure of the UE_B 9 may be the same as that of the UE_A 8, the description thereof will be omitted. The UE_A 8 includes a transmit and receive antenna 301, a switch 303, a direct transmission and reception unit 305, a transmission and reception unit 307, a control unit 309, and a storage unit 313. In the UE_A 8, the direct transmission and reception unit 305, the transmission and reception unit 307, the switch 303 and the storage unit 313 are connected to the control unit 309 via a bus.

The control unit 309 is a functional unit for controlling the UE_A 8. The control unit 309 is a functional unit which reads various programs stored in the storage unit 313 and executes the read program.

The switch 303 is a functional unit that connects the transmission and reception unit 307 and the direct transmission and reception unit 305 to the transmit and receive antenna 301 according to the control of the control unit 309.

The transmission and reception unit 307 is a functional unit that transmits and receives wireless communication data by the LTE access method. The transmission and reception unit 307 includes a transmission unit and a reception unit. The transmission unit may transmit control information via an LTE base station, and the reception unit may transmit data or control information via the LTE base station.

The direct transmission and reception unit 305 is a functional unit capable of directly communicating with another UE using data or control information without using the LTE base station. The direct transmission and reception unit 305 includes a direct transmission unit and a direct reception unit. The direct transmission unit may transmit data or control information without using the LTE base station, and the direct reception unit may receive data or control information without using the LTE base station. The transmission and reception unit 307 and the direct transmission and reception unit 305 may be realized as one transmission and reception unit.

The storage unit 313 is a functional unit that stores data or program required in each operation of the UE_A 8. For example, the storage unit 313 is a semiconductor memory or a hard disk drive (HDD).

The storage unit 313 may store a UE ID 315, a ProSe application ID 317, a ProSe application code 319, and a timer 321. The UE_A 8 may store a UE context including these information items.

The UE ID 315 may be identification information for identifying the UE_A 8, and may be identification information such as IMSI or MSISDN. Alternatively, the UE ID may be a ProSe UE ID which is acquired from the ProSe server 7 through a service authentication procedure to be described below and is associated with the UE_A 8. The ProSe UE ID may be information which is assigned to the UE_A 8 by the core network in the attach procedure of the UE_A 8 to be described below and identifies the UE_A 8. As a specific structure, the ProSe UE ID may be a link layer address of a transmission source when the UE_A 8 transmits the data using the direct communication path. The ProSe application ID 317 may be identification information used in ProSe direct discovery that detects a proximity terminal, or may be information for identifying an application executed by a communication terminal that detects the proximity terminal through ProSe. The ProSe application ID may be a specific name of the application. The storage unit 313 may store a plurality of ProSe application IDs.

The ProSe application code 319 may be a code associated with the ProSe application ID. The ProSe application code may be a code which is transmitted while being included in an announcement signal for allowing the proximity terminal to discover the UE or is used to monitor an announcement signal transmitted by the proximity terminal. The storage unit 313 may store a plurality of ProSe application codes. The more detailed description of the ProSe application code will be described below, and thus, the description will be omitted now.

The timer may be used to indicate that the ProSe application code can be legitimately used, and may legitimately use the ProSe application code until the timer is expired. In a case where the timer is expired, the ProSe application code may be controlled so as not to be used. When the timer is expired, the ProSe application code may be removed from the storage unit 313.

Here, the UE_A 8 may store the ProSe application ID and the ProSe application code so as to associate this ID with this code. The UE_A 8 may store a plurality of ProSe application codes for one ProSe application ID.

The ProSe application code and the timer may be stored in association with each other. The UE_A 8 may retain a timer for announcement and a timer for monitoring in a case where announcement for allowing the proximity terminal to discover the UE_A 8 and monitoring for detecting the proximity terminal are performed. As mentioned above, a plurality of timers may be stored for one ProSe application code.

In a case where the proximity terminal is detected, the UE_A 8 may store the UE ID of the proximity terminal. A plurality of proximity terminals may be detected, or a plurality of UE IDs may be stored.

When the monitoring for detecting the proximity terminal is performed, in a case where a discovery filter for monitoring is received from the ProSe server 7, the discovery filter may be stored.

The discovery filter may be managed in association with the ProSe application ID 317, the ProSe application code 319 or the timer.

When the monitoring for detecting the proximity terminal is performed, in a case where a discovery filter ID for identifying the discovery filter is received from the ProSe server 7 in addition to the discovery filter for performing monitoring, the discovery filter ID may be stored.

The discovery filter ID and the discovery filter may be stored in association with each other.

FIG. 4A shows an example of the UE ID stored in the storage unit 313. As shown in FIG. 4A, the UE_A 8 may store the UE ID.

FIG. 4B shows an example of an association table of the ProSe application ID 317, the ProSe application code 319 and the timer 321 which are stored in the storage unit 313. As shown in FIG. 4B, the UE_A 8 may store the plurality of application codes for the same ProSe application ID. The UE may store different timers such as a timer for announcement and a timer for monitoring for one application code. The timer for announcement and the timer for monitoring may be the same timer. In this case, the UE may one timer for the ProSe application code.

[1.2.2 Structure of ProSe Server]

Figures 5, 6A, 6B:
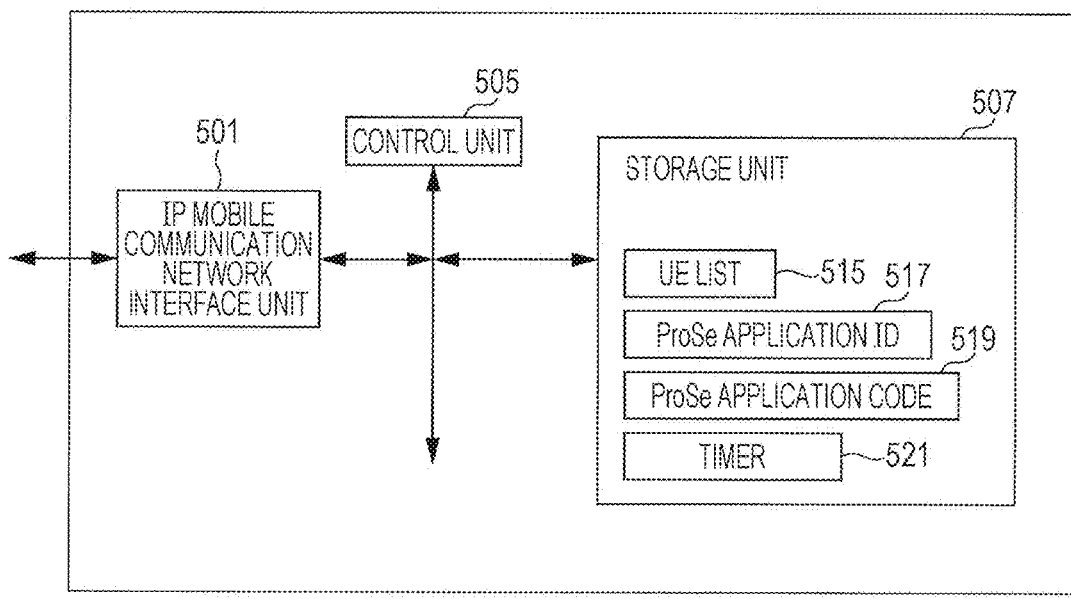
FIG. 5 is a diagram for describing a functional structure of a ProSe server.
FIG. 6A is a diagram showing an example of a UE list stored in a storage unit.
FIG. 6B is a diagram showing an example of an association table stored in the storage unit.

FIG. 5 shows a functional structure of the ProSe server 7 according to the present embodiment. The ProSe server 7 is an authentication server which performs proximity detection through ProSe and communication through ProSe and is managed by the mobile communication operator. The ProSe server 7 includes an IP mobile communication network interface unit 501, a control unit 505, and a storage unit 507. The IP mobile communication network interface unit 501 and the storage unit 507 are connected via the control unit 505 through a bus.

The control unit 505 is a functional unit for controlling the ProSe server 7. The control unit 505 is a functional unit which reads various programs stored in the storage unit 507 and executes the read program.

The IP mobile communication network interface unit 501 is a functional unit for allowing the ProSe server 7 to be connected to the IP mobile communication network 3.

The storage unit 507 is a functional unit for storing data or program required in each operation of the ProSe server 7. For example, the storage unit 407 includes a semiconductor memory or a hard disk drive (HDD).

The storage unit 507 may store a UE list 515, a ProSe application ID 517, a ProSe application code 519, and a timer 521. The ProSe server 7 may store the UE context including these information items.

The UE list 515 may be identification information for identifying the UE that is permitted for the ProSe service, and may be identification information such as IMSI or MSISDN. Alternatively, the UE ID may be a ProSe UE ID which is acquired from the ProSe server 7 through a service authentication procedure to be described below and is associated with the UE_A 8. The ProSe UE ID may be information which is assigned to the UE_A 8 by the core network in the attach procedure of the UE_A 8 to be described below and identifies the UE_A 8. As a specific structure, the ProSe UE ID may be a link layer address of a transmission source when the UE_A 8 transmits the data using the direct communication path.

The ProSe application ID 517 may be identification information used in the ProSe direct discovery that detects the proximity terminal, or may be identification information for identifying an application executed by a communication terminal that detects the proximity terminal through ProSe. The ProSe application ID may be a specific name of the application. The storage unit 507 may store a plurality of ProSe application IDs.

The ProSe application code 519 may be a code associated with the ProSe application ID. The ProSe application code may be a code which is transmitted while being included in an announcement signal for allowing the proximity terminal to discover the UE or is used to monitor an announcement signal transmitted by the proximity terminal. The storage unit 507 may store a plurality of ProSe application codes. The more detailed description of the ProSe application code will be described below, and thus, the description will be omitted now.

The timer 521 may be used to indicate that the ProSe application code 519 can be legitimately used, and may legitimately use the ProSe application code until the timer is expired. In a case where the timer is expired, the ProSe application code may be controlled so as not to be used. When the timer is expired, the ProSe application code may be removed from the storage unit 507.

Here, the ProSe server 7 may store the ProSe application ID 517 and the ProSe application code 519 so as to associate this ID with this code. The ProSe server 7 may store a plurality of ProSe application codes for one ProSe application ID.

The ProSe application code 519 and the timer 521 may be stored in association with each other. Alternatively, each UE context may be retained for each UE that is stored in the UE list 515. Permission information indicating that announcement for allowing the proximity terminal to discover the UE is permitted and permission information indicating that monitoring for detecting the proximity terminal is permitted may be associated with each UE. The timer 521 may be managed in association with the ProSe application. The timer for announcement and the timer for monitoring may be retained. As mentioned above, a plurality of timers may be stored for one ProSe application code 519.

As mentioned above, the HSS may store the ProSe application ID 517, and may store the UE that authenticates ProSe service registration with the ProSe application ID 517. Here, the terminal that is stored in association with the ProSe application ID 517 may be plural in number. Permission information indicating that announcement for allowing the proximity terminal to discover the UE is permitted and permission information indicating that monitoring for detecting the proximity terminal is permitted may be associated with each UE.

When the monitoring for detecting the proximity terminal is permitted, a discovery filter for monitoring may be stored.

The discovery filter may be managed in association with the ProSe application ID 517, the ProSe application code 519 or the timer.

A discovery filter ID for identifying the discovery filter may be stored in addition to the discovery filter.

The discovery filter ID and the discovery filter may be stored in association with each other.

FIG. 6A shows an example of the UE list 515 stored in the storage unit 507. As shown in FIG. 6A, the ProSe server 7 may store identification information for identifying the UE that is permitted for the ProSe service.

FIG. 6B shows an example of an association table in which the ProSe application ID 517, the ProSe application code 519 and the timer 521 which are stored for each UE in the storage unit 507 are associated with each other. As shown in FIG. 6B, the ProSe server 7 may store the plurality of application codes for the same ProSe application ID for each UE stored in FIG. 6A. The UE may store different timers such as a timer for announcement and a timer for monitoring for one application code. The timer for announcement and the timer for monitoring may be the same timer. In this case, the UE may one timer for the ProSe application code.

[1.2.3 Structure of HSS]

Figure 7:
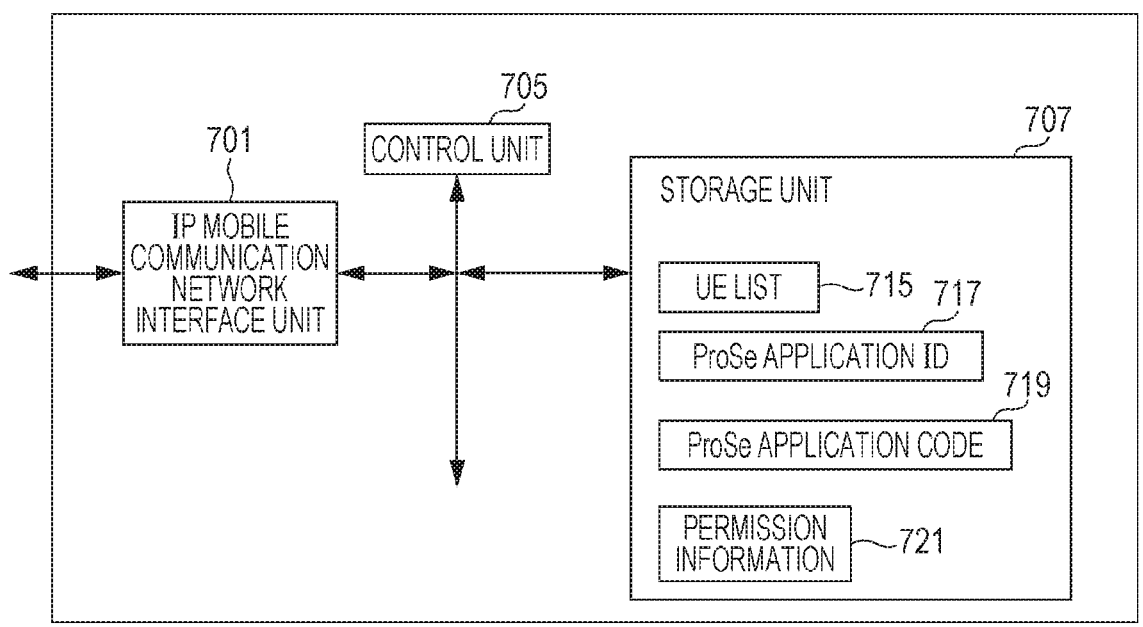
FIG. 7 is a diagram for describing a functional structure of HSS.

FIG. 7 shows a functional structure of the HSS 11 according to the present embodiment. The HSS is a server device that manages subscriber information. The HSS manages permission information for providing services such as communication services including ProSe.

The HSS 11 includes an IP mobile communication network interface unit 701, a control unit 705, and a storage unit 707. The IP mobile communication network interface unit 701 and the storage unit 707 are connected via the control unit 705 through a bus.

The control unit 705 is a functional unit for controlling the HSS 11. The control unit 705 is a functional unit which reads various programs stored in the storage unit 707 and executes the read program.

The IP mobile communication network interface unit 701 is a functional unit for allowing the HSS 11 to be connected to the IP mobile communication network 3.

The storage unit 707 is a functional unit that stores data or program required in various operations of the HSS 11. For example, the storage unit 707 includes a semiconductor memory or a hard disk drive (HDD).

The storage unit 707 may store a UE list 715, a ProSe application ID 717, a ProSe application code 719 and permission information 721. These information items may be managed as subscriber information for each UE.

The UE list 715 may be identification information for identifying the UE that is permitted for ProSe service, and may be identification information such as IMSI or MSISDN. Alternatively, the UE ID may be a ProSe UE ID which is acquired from the ProSe server 7 through a service authentication procedure to be described below and is associated with the UE_A 8. The ProSe UE ID may be information which is assigned to the UE_A 8 by the core network in the attach procedure of the UE_A 8 to be described below and identifies the UE_A 8. As a specific structure, the ProSe UE ID may be a link layer address of a transmission source when the UE_A 8 transmits the data using the direct communication path.

The ProSe application ID 717 may be identification information used in the ProSe direct discovery that detects the proximity terminal, or may be identification information for identifying an application executed by a communication terminal that detects the proximity terminal through ProSe. The ProSe application ID may be a specific name of the application. The storage unit 707 may store a plurality of ProSe application IDs.

The ProSe application code 719 may be a code associated with the ProSe application ID. The ProSe application code may be a code which is transmitted while being included in an announcement signal for allowing the proximity terminal to discover the UE or is used to monitor an announcement signal transmitted by the proximity terminal. The storage unit 707 may store a plurality of ProSe application codes. The more detailed description of the ProSe application code will be described below, and thus, the description will be omitted now.

The permission information may be permission information indicating whether or not to permit the ProSe service to be provided. The permission information may be permission information indicating whether or not to permit each function such as an announcement function, a monitoring function or a match reporting function among the ProSe services to be provided. The permission information may be managed for each UE.

The permission information may be determined and updated by an operator in an arbitrary timing through the contract of a user.

The HSS 11 may store the ProSe application ID and the ProSe application code so as to associate this ID with this code. The HSS 11 may store a plurality of ProSe application codes for one ProSe application ID.

As mentioned above, the HSS may store the ProSe application ID, and may store the UE that authenticates ProSe service registration with the ProSe application ID. Here, the terminal that is stored in association with the ProSe application ID may be plural in number. Permission information indicating that announcement for allowing the proximity terminal to discover the UE is permitted and permission information indicating that monitoring for detecting the proximity terminal is permitted may be associated with each UE.

When the monitoring for detecting the proximity terminal is permitted, a discovery filter for monitoring may be stored.

The discovery filter may be managed in association with the ProSe application ID 717, the ProSe application code 719 or the timer.

A discovery filter ID for identifying the discovery filter may be stored in addition to the discovery filter.

The discovery filter ID and the discovery filter may be stored in association with each other.

FIG. 8A shows an example of the UE list 715 stored in the storage unit 707. As shown in FIG. 8A, the HSS 11 may store identification information for identifying the UE for which the ProSe service is permitted, and may be identification information such as IMSI or MSISDN.

FIG. 8B shows an example of an association table in which the ProSe application ID 717 and the ProSe application code 719 which are stored in the storage unit 707 are associated with each other. As shown in FIG. 8B, the HSS 11 may store the ProSe application ID 717 and the ProSe application code 719 so as to associate this ID with this code. The HSS may store the UE that authenticates ProSe service registration with the ProSe application ID.

FIG. 8C shows an example of the permission information 721 stored for each UE in the storage unit 707. As shown in FIG. 8C, the HSS 11 may store the permission information for each UE or each function such as "announcement", "monitoring" or "match reporting." In the example of FIG. 8C, UE having ID A is permitted for the announcement, and is not prohibited from the monitoring and the match reporting.

[1.3 Description of Process]

Hereinafter, the outline of the process described in the present embodiment will be described.

[1.3.1 Service Authentication Procedure]

The UE_A 8 performs an authentication procedure of proximity terminal detection (ProSe Direct Discovery) provided as the ProSe service or communication (ProSe Direct Communication) using a direct communication path. The authentication procedure may be performed by authenticating the proximity terminal detection and the communication using the direct communication path through different procedures, or may be performed by authenticating the proximity terminal detection and the communication using the direct communication path through one authentication procedure.

Figure 9:
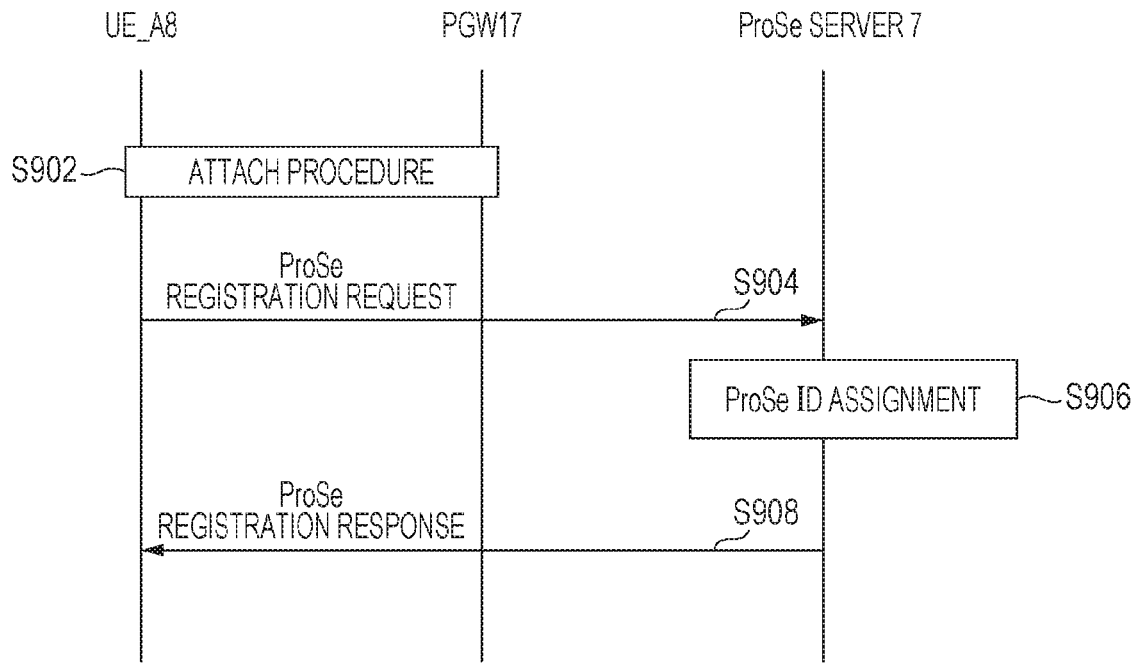
FIG. 9 is a diagram for describing a service authentication procedure.

Hereinafter, the authentication procedure according to the present embodiment will be described with reference to FIG. 9. An example in which the UE_A 8 performs an authentication request will be described below, but the UE_B 9 may perform the authentication procedure by the same method as that of the UE_A 8.

Initially, the UE_A 8 performs an attach procedure, and accesses the core network (S902). As a result, the UE_A 8 establishes PDN connection with the PGW 17. The PDN connection is a communication path for transmitting and receiving data between the PDN 5 and this UE. The attach procedure may be performed as an initial procedure when the UE_A 8 is powered on.

More specifically, the UE_A 8 transmits an attach request to the MME 23, and thus, the attach procedure is started. The attach request including the identification information of the UE such as APN or IMSIG may be transmitted. The APN may not be necessarily included in an attach request message, and may be notified to the MME 23 from the UE_A 8 by using a control message within the attach procedure.

The MME 23 selects the PGW 17 based on the received APN, and determines an endpoint of the PDN connection for the UE_A 8. The MME establishes the PDN connection or permits the connection to the core network, and transmits an attach permission message as a response to the attach request message to the UE_A 8. The attach permission message may be directly transmitted to the UE_A 8 from the MME 23, or may be transmitted via the eNB 31 included in the LTE AN 25.

The MME 23 may notify that the UE_A 8 is permitted to be connected to the core network by transmitting the attach permission message. The MME 23 may notify that the PDN connection is established by transmitting the attach permission message. The attach permission message including an APN or an IP address associated with the PDN connection may be transmitted.

The MME 23 may transmit the attach permission message including the ProSe UE ID. For example, the MME 23 may transmit the attach permission message including the ProSe UE ID based on the fact that the APN transmitted from the UE_A 8 in the attach procedure is an APN associated with the ProSe service. In this case, the MME 23 may perform the ProSe UE ID assignment to the UE_A 8. The MME may acquire the ProSe UE ID from HSS 11 In this case, the HSS 11 may previously store the ProSe UE ID for the subscriber information.

Subsequently, the UE_A 8 transmits a ProSe registration request message to the ProSe server 7 (S904). The UE_A 8 may request permission for the communication using the direct communication path and the proximity terminal detection by transmitting the ProSe registration request message. This message including information items for respectively identifying the permission for the communication using the direct communication path and the proximity terminal detection may be transmitted, and the permission for the communication using the direct communication path and the permission for the proximity terminal detection may be respectively requested.

The transmission of the ProSe registration request may be performed using the PDN connection established through the attach procedure. The UE may transmit the ProSe registration request message by using the IP address acquired through the attach procedure as a transmission source address.

The ProSe server 7 as a transmission destination of the ProSe registration request message may be used as the transmission destination by previously retaining information of the ProSe server 7 associated with a home PLMN which is a contracted communication operator.

Alternatively, the ProSe server may be used as the transmission destination by retaining a list of communication operators capable of providing the ProSe service as a local PLMN and retaining the ProSe server 7 associated with the local PLMN.

The local PLMN may be any communication operator determined by the contractual relationship with the home PLMN, or may be a communication operator that is operated in the same nation as that of the home PLMN.

As described above, the UE_A 8 may retain a PLMN ID for identifying the PLMN and the ProSe server 7 so as to associate this ID with this server, and may request the authentication using this server as the transmission destination.

The PLMN ID and the information of the ProSe server 7 may be acquired from the home PLMN. The PLMN ID and the information of the ProSe server may be inquired of the ProSe server 7 of the home PLMN, may be acquired from a response to the inquiry, and may be retained.

The ProSe server 7 may receive the ProSe registration request, may perform the authentication of the communication using the direct communication path and the detection of the proximity terminal, and may transmit the ProSe registration response (S908).

The ProSe registration response including the authentication result may be transmitted. The ProSe server 7 may retain information which is associated with the UE_A 8 and is used for authentication, and may determine whether or not to permit the authentication result based on this information.

The ProSe server 7 may perform assignment of the ProSe UE ID based on the reception of the ProSe registration request (S904). The ProSe server may transmit a ProSe registration response including the ProSe UE ID to the UE_A 8. The ProSe UE ID may be an ID associated with the UE_A 8, and the UE_A 8 may use the ProSe ID as information for identifying the terminal in a case where the detection of the proximity terminal or the presence of this UE is notified to the proximity terminal. More specifically, the UE_A 8 may transmit the announcement signal including the ProSe UE ID.

The UE_A 8 may receive the ProSe registration response, and may acquire the authentication result. This UE may acquire the ProSe UE ID included in the ProSe registration response, and may retain the acquired ID.

Although the service registration procedure of the UE_A 8 has been described, the UE_B 9 may perform the service registration through the same procedure.

[1.3.2 Announcement Request Procedure]

Hereinafter, a procedure in which the terminal requests announcement will be described. The announcement means that a terminal notifies another terminal positioned in proximity of the presence of the terminal.

Figure 10:
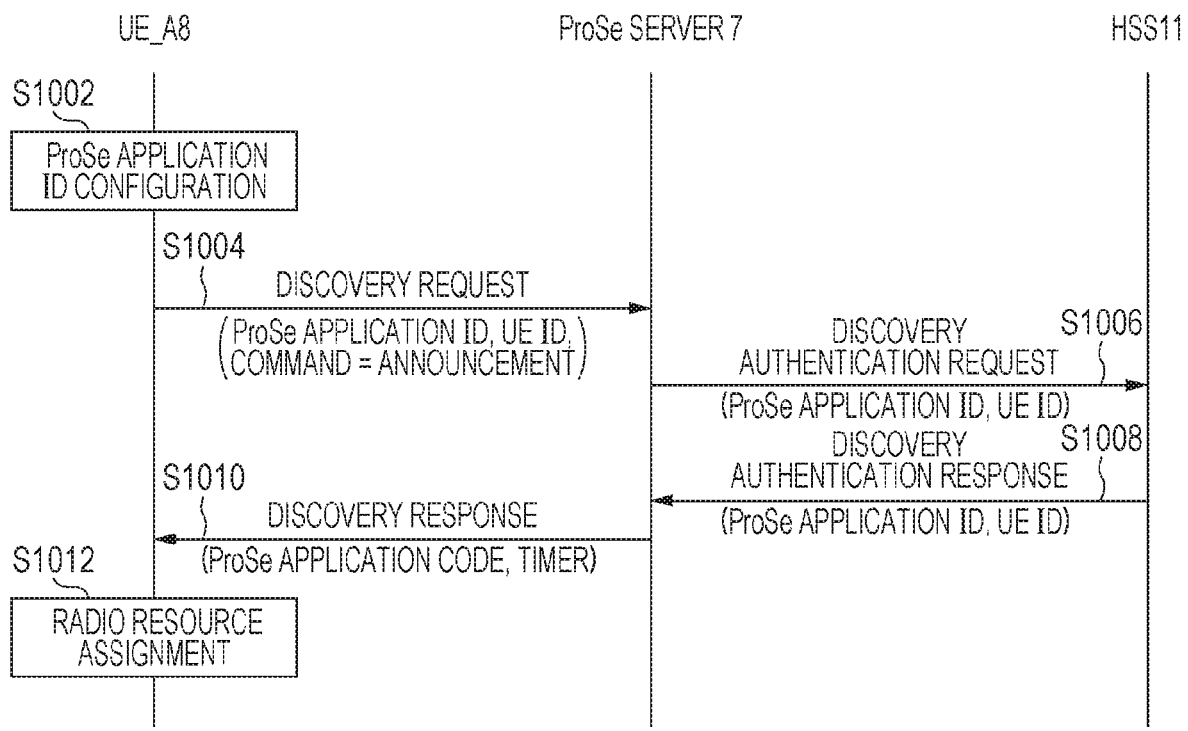
FIG. 10 is a diagram for describing an announcement request procedure.

Hereinafter, a procedure in which the UE_A 8 performs the announcement will be described with reference to FIG. 10. The UE_A 8 may perform the announcement based on the fact that the authentication is permitted through the service authentication procedure.

An example in which the UE_A 8 performs the announcement procedure will be described below, but the UE_B 9 may perform the announcement procedure through the same procedure as that in the UE_A 8.

The UE_A 8 may retain the ProSe application ID corresponding to the home PLMN, as an initial state in which the announcement is performed (S1002). As a specific acquisition method, the UE_A 8 may request the ProSe application ID by transmitting the ProSe registration request to the ProSe server 7 in the service registration procedure. The ProSe server 7 may transmit the response including the ProSe application ID. As stated above, the UE_A 8 may acquire the ProSe application ID included in the ProSe registration response.

The UE_A 8 transmits a discovery request to the ProSe server 7 (S1004). Here, the transmission of the discovery request by means of the UE_A 8 may be performed under a condition in which the service authentication procedure is completed. More specifically, the ProSe server 7 of the home PLMN which is the contracted communication operator uses the fact that the announcement of the UE_A 8 is authenticated as a condition. The UE_A 8 may acquire authentication information from the ProSe server 7 in response to the authentication completion, and may use the fact that the authentication information is retained as a condition.

The discovery request including a command indicating that the ProSe application ID, the UE ID or the announcement is requested may be transmitted.

The ProSe application ID may be an ID indicating an application for which the UE_A 8 requests the announcement. The UE ID may be identification information such as IMSI or MSISDN. The UE ID may be the ProSe UE ID.

The information indicating the announcement is requested is not limited to the identification method using the command, and may be requested by defining an announcement request message and transmitting the announcement request message. More specifically, a message type that requests the announcement may be defined, and a request message including the message type may be transmitted.

The ProSe server 7 as the transmission destination of the discovery request may previously retain the information regarding the ProSe server 7 of the home PLMN which is the contracted communication operator of the UE_A 8, and may use the ProSe server 7 of the home PLMN as the transmission destination.

The discovery request may include identification information indicating a request related to the updating of the timer through this request. Specifically, in a case where the ProSe application code and the timer are already assigned to the ProSe application ID included in the discovery request and the counting of the timer is started, the discovery request may request that this counting is ended and the timer is newly assigned or may request that a new timer is assigned after the counting is ended by using the identification information.

Subsequently, the ProSe server 7 receives the discovery request from the UE_A 8. In a case where the UE context associated with the UE_A 8 is not retained, the ProSe server 7 may request authentication for the announcement to the HSS 11 or authentication for the generation of the UE context (S1006). The request for such authentications may be performed by transmitting a discovery authentication request to the HSS 11. The discovery authentication request including the ProSe application ID or the UE ID may be transmitted.

The ProSe application ID may be an ID indicating an application for which the UE_A 8 requests the announcement. The UE ID may be identification information such as IMSI or MSISDN. Alternatively, the UE ID may be the ProSe UE ID.

Thereafter, the HSS 11 receives the discovery authentication request. The HSS 11 may retain subscriber information associated with the UE_A 8, and may manage the subscriber information so as to associate information indicating that the discovery is permitted, information indicating that the announcement is permitted, or information indicating that the monitoring is permitted with the UE_A 8.

As these permission information items, different permission information items may be managed for applications. That is, the permission information may be managed in association with the ProSe application ID.

The HSS 11 performs the authentication based on the received ProSe application ID or UE ID and the subscriber information. The ProSe server 7 may transmit the discovery authentication response to the ProSe server 7, as a response to the discovery authentication (S1008). Here, the discovery authentication response including the authentication result may be transmitted.

More specifically, the information included in the discovery authentication request and the subscriber information may be inquired, and a discovery authentication response including information indicating the announcement is permitted may be transmitted in a case where the UE_A 8 is permitted to perform the announcement, and a discovery authentication response including information indicating that the announcement is not permitted may be transmitted in a case where this UE is not permitted to perform the announcement.

Here, in a case where the information indicating that the announcement is permitted is retained in the subscriber information, the HSS 11 may permit the announcement. In a case where the information indicating that the discovery in ProSe is permitted is retained in the subscriber information, the announcement may be permitted.

Subsequently, the ProSe server 7 receives the discovery authentication response transmitted from the HSS 11. The ProSe server 7 may generate the UE context based on the discovery authentication response. The UE context including the ProSe application ID, the UE ID and the information indicating the announcement is permitted which are acquired by the discovery request transmitted from the UE_A 8 or the discovery authentication response transmitted from the HSS 11 may be stored. Such a UE context may be managed in association with the UE_A 8.

The timer may be managed in association with the ProSe application code. The timer may indicate for how long the announcement is permitted. The timer may indicate that the ProSe application code is legitimate. That is, since the ProSe application code needs to be operated to be safely used, a value of the code is not permanently used and is updated by the timer, so that it is possible to ensure safety. An initial value of the timer may be determined depending on a configuration performed by the communication operator.

The ProSe server 7 may retain the ProSe application code corresponding to the ProSe application ID, and may store this ProSe application code in the UE context.

The ProSe application code is a code transmitted while being included in a signal transmitted to allow the communication terminal to discover the proximity terminal, and is associated with the ProSe application ID.

Accordingly, the communication terminal may announce that the corresponding application can be used by transmitting the ProSe application code to the proximity terminal.

The ProSe server 7 may retain the ProSe application code in association with the ProSe application ID. In a case where the ProSe application code is not retained, the ProSe application code may be generated in association with the ProSe application ID.

The ProSe server 7 may transmit the discovery response to the UE_A 8, as a response to the discovery request (S1010).

The discovery response including information regarding the UE context may be transmitted. More specifically, the discovery response including the ProSe application ID, the UE ID, the ProSe application code, and the value of the timer may be transmitted.

In a case where the identification information related to the updating of the timer is included in the discovery request, the ProSe application code or the timer may be assigned according to the request.

Here, the ProSe server 7 may start to count the timer when the discovery response is transmitted.

In a case where the ProSe application code or the timer is already assigned to the ProSe application ID included in the discovery request and the counting of the timer is started, the ProSe server 7 may determine whether or not to update the timer by the remaining timer value. More specifically, a new timer may be assigned in a case where the remaining timer value is equal to or less than a threshold value based on the counting of the timer in the ProSe server 7, and the remaining timer may be used as the timer notified to the UE_A 8 in a case where the remaining timer value is equal to or greater than the threshold.

Thereafter, the UE_A 8 receives the discovery response. The authentication result, the ProSe application code and the value of the timer may be acquired.

The UE_A 8 determines whether or not the announcement is permitted based on the information included in the discovery response.

In a case where the announcement is permitted, a radio resource is assigned (S1012), and the signal including the acquired ProSe application code may be transmitted to the proximity terminal. Radio resource information such as frequency or time may be acquired from the ProSe server 7, and a resource for announcement may be previously retained and assigned.

The UE_A 8 may start to count the timer based on the reception of the discovery response. The UE_A 8 may transmit a signal for announcement until the timer is expired. In a case where the timer is expired, for example, the value of the timer becomes zero, the announcement is stopped. The signal for announcement including the ProSe application may be transmitted. The signal for announcement including the UE ID may be transmitted.

In a case where a non-authentication state is notified in the discovery response, the UE_A 8 does not perform the assignment of the radio resource or the announcement.

Through the above-described procedure, the UE_A 8 may perform the authentication procedure for performing the announcement. The UE_A 8 may acquire the ProSe application code corresponding to the ProSe application ID that performs the announcement.

The UE_A 8 may request that a plurality of applications is announced. In this case, this UE may retain a plurality of ProSe application IDs, and may perform an announcement request procedure on each ProSe application ID.

The UE_A 8 may perform the announcement for the plurality of ProSe application codes.

The UE_A 8 may perform the announcement based on the reception of the discovery response in a case where the authentication is performed. As specific announcement means, the UE_A 8 may transmit the announcement signal by using the assigned radio resource. In a state in which the authentication is performed, this UE may transmit the announcement signal in an arbitrary timing by a user operation or a configuration of the communication terminal. The transmission of the announcement signal may be performed by radially transmitting the signals with the UE_A 8 as a center.

The UE_A 8 may determine the strength of a transmission signal based on a range class, and may transmit the signal. The UE_A 8 may acquire the range class from the ProSe server 7, may retain the acquired range class, may read the range class at the time of transmitting the announcement signal, and may determine the transmission strength. As mentioned above, the UE may determine a reaching distance of the announcement signal.

The UE may retain different range classes for applications as the range class, may determine the transmission strength of the announcement signal for each application based on the range class, and may transmit the announcement signal. The UE_A 8 may transmit the announcement signal by using a direct radio signal based on LTE, that is, an E-UTRA technology.

[1.3.3 Monitoring Request Procedure]

Hereinafter, a procedure in which the terminal requests the monitoring will be described. The monitoring is a procedure for detecting the presence of the proximity terminal. More specifically, in order to receive the announcement signal sent from the proximity terminal to receive, the monitoring is a procedure for monitoring the announcement signal.

Figure 11:
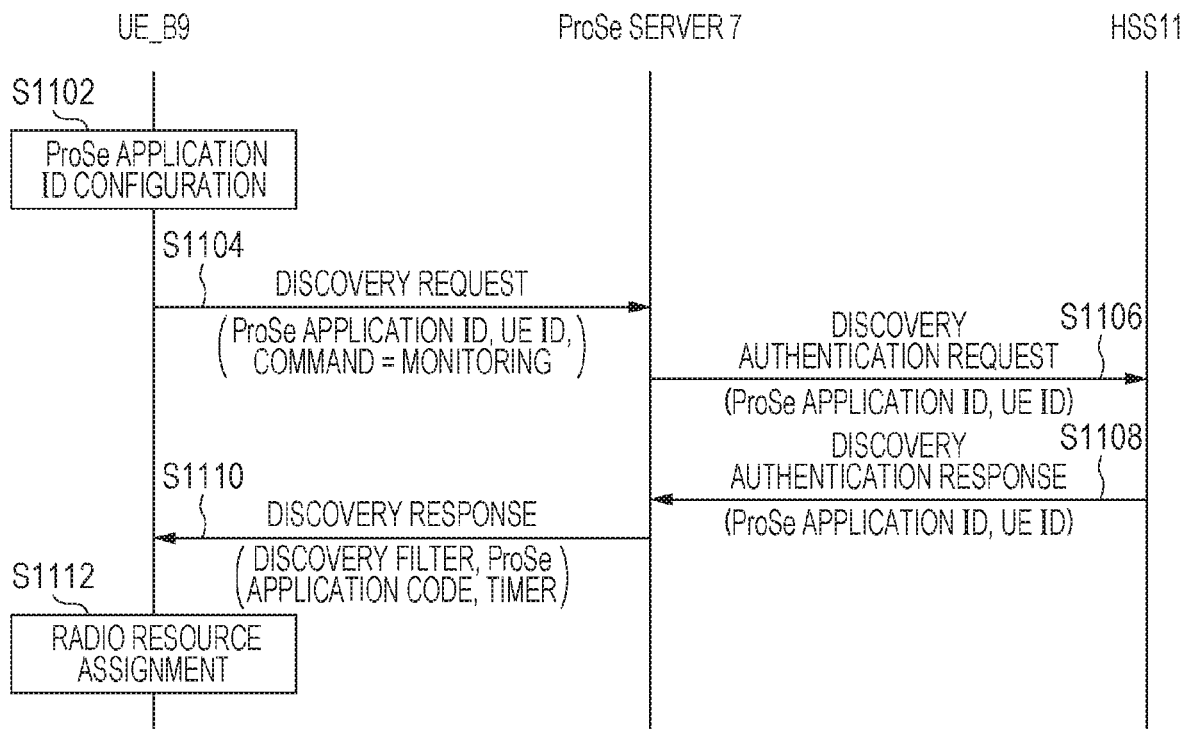
FIG. 11 is a diagram for describing a monitoring request procedure.

Hereinafter, a procedure in which the UE_B 9 performs the monitoring will be described with reference to FIG. 11. The UE_B 9 may perform the monitoring based on the fact that the authentication is permitted through the service authentication procedure.

Hereinafter, an example in which the UE_B 9 performs the monitoring procedure will be described below, but the UE_A 8 may perform the monitoring procedure through the same procedure as that of the UE_B 9.

The UE_B 9 may retain the ProSe application ID corresponding to the home PLMN, as an initial state in which the monitoring is performed (S1102). As a specific acquisition method, the UE_B 9 may request the ProSe application ID by transmitting the ProSe registration request to the ProSe server 7 in the service registration procedure. The ProSe server 7 may transmit the response including the ProSe application ID. As stated above, the UE_B 9 may acquire the ProSe application ID included in the ProSe registration response.

The UE_B 9 transmits the discovery request to the ProSe server 7 (S1104).

Here, the transmission of the discovery request by means of the UE_B 9 may be performed under a condition in which the service authentication procedure is completed. More specifically, in the ProSe server 7 of the home PLMN which is the contracted communication operator, a condition in which the monitoring of the UE_B 9 is authenticated may be used. The UE_B 9 may acquire the authentication information from the ProSe server 7 in response to the authentication completion, and may use a condition in which the authentication information is retained.

The discovery request including the ProSe application ID, the UE ID or the command indicating that the monitoring is requested may be transmitted.

The ProSe application ID may be an ID indicating an application for which the UE_B 9 requests the monitoring. The UE ID may be identification information such as IMSI or MSISDN. Alternatively, the UE ID may be a ProSe application code which is acquired from the ProSe server 7 through the service authentication procedure and is associated with the UE_A 8.

The information indicating that the monitoring is requested is not limited to the identification method using the command, and may be requested by defining a monitoring request message and transmitting the monitoring request message. More specifically, a message type that requests the monitoring may be defined, and a request message including the message type may be transmitted.

The ProSe server 7 as the transmission destination of the discovery request may previously retain the information regarding the ProSe server 7 of the home PLMN which is the contracted communication operator of the UE_B 9, and may use the ProSe server 7 of the home PLMN as the transmission destination.

The discovery request may include identification information indicating a request related to the updating of the timer through this request. Specifically, in a case where the ProSe application code and the timer are already assigned to the ProSe application ID included in the discovery request and the counting of the timer is started, the discovery request may request that this counting is ended and the timer is newly assigned or may request that a new timer is assigned after the counting is ended by using the identification information.

Subsequently, the ProSe server 7 receives the discovery request from the UE_B 9. In a case where the UE context associated with the UE_B 9 is not retained, the ProSe server 7 may request the authentication for the announcement to the HSS 11 or the authentication for the generation of the UE context (S1106). The request for such authentications may be performed by transmitting a discovery authentication request to the HSS 11. The discovery authentication request including the ProSe application ID or the UE ID may be transmitted.

The ProSe application ID may be an ID indicating an application for which the UE_B 9 requests the monitoring. The UE ID may be identification information such as IMSI or MSISDN. Alternatively, the UE ID may be the ProSe UE ID.

Thereafter, the HSS 11 receives the discovery authentication request. The HSS 11 may retain the subscriber information associated with the UE_B 9, and may manage the subscriber information by associating information indicating that the discovery is permitted, information indicating that the monitoring is permitted, or information indicating that the announcement is permitted with the UE_B 9.

As these permission information items, different permission information items may be managed for applications. That is, the permission information may be managed in association with the ProSe application ID.

The HSS 11 performs the authentication based on the received ProSe application ID or UE ID and the subscriber information. The ProSe server 7 may transmit the discovery authentication response to the ProSe server 7, as a response to the discovery authentication (S1108). Here, the discovery authentication response including the authentication result may be transmitted.

More specifically, the information included in the discovery authentication request and the subscriber information may be inquired, the discovery authentication response including the information indicating that the monitoring is permitted may be transmitted in a case where the UE_B 9 is permitted to perform the monitoring, and the discovery authentication response including the information indicating that the monitoring is not permitted may be transmitted in a case where this UE is not permitted to perform the monitoring.

Here, in a case where the information indicating that the monitoring is permitted is retained in the subscriber information, the HSS 11 may permit the monitoring. In a case where the information indicating that the discovery in the ProSe is permitted is retained in the subscriber information, the monitoring may be permitted.

Subsequently, the ProSe server 7 receives the discovery authentication response transmitted from the HSS 11. The ProSe server 7 may generate the UE context based on the discovery authentication response. The UE context including the ProSe application ID, the UE ID and the information indicating that the monitoring is permitted which are acquired by the discovery request transmitted from the UE_A 8 or the discovery authentication response transmitted from the HSS 11 may be stored. The UE context may be managed in association with the UE_B 9.

The timer may be managed in association with the ProSe application code. The timer may indicate for how long the announcement is permitted. The timer may indicate that the ProSe application code is legitimate. That is, since the ProSe application code needs to be operated to be safely used, a value of the code is not permanently used and is updated by the timer, so that it is possible to ensure safety.

An initial value of the timer may be determined depending on a configuration performed by the communication operator. In a case where another terminal such as the UE_A 8 requests the announcement and the ProSe server 7 assigns the ProSe application code corresponding to the ProSe application ID, the timer associated with the ProSe application code may be counted, and a remaining value at a current point of time may be used as the initial value. In this case, the ProSe server may newly configure an initial value of the timer. The ProSe server 7 may retain the ProSe application code corresponding to the ProSe application ID, and may store this ProSe application code in the UE context.

The ProSe application code is a code transmitted while being included in a signal transmitted to allow the communication terminal to discover the proximity terminal, and is associated with the ProSe application ID.

Accordingly, the communication terminal can use the corresponding application by transmitting the ProSe application code to the proximity terminal, and can monitor the terminal that performs the announcement.

The ProSe server 7 may retain the ProSe application code in association with the ProSe application ID. In a case where the ProSe application code is not retained, the ProSe application code may be generated in association with the ProSe application ID.

The ProSe server 7 may transmit a monitoring request to the ProSe server 7 of the local PLMN. The monitoring request may include the ProSe application ID and the UE ID. By doing this, mask values for masking some of the ProSe application codes become equal in a case where the monitoring function is performed in the local PLMN. The ProSe server 7 of the local PLMN may transmit, as a response to the monitoring request, a monitoring response to the ProSe server 7 of the home PLMN. The monitoring response may include the mask and the ProSe application ID. Accordingly, the monitoring response may mean that the local PLMN authenticates the discovery request. The timers may be synchronized with each other in the local PLMN and the home PLMN.

Subsequently, the ProSe server 7 may transmit the discovery response to the UE_B 9, as a response to the discovery request (S1110).

The discovery response including information regarding the UE context may be transmitted. More specifically, the ProSe server may transmit the discovery response including the discovery filter and the discovery filter ID.

In a case where the identification information related to the updating of the timer is included in the discovery request, the ProSe application code or the timer may be assigned according to the request.

Here, the ProSe server 7 may start to count the timer when the discovery response is transmitted.

In a case where the ProSe application code or the timer is already assigned to the ProSe application ID included in the discovery request and the counting of the timer is started, the ProSe server 7 may determine whether or not to update the timer by the remaining timer value. More specifically, a new timer may be assigned in a case where the remaining timer value is equal to or less than a threshold value based on the counting of the timer in the ProSe server 7, and the remaining timer may be used as the timer notified to the UE_A 8 in a case where the remaining timer value is equal to or greater than the threshold.

The discovery filter may include the ProSe application ID, the ProSe application code or the timer. The discovery filter ID may be identification information for identifying the discovery filter.

Here, in a case where another terminal such as the UE_A 8 requests the announcement and the ProSe server 7 assigns the ProSe application code corresponding to the ProSe application ID, the timer associated with the ProSe application code is counted. The ProSe server 7 may transmit a remaining value at a current point of time, as the value of the timer.

The ProSe server 7 may transmit a mask value for masking a part of the ProSe application code without transmitting the ProSe application code. For example, there are coffee shops or restaurants developed to multiple stores, and the ProSe application code is associated with a specific store, and thus, the mask value is not able to specify the specific store but is able to specify a company that has chain stores, such as a name of the coffee shop, by using the mask.

When a plurality of Prose application IDs is managed as a group and the ProSe application code is generated for each ProSe application ID, the same value may be assigned to an arbitrary high-order bit of the ProSe application code. Such a common high-order bit may be used as the mask value. The mask value is not limited to the high-order bit, and may be some bit arrays constituting the ProSe application code. Accordingly, the UE that performs the monitoring can detect the plurality of Prose application codes managed by the group based on the detection using the mask value. As stated above, it is possible to detect the plurality of Prose applications.

As stated above, the mask may be identification information capable of identifying the plurality of ProSe application IDs.

The ProSe server 7 may manage the ProSe application code or the mask value managed in association with the ProSe application ID and the timer defined as the discovery filter. That is, the ProSe server 7 may transmit the discovery response to the UE_B 9, and may the discovery response including the discovery filter corresponding to the ProSe application ID for which the UE_B 9 requests the monitoring. The ProSe server may transmit the discovery response including the discovery filter ID for identifying the discovery filter.

Subsequently, the UE_B 9 receives the discovery response. The authentication result, the ProSe application code and the value of the timer may be acquired.

The UE_B 9 determines whether or not the monitoring is permitted based on the information included in the discovery response.

In a case where the monitoring is permitted, the radio resource is assigned (S1112), and this UE may monitor whether or not the signal including the acquired ProSe application code may be transmitted. Radio resource information such as frequency or time may be acquired from the ProSe server 7, and a resource for announcement may be previously retained and assigned. In the monitoring, the UE_B 9 may receive and detect the announcement signal transmitted using a direct radio signal based on LTE, that is, an E-UTRA technology. The UE_A 8 may start to count the timer based on the reception of the discovery response. The UE_B 9 may perform the monitoring until the timer is expired. In a case where the timer is expired, for example, the value of the timer becomes zero, the monitoring is stopped.

In a case where a non-authentication state is notified in the discovery response, the UE_B 9 does not perform the assignment or the monitoring of the radio resource.

Through the above-described procedure, the UE_B 9 may perform the authentication procedure for performing the monitoring. The UE_B 9 may acquire the ProSe application code corresponding to the ProSe application ID that performs the monitoring.

The UE_B 9 may request the monitoring of the plurality of applications. In this case, this UE may retain a plurality of ProSe application IDs, and may perform a monitoring request procedure on each ProSe application ID.

The UE_B 9 may perform the monitoring on the plurality of ProSe application codes.

[1.3.4 Match Reporting Procedure]

Hereinafter, a match reporting procedure performed by the terminal will be described. The match reporting is a procedure in which the terminal reports the monitoring result to the ProSe server 7 when the ProSe application code announced by the proximity terminal is received through the monitoring. In the match reporting procedure, the ProSe application ID associated with the received ProSe application code or the timer value associated with the ProSe application code may be acquired.

Figure 12:
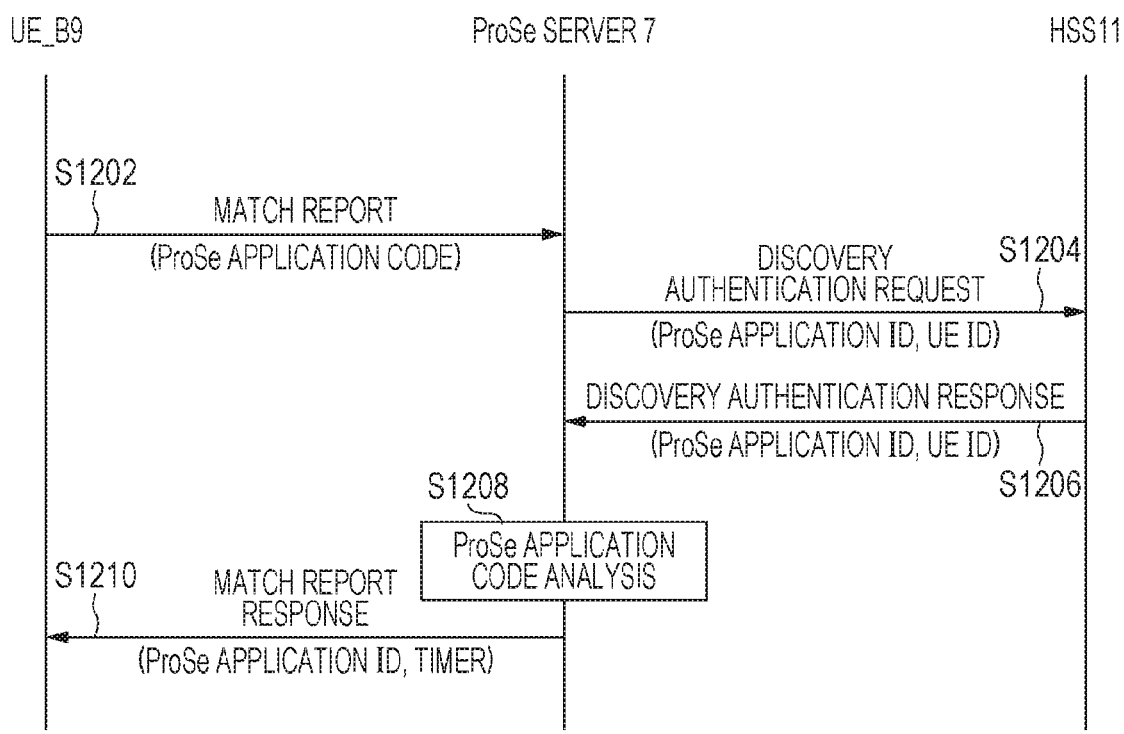
FIG. 12 is a diagram for describing a match reporting procedure.

Hereinafter, the match reporting procedure performed by the UE_B 9 will be described with reference to FIG. 12. The UE_B 9 may perform the announcement based on the fact that the authentication is permitted through the service authentication procedure.

An example in which the UE_B 9 performs the match reporting procedure will be described below, but the UE_A 8 may perform the match reporting procedure through the same procedure as that of the UE_B 9.

The UE_B 9 may retain the ProSe application ID corresponding to the home PLMN, as an initial state in which the match reporting is performed. As a specific acquisition method, the UE_A 8 may request the ProSe application ID by transmitting the ProSe registration request to the ProSe server 7 in the service registration procedure. The ProSe server 7 may transmit the response including the ProSe application ID. As stated above, the UE_A 8 may acquire the ProSe application ID included in the ProSe registration response.

Alternatively, the UE may not retain the ProSe application ID. The UE may acquire the ProSe application code through the monitoring, may detect that the ProSe application ID corresponding to the acquired ProSe application code is not retained, and may start the match reporting procedure based on the detection.

Specifically, the starting of the match reporting procedure means that the UE_B 9 transmits a match report to the ProSe server 7 (S1202).

Here, the transmission of the match report by means of the UE_B 9 may be performed under a condition in which the service authentication procedure is completed. More specifically, in the ProSe server 7 of the home PLMN which is the contracted communication operator, a condition in which the monitoring of the UE_B 9 is authenticated may be used. Alternatively, a condition in which the monitoring is authenticated based on information indicating whether or not the execution of the match reporting procedure is permitted in addition to the monitoring may be used. The UE_B 9 may acquire the authentication information from the ProSe server 7 in response to the authentication completion, and may use a condition in which the authentication information is retained.

The match report including a command indicating that the ProSe application code, the UE ID or the match report is requested may be transmitted.

The UE ID may be identification information such as IMSI or MSISDN. Alternatively, the UE ID may be a ProSe application code which is acquired from the ProSe server 7 through the service authentication procedure and is associated with the UE_B 9.

The information indicating that the match reporting procedure is requested is not limited to the identification method using the command, and may be requested by defining a match report message and transmitting the match report message. More specifically, a message type that requests the match report may be defined, and a request message including the message type may be transmitted.

The ProSe server 7 as the transmission destination of the match report may previously retain the information regarding the ProSe server 7 of the home PLMN which is the contracted communication operator of the UE_B 9, and may use the ProSe server 7 of the home PLMN as the transmission destination.

The match report may include identification information indicating a request related to the updating of the timer through this request. Specifically, in a case where the timer is already assigned to the ProSe application code included in the match report and the counting of the timer is started, the match report may request that the counting thereof is ended and the timer is newly assigned and may request that a new timer is assigned after the counting is ended, by using the identification information.

Subsequently, the ProSe server 7 receives the match report from the UE_B 9. In a case where the UE context associated with the UE_B 9 is not retained, the ProSe server 7 may request the authentication for the announcement to the HSS 11, the authentication for the monitoring or the authentication for the generation of the UE context (S1204). The request for such authentications may be performed by transmitting a discovery authentication request to the HSS 11. The discovery authentication request including the UE ID may be transmitted.

The UE ID may be identification information such as IMSI or MSISDN. Alternatively, the UE ID may be the ProSe UE ID associated with the UE_B 9.

Thereafter, the HSS 11 receives the discovery authentication request. The HSS 11 may retain the subscriber information associated with the UE_B 9, and may manage the subscriber information by associating information indicating that the discovery is permitted, information indicating that the announcement is permitted, information indicating that the monitoring is permitted, or information indicating that the match reporting is permitted with the UE_B 9.

As these permission information items, different permission information items may be managed for applications. That is, the permission information may be managed in association with the ProSe application ID.

The HSS 11 performs the authentication based on the received UE ID and the subscriber information. The ProSe server 7 may transmit the discovery authentication response to the ProSe server 7, as a response to the discovery authentication (S1206). Here, the discovery authentication response including the authentication result may be transmitted.

More specifically, the information included in the discovery authentication request and the subscriber information may be inquired, the discovery authentication response including the information indicating that the match reporting is permitted may be transmitted in a case where the UE_B 9 is permitted to perform the monitoring, and the discovery authentication response including the information indicating that the monitoring is not permitted may be transmitted in a case where this UE is not permitted to perform the monitoring.

Here, in a case where the information indicating that the match reporting is permitted is retained in the subscriber information, the HSS 11 may permit the match reporting. In a case where the information indicating that the monitoring is permitted is retained in the subscriber information, the match reporting may be permitted. In a case where the information indicating that the discovery in the ProSe is permitted is retained in the subscriber information, the match reporting may be permitted.

Subsequently, the ProSe server 7 receives the discovery authentication response transmitted from the HSS 11. The ProSe server 7 may generate the UE context based on the discovery authentication response. The UE context including the UE ID and the information indicating that the announcement is permitted or the information indicating that the monitoring is permitted which are acquired by the match report transmitted from the UE_B 9 or the discovery authentication response transmitted from the HSS 11 may be stored. The UE context may be managed in association with the UE_B 9.

The ProSe server 7 analyzes the ProSe application code transmitted while being included in the match report from the UE_B 9 (S1208). Specifically, the ProSe server resolves the ProSe application ID corresponding to the ProSe application code.

Here, the ProSe server 7 may previously acquire the ProSe application ID corresponding to the ProSe application code, and may store the acquired ID. The ProSe server 7 may previously manage the ProSe application code and the ProSe application ID so as to associate this code with this ID when the ProSe application is generated.

For example, in the announcement request procedure by means of the UE_A 8, in a case where the UE_A 8 generates the ProSe application code in association with the ProSe application to be transmitted, the ProSe application ID and the ProSe application code may be stored in association with each other. This UE may receive the match report from the UE_B 9, and may select the ID corresponding to the ProSe application code from the stored ProSe application IDs based on the ProSe application code included in the match report.

The timer may be managed in association with the ProSe application code. The timer may indicate for how long the announcement is permitted. The timer may indicate that the ProSe application code is legitimate. That is, since the ProSe application code needs to be operated to be safely used, a value of the code is not permanently used and is updated by the timer, so that it is possible to ensure safety. An initial value of the timer may be determined depending on a configuration performed by the communication operator.

Here, the ProSe server 7 may check the PLMN to which the ProSe application is assigned from the ProSe application code received from the UE_B 9. In this case, in a case where the PLMN is the local PLMN, the ProSe server 7 may transmit the match report to the ProSe server 7 of the local PLMN. The match report mentioned herein may include the ProSe application code and the UE ID. The ProSe server 7 of the local PLMN receives the match report from the ProSe server 7 and the ProSe application code is an authenticated code, the response of the match report is transmitted to the ProSe server 7. The response of the match report may include a ProSe application ID name (for example, a telephone number or URL) and a timer. Accordingly, the response of the match report may mean that the ProSe server 7 of the local PLMN authenticates the application.

The ProSe server 7 may transmit a match report response to the UE_B 9, as a response to the match report (S1210).

The match report response including the information related to the UE context may be transmitted. More specifically, the discovery response including the ProSe application ID, the UE ID, the ProSe application code, and the value of the timer may be transmitted.

In a case where the identification information related to the updating of the timer is included in the match report, the ProSe application code or the timer may be assigned according to the request.

Here, the ProSe server 7 may start to count the timer when the match report response is transmitted.

In a case where the ProSe application code or the timer is already assigned to the ProSe application ID included in the match report and the counting of the timer is started, the ProSe server 7 may determine whether or not to update the timer by the remaining timer value. More specifically, a new timer may be assigned in a case where the remaining timer value is equal to or less than a threshold value based on the counting of the timer in the ProSe server 7, and the remaining timer may be used as the timer notified to the UE_A 8 in a case where the remaining timer value is equal to or greater than the threshold.

Thereafter, the UE_B 9 receives the match report response. The authentication result, the ProSe application ID and the value of the timer may be acquired.

The UE_B 9 receives the match report response, and normally completes the monitoring of the ProSe application code.

The UE_B 9 may start to count the timer included in the match report response based on the reception of the match report response. The UE_B 9 recognizes that the monitored ProSe application code can be normally used until the timer is expired. In a case where the timer is expired, for example, the value of the timer becomes zero, the monitoring is stopped.

Through the above-described procedure, the UE_B 9 may resolve the ProSe application ID corresponding to the monitored ProSe application code, and may specify the application. For example, in a case where the UE_A 8 announces the ProSe application code and the UE ID and the UE_B 9 performs the monitoring to receive the ProSe application code and the UE ID for identifying the UE_A 8, the UE_B 9 may detect that the UE_A 8 is positioned in proximity and there is an application capable of being used by the UE_A 8 by performing the match reporting procedure.

[1.3.5 Update Procedure of ProSe Application Code]

Hereinafter, a procedure in which the UE_A 8 updates the ProSe application code will be described. The UE_A 8 may update the ProSe application code, and may continue the announcement or the monitoring.

As the update procedure, the respective procedures in three forms such as "updating", "non-updating" and "parallel" will be described.

Here, the "updating" means that the UE_A 8 that acquires the ProSe application code and the timer for the ProSe application ID and starts to count the timer acquires a new ProSe application code and timer for the same ProSe application ID, invalidates the old ProSe application code and timer, and uses the new ProSe application code and timer.

The "non-updating" means that the UE_A 8 that acquires the ProSe application code and timer for the ProSe application ID and starts to count the timer acquires a new ProSe application code and timer for the same ProSe application ID, expires the timer of the old ProSe application code, and then uses the new ProSe application code and timer.

The "parallel" means that the UE_A 8 that acquires the ProSe application code and timer for the ProSe application ID and starts to count the timer acquires a new ProSe application code and timer for the same ProSe application ID, and performs both the use of the timer of the old ProSe application code and the use of the timer of the new ProSe application code.

Hereinafter, a specific procedure will be described.

[1.3.5.1 First Procedure Example of Update Procedure of ProSe Application Code Through "Updating"]

Figure 13:
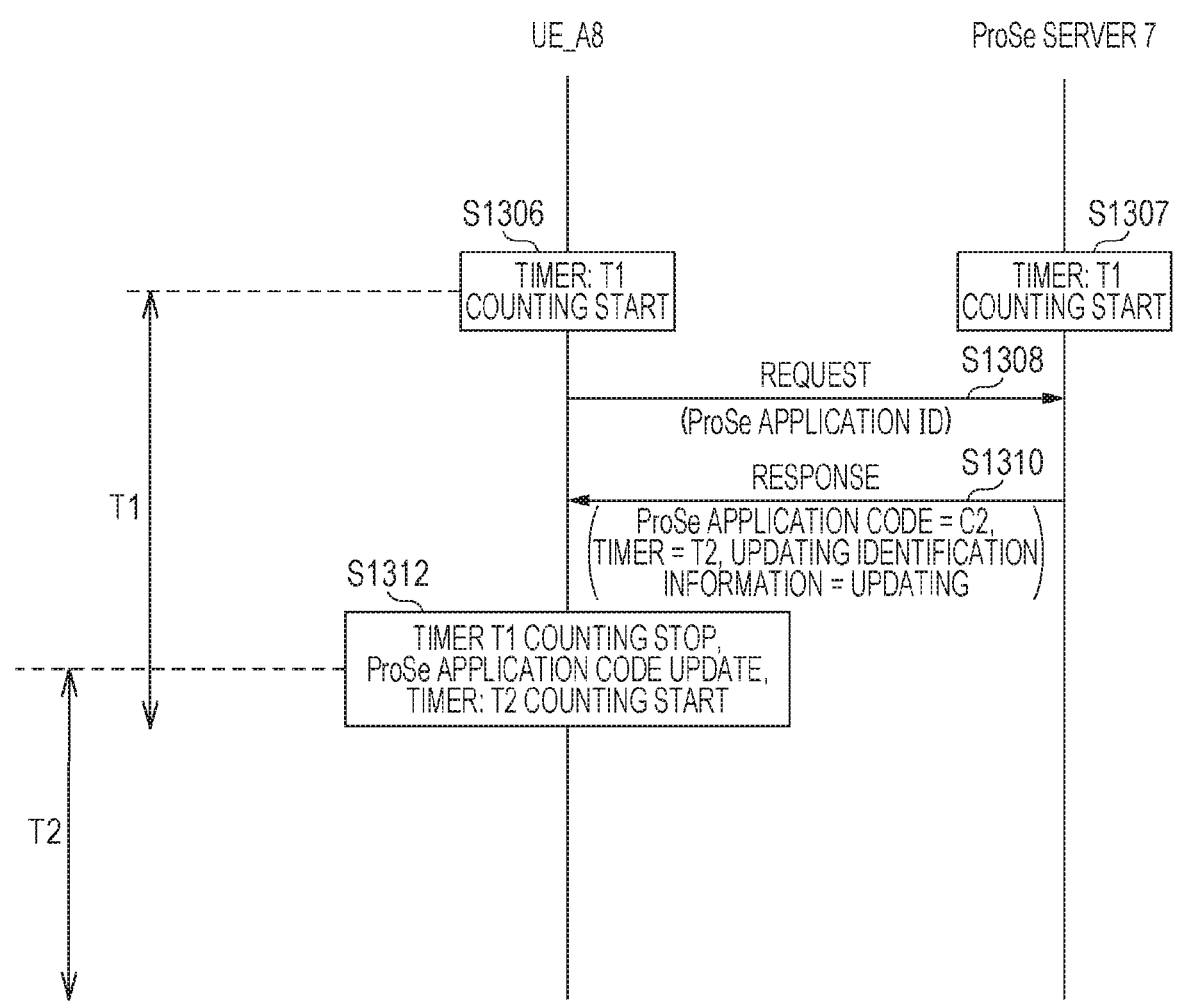
FIG. 13 is a diagram for describing a first processing example according to a first embodiment.

An example of a procedure for performing the "updating" described in 1.3.5 will be described with reference to FIG. 13.

An initial state of the present procedure may be a state in which the announcement request procedure described in 1.3.2 is completed.

That is, the initial state of the present procedure may be a state in which the UE_A 8 acquires "C1" as the ProSe application code and "T1" as the timer from the ProSe server 7 through the announcement request procedure described in 1.3.2. Hereinafter, the details thereof will be described with reference to FIG. 13. Based on the announcement request procedure, the UE_A 8 starts to count the timer "T1" and validates the ProSe application code "C1" (S1306). The ProSe server 7 transmits the response message, starts to count the timer "T1", and then validates the ProSe application code "C1" (S1307).

As described in the announcement procedure of 1.3.2, the UE_A 8 may transmit the announcement signal to perform the announcement for a period during which the counting of the timer "T1" is performed.

The UE_A 8 may request the ProSe application code and the timer for the same ProSe application ID from the ProSe server 7 for a period during which the counting of the timer "T1" is performed. In other words, the UE_A 8 may newly request the ProSe application code and the timer for the same ProSe application ID from the ProSe server 7 until the timer "T1" is expired.

Such re-requesting performed by the UE_A 8 may be performed based on the fact that the remaining time of the timer becomes less. More specifically, the UE_A 8 may previously retain a threshold value, and may perform the re-requesting in a case where the remaining time of the timer becomes equal to the threshold value or is less than the threshold. The trigger of the re-requesting is not limited thereto, and the re-requesting may be performed by another condition or may be performed in an arbitrary timing.

The UE_A 8 may transmit the request message to the ProSe server 7 in order to re-request the ProSe application code and the timer for the same ProSe application ID (S1308).

Here, the request message may be a discovery request message for requesting the announcement. The discovery request message for the announcement may be a discovery request message (S1004) which is described in the announcement request procedure of 1.3.2 and is transmitted from the UE_A 8. The process related to the transmission of the UE_A 8, the structure of the discovery request message, or the information element included in the request message may be the same, and thus, the detailed description thereof will be omitted now.

Subsequently, the ProSe server 7 receives the request message. The ProSe server transmits the response message to the UE_A 8 (S1310). The response message including the ProSe application code and the timer may be transmitted.

Here, as the condition in which the response message is transmitted, the response message may be transmitted based on the reception of the request message, or may be transmitted based on the authentication. Here, the specific method of the authentication may be performed by the method described in the announcement request procedure of 1.3.2.

The application code and the timer included in the response message may include the old ProSe application code "C1" and the remaining time of the timer "T1" corresponding to the old ProSe application code which are already assigned.

Alternatively, the application code and the timer included in the response message may include a new ProSe application code "C2" different from the ProSe application code "C1" and a timer "T2" corresponding to the new ProSe application code.

Here, the old ProSe application code "C1" and the new ProSe application code "C2" may be associated with the single application ID.

Whether to transmit the old application code or the new application code may be determined based on the following conditions or processes.

The ProSe server 7 may transmit the response message including the new application code "C2" and timer "T2" based on the fact that the remaining time of the timer T1 is less. More specifically, the ProSe server 7 may previously retain the threshold, and may transmit the response message including the new application code "C2" and timer "T2" in a case where the remaining time of the timer is equal to the threshold or is less than the threshold.

In a case where the remaining time of the timer T1 is sufficient, the ProSe server 7 may transmit the response message including the old application code "C1" and the remaining time of the timer "T1". More specifically, the ProSe server 7 may previously retain the threshold, and may transmit the response message including the new application code "C1" and the remaining time of the timer "T1" in a case where the remaining time of the timer is greater than the threshold or is equal to the threshold.

Alternatively, the ProSe server 7 may perform the determination based on the received request message. For example, the UE_A 8 may transmit the request message including identification information.

This identification information may be identification information indicating that the old application code is requested or the new application code is requested.

The ProSe server 7 may transmit the response message including the new application code "C2" and timer "T2" based on the identification information. The ProSe server may transmit the response message including the old application code "C1" and the remaining time of the timer "T1" based on the identification information.

The ProSe server 7 may perform the determination based on the presence or absence of the identification information. That is, the identification information may be identification information indicating that the new application code is requested. For example, the UE_A 8 may transmit the request message that does not including the identification information, and may request the old application request. The UE_A 8 may transmit the request message including the identification information, and may request the new application code.

The ProSe server may transmit the response message including the old application code "C1" and the remaining time of the timer "T1" based on the fact that the identification information is not included in the request message. The ProSe server 7 may transmit the response message including the new application code "C2" and timer "T2" based on the fact that the request message includes the identification information.

Alternatively, the identification information may be identification information indicating that the old application code is requested. For example, the UE_A 8 may transmit the request message that does not include the identification information, and may request the new application code. The UE_A 8 may transmit the request message including the identification information, and may request the old application.

The ProSe server 7 may transmit the response message including the new application code "C2" and timer "T2" based on the fact that the identification information is not included in the request message. The ProSe server may transmit the response message including the old application code "C1" and the remaining time of the timer "T1" based on the fact that the identification information is included in the request message.

Such identification information may be an information element such as a flag included in the request message, or may be an information element indicating the message type of the control message.

As mentioned above, the ProSe server 7 may transmit the response message including the remaining time of the timer "T1", and may synchronize the timers of the plurality of UEs.

This request message may be the discovery request message for requesting the announcement described in 1.3.2. Thus, the identification information may be included in the discovery request message for requesting the announcement described in 1.3.2.

Whether to transmit the old application code or the new application code may be determined based on the configuration of the ProSe server 7. For example, the configuration of the ProSe server may be determined by the policy of the application operator or the policy of the communication operator that operates the ProSe server 7, and the configuration may be performed.

The configuration thereof may be determined by combining the above-described conditions or processes, or may be determined based on another method.

Thereafter, the UE_A 8 receives the response message. The UE_A 8 acquires the ProSe application code and the timer included in the response message.

In a case where the new ProSe application code "C2" is acquired, the UE_A 8 may perform a process corresponding to the "updating" such as a process of stopping the use of the old ProSe application code "C1" and starting the use of the new ProSe application code "C2" (S1312).

For example, as the specific process of the "updating" in the UE_A 8, the old ProSe application code "C1" may be invalidated, and the new ProSe application code "C2" may be validated.

The UE may stop the counting of the timer "T1" corresponding to the old ProSe application code "C1", and may start to count the timer "T2" corresponding to the new ProSe application code "C2".

The old ProSe application code "C1" and timer "T1" may be removed from the storage unit.

The UE_A 8 may perform the configuration such that the transmission of the announcement signal using the old ProSe application code "C1" is stopped and then the announcement using the ProSe application code "C1" is not performed.

The UE_A 8 may transmit the announcement signal using the new ProSe application code "C2" until the timer "T2" corresponding to the new ProSe application code "C2" is expired.

The UE_A 8 may perform the process of the "updating" based on the fact that the new ProSe application code "C2" is acquired from the ProSe server 7, or may perform this process based on the reception of the response message transmitted from the ProSe server 7.

Alternatively, the UE_A 8 may perform the process of the "updating" based on the identification information included in the response message. For example, the ProSe server 7 may transmit the response message including identification information for requesting that the "updating" process is performed. The UE_A 8 may receive the identification information, and may perform the "updating" process based on the fact that the received identification information requests the execution of the "updating" process. As mentioned above, the UE_A 8 may perform the "updating" process based on the identification information included in the response message.

Such identification information may be an information element such as a flag included in the response message, or may be an information element indicating the message type of the control message. The identification information may be updating identification information indicating the "updating", "non-updating" or "parallel". The updating identification information in this case may indicate the "updating".

The response message may be the discovery response message for requesting the announcement described in 1.3.2 (S1010). Thus, the identification information may be included in the discovery response message for requesting the announcement described in 1.3.2.

Whether or not to perform the "updating" process may be determined based on the configuration of the UE_A 8. For example, the configuration of the UE_A 8 may be determined by the user policy, the policy of the communication operator that operates the ProSe server 7 or the policy of the application operator, and the configuration may be performed.

The configuration thereof may be determined by combining the above-described conditions or processes, or may be determined based on another method.

In a case where the "updating" process is not performed, the UE_A 8 may continue the announcement by using the old ProSe application code. For example, in a case where the old ProSe application code "C1" is acquired by receiving the response message, the UE_A 8 may continue the announcement by using the old ProSe application code "C1" until the timer "T1" being counted is expired. The UE_A 8 may update the remaining time of the timer "T1" to the received value of the timer, and may continue the counting.

Alternatively, in a case where the "updating" process is not performed, the UE_A 8 may stop all the announcement using the old ProSe application code and the announcement using the new ProSe application code.

Through the above-described procedure, the UE_A 8 can continue the announcement corresponding to the ProSe application ID.

Although it has been described above that the UE_A 8 performs the update procedure of the ProSe application code, the UE_B 9 may perform the same procedure as that of the UE_A 8.

[1.3.5.2 Second Procedure Example of Update Procedure of ProSe Application Code Through "Updating"]

In the first procedure example of the update procedure of the ProSe application code through the "updating" described in 1.3.5.1, the procedure example in which the UE_A 8 continues the announcement with the state in which the announcement request procedure described in 1.3.2 is completed as the initial state has been described.

The initial state is not limited to the above-described example, and may be a state in which the monitoring request procedure described in 1.3.3 is completed.

That is, the initial state may be a state in which the UE_A 8 acquires "C1" as the ProSe application code and "T1" as the timer from the ProSe server 7 through the monitoring request procedure described in 1.3.3.

Hereinafter, the details thereof will be described with reference to FIG. 13. Based on the monitoring request procedure, the UE_A 8 starts to count the timer "T1", and validates the ProSe application code "C1" (S1306). The ProSe server 7 transmits the response message, starts to count the timer "T1", and then validates the ProSe application code "C1" (S1307).

As described in the monitoring procedure of 1.3.3, the UE_A 8 may perform the monitoring for receiving the announcement signal for a period during which the counting of the timer "T1" is performed.

The UE_A 8 may request the ProSe application code and the timer for the same ProSe application ID from the ProSe server 7 for a period during which the counting of the timer "T1" is performed. In other words, the UE_A 8 may newly request the ProSe application code and the timer for the same ProSe application ID from the ProSe server 7 until the timer "T1" is expired.

Such re-requesting performed by the UE_A 8 may be performed based on the fact that the remaining time of the timer becomes less. More specifically, the UE_A 8 may previously retain a threshold value, and may perform the re-requesting in a case where the remaining time of the timer becomes equal to the threshold value or is less than the threshold. The trigger of the re-requesting is not limited thereto, and the re-requesting may be performed by another condition or may be performed in an arbitrary timing.

The UE_A 8 may transmit the request message to the ProSe server 7 in order to re-request the ProSe application code and the timer for the same ProSe application ID (S1308).

Here, the request message may be a discovery request message for requesting the monitoring. The discovery request message for the monitoring is the discovery request message (S1104) which is described in the monitoring request procedure of 1.3.3 and is transmitted from the UE_A 8. The process related to the transmission of the UE_A 8, the structure of the discovery request message, or the information element included in the request message may be the same, and thus, the detailed description thereof will be omitted now.

Subsequently, the ProSe server 7 receives the request message. The ProSe server transmits the response message to the UE_A 8 (S1310). The response message including the ProSe application code and the timer may be transmitted.

Here, as the condition in which the response message is transmitted, the response message may be transmitted based on the reception of the request message, or may be transmitted based on the authentication. Here, the specific method of the authentication may be performed by the method described in the monitoring request procedure of 1.3.3.

The application code and the timer included in the response message may include the old ProSe application code "C1" and the remaining time of the timer "T1" corresponding to the old ProSe application code which are already assigned.

Alternatively, the application code and the timer included in the response message may include a new ProSe application code "C2" different from the ProSe application code "C1" and a timer "T2" corresponding to the new ProSe application code.

Here, the old ProSe application code "C1" and the new ProSe application code "C2" may be associated with the single application ID.

Whether to transmit the old application code or the new application code may be determined based on the following conditions or processes.

The ProSe server 7 may transmit the response message including the new application code "C2" and timer "T2" based on the fact that the remaining time of the timer T1 is less. More specifically, the ProSe server 7 may previously retain the threshold, and may transmit the response message including the new application code "C2" and timer "T2" in a case where the remaining time of the timer is equal to the threshold or is less than the threshold.

In a case where the remaining time of the timer T1 is sufficient, the ProSe server 7 may transmit the response message including the old application code "C1" and timer "T1". More specifically, the ProSe server 7 may previously retain the threshold, and may transmit the response message including the new application code "C1" and the remaining time of the timer "T1" in a case where the remaining time of the timer is greater than the threshold or is equal to the threshold.

Alternatively, the ProSe server 7 may perform the determination based on the received request message. For example, the UE_A 8 may transmit the request message including identification information.

This identification information may be identification information indicating that the old application code is requested or the new application code is requested.

The ProSe server 7 may transmit the response message including the new application code "C2" and timer "T2" based on the identification information. The ProSe server may transmit the response message including the old application code "C1" and the remaining time of the timer "T1" based on the identification information.

The ProSe server 7 may perform the determination based on the presence or absence of the identification information. That is, the identification information may be identification information indicating that the new application code is requested. For example, the UE_A 8 may transmit the request message that does not including the identification information, and may request the old application request. The UE_A 8 may transmit the request message including the identification information, and may request the new application code.

The ProSe server may transmit the response message including the old application code "C1" and the remaining time of the timer "T1" based on the fact that the identification information is not included in the request message. The ProSe server 7 may transmit the response message including the new application code "C2" and timer "T2" based on the fact that the request message includes the identification information.

Alternatively, the identification information may be identification information indicating that the old application code is requested. For example, the UE_A 8 may transmit the request message that does not include the identification information, and may request the new application code. The UE_A 8 may transmit the request message including the identification information, and may request the old application.

The ProSe server 7 may transmit the response message including the new application code "C2" and timer "T2" based on the fact that the identification information is not included in the request message. The ProSe server may transmit the response message including the old application code "C1" and the remaining time of the timer "T1" based on the fact that the identification information is included in the request message.

Such identification information may be an information element such as a flag included in the request message, or may be an information element indicating the message type of the control message.

As mentioned above, the ProSe server 7 may transmit the response message including the remaining time of the timer "T1", and may synchronize the timers of the plurality of UEs.

This request message may be the discovery request message for requesting the monitoring described in 1.3.3. Thus, the identification information may be included in the discovery request message for requesting the monitoring described in 1.3.3.

Whether to transmit the old application code or the new application code may be determined based on the configuration of the ProSe server 7. For example, the configuration of the ProSe server may be determined by the policy of the application operator or the policy of the communication operator that operates the ProSe server 7, and the configuration may be performed.

The configuration thereof may be determined by combining the above-described conditions or processes, or may be determined based on another method.

Thereafter, the UE_A 8 receives the response message. The UE_A 8 acquires the ProSe application code and the timer included in the response message.

In a case where the new ProSe application code "C2" is acquired, the UE_A 8 may stop the use of the old ProSe application code "C1", and may a process corresponding to the "updating" for starting the use of the new ProSe application code "C2" (S1312).

For example, as the specific process of the "updating" in the UE_A 8, the old ProSe application code "C1" may be invalidated, and the new ProSe application code "C2" may be validated.

The UE may stop the counting of the timer "T1" corresponding to the old ProSe application code "C1", and may start to count the timer "T2" corresponding to the new ProSe application code "C2".

The old ProSe application code "C1" and timer "T1" may be removed from the storage unit 313.

The UE_A 8 may perform the configuration such that the monitoring using the old ProSe application code "C1" is stopped and then the monitoring using the ProSe application code "C1" is not performed.

The UE_A 8 may perform the monitoring using the new ProSe application code "C2" until the timer "T2" corresponding to the new ProSe application code "C2" is expired.

The "updating" process performed by the UE_A 8 may be performed by acquiring the new ProSe application code "C2" from the ProSe server 7, or may be performed based on the reception of the response message transmitted from the ProSe server 7.

The UE_A 8 may perform the "updating" process based on the identification information included in the response message. For example, the ProSe server 7 may transmit the response message including identification information for requesting that the "updating" process is performed. The UE_A 8 may receive the identification information, and may perform the "updating" process based on the fact that the received identification information requests the execution of the "updating" process. As mentioned above, the UE_A 8 may perform the "updating" process based on the identification information included in the response message.

Such identification information may be an information element such as a flag included in the response message, or may be an information element indicating the message type of the control message. The identification information may be updating identification information indicating the "updating", "non-updating" or "parallel". The updating identification information in this case may indicate the "updating".

This response message may the discovery response message for requesting the monitoring described in 1.3.3 (S1110). Thus, the identification information may be included in the discovery response message for requesting the monitoring described in 1.3.3.

Whether or not to perform the "updating" process may be determined based on the configuration of the UE_A 8. For example, the configuration of the UE_A 8 may be determined by the user policy, the policy of the communication operator that operates the ProSe server 7 or the policy of the application operator, and the configuration may be performed.

The configuration thereof may be determined by combining the above-described conditions or processes, or may be determined based on another method.

In a case where the "updating" process is not performed, the UE_A 8 may continue the monitoring using the old ProSe application code. For example, in a case where the old ProSe application code "C1" is acquired by receiving the response message, the UE_A 8 may continue the monitoring using the old ProSe application code "C1" until the timer "T1" being counted is expired. The UE_A 8 may update the remaining time of the timer "T1" to the received value of the timer, and may continue the counting.

Alternatively, in a case where the "updating" process is not performed, the UE_A 8 may stop all the monitoring using the old ProSe application code and the monitoring using the new ProSe application code.

Through the above-described procedure, the UE_A 8 can continue the monitoring corresponding to the ProSe application ID.

As described in the monitoring procedure of 1.3.3, the ProSe application code "C1" or the ProSe application code "C2" may be the mask value for identifying a part of the ProSe application code.

As also described in the monitoring procedure of 1.3.3, the UE_A 8 may acquire the ProSe application code and the timer by receiving the discovery filter.

Although it has been described above that the UE_A 8 performs the update procedure of the ProSe application code, the UE_B 9 may perform the same procedure as that of the UE_A 8.

[1.3.5.3 Third Procedure Example of Update Procedure of ProSe Application Code Through "Updating"]

In the first procedure example of the update procedure of the ProSe application code through the "updating" described in 1.3.5.1, the procedure example in which the UE_A 8 continues the announcement with the state in which the announcement request procedure described in 1.3.2 is completed as the initial state has been described.

The initial state is not limited to the above-described example, and may be a state in which the match reporting procedure described in 1.3.4 is completed.

That is, the initial state may be a state in which the UE_A 8 acquires "C1" as the ProSe application code and "T1" as the timer from the ProSe server 7 through the match reporting procedure described in 1.3.4.

Hereinafter, the details thereof will be described with reference to FIG. 13. Based on the match reporting procedure, the UE_A 8 starts to count the timer "T1" and validates the ProSe application code "C1" (S1306). The ProSe server 7 transmits the response message, starts to count the timer "T1", and then validates the ProSe application code "C1" (S1307).

As described in the match reporting procedure of 1.3.4, the UE_A 8 may perform the announcement or the monitoring for a period during which the counting of the timer "T1" is performed.

The UE_A 8 may request the ProSe application code and the timer for the same ProSe application ID from the ProSe server 7 for a period during which the counting of the timer "T1" is performed. In other words, the UE_A 8 may newly request the ProSe application code and the timer for the same ProSe application ID from the ProSe server 7 until the timer "T1" is expired.

Such re-requesting performed by the UE_A 8 may be performed based on the fact that the remaining time of the timer becomes less. More specifically, the UE_A 8 may previously retain a threshold value, and may perform the re-requesting in a case where the remaining time of the timer becomes equal to the threshold value or is less than the threshold. The trigger of the re-requesting is not limited thereto, and the re-requesting may be performed by another condition or may be performed in an arbitrary timing.

The UE_A 8 may transmit the request message to the ProSe server 7 in order to re-request the ProSe application code and the timer for the same ProSe application ID (S1308).

Here, the request message may be a match report message. The match report message may be the match report message (S1202) which is described in the match reporting procedure of 1.3.4 and is transmitted from the UE_A 8. The process related to the transmission of the UE_A 8, the structure of the discovery request message, or the information element included in the request message may be the same, and thus, the detailed description thereof will be omitted now.

Subsequently, the ProSe server 7 receives the request message. The ProSe server transmits the response message to the UE_A 8 (S1310). The response message including the ProSe application code and the timer may be transmitted.

Here, as the condition in which the response message is transmitted, the response message may be transmitted based on the reception of the request message, or may be transmitted based on the authentication. Here, the specific method of the authentication may be performed by the method described in the monitoring request procedure of 1.3.3.

The application code and the timer included in the response message may include the old ProSe application code "C1" and the remaining time of the timer "T1" corresponding to the old ProSe application code which are already assigned.

Alternatively, the application code and the timer included in the response message may include a new ProSe application code "C2" different from the ProSe application code "C1" and a timer "T2" corresponding to the new ProSe application code.

Here, the old ProSe application code "C1" and the new ProSe application code "C2" may be associated with the single application ID.

Whether to transmit the old application code or the new application code may be determined based on the following conditions or processes.

The ProSe server 7 may transmit the response message including the new application code "C2" and timer "T2" based on the fact that the remaining time of the timer T1 is less. More specifically, the ProSe server 7 may previously retain the threshold, and may transmit the response message including the new application code "C2" and timer "T2" in a case where the remaining time of the timer is equal to the threshold or is less than the threshold.

In a case where the remaining time of the timer T1 is sufficient, the ProSe server 7 may transmit the response message including the old application code "C1" and timer "T1". More specifically, the ProSe server 7 may previously retain the threshold, and may transmit the response message including the new application code "C1" and the remaining time of the timer "T1" in a case where the remaining time of the timer is greater than the threshold or is equal to the threshold.

Alternatively, the ProSe server 7 may perform the determination based on the received request message. For example, the UE_A 8 may transmit the request message including identification information.

This identification information may be identification information indicating that the old application code is requested or the new application code is requested.

The ProSe server 7 may transmit the response message including the new application code "C2" and timer "T2" based on the identification information. The ProSe server may transmit the response message including the old application code "C1" and the remaining time of the timer "T1" based on the identification information.

The ProSe server 7 may perform the determination based on the presence or absence of the identification information. That is, the identification information may be identification information indicating that the new application code is requested. For example, the UE_A 8 may transmit the request message that does not including the identification information, and may request the old application request. The UE_A 8 may transmit the request message including the identification information, and may request the new application code.

The ProSe server may transmit the response message including the old application code "C1" and the remaining time of the timer "T1" based on the fact that the identification information is not included in the request message. The ProSe server 7 may transmit the response message including the new application code "C2" and timer "T2" based on the fact that the request message includes the identification information.

Alternatively, the identification information may be identification information indicating that the old application code is requested. For example, the UE_A 8 may transmit the request message that does not include the identification information, and may request the new application code. The UE_A 8 may transmit the request message including the identification information, and may request the old application.

The ProSe server 7 may transmit the response message including the new application code "C2" and timer "T2" based on the fact that the identification information is not included in the request message. The ProSe server may transmit the response message including the old application code "C1" and the remaining time of the timer "T1" based on the fact that the identification information is included in the request message.

Such identification information may be an information element such as a flag included in the request message, or may be an information element indicating the message type of the control message.

As mentioned above, the ProSe server 7 may transmit the response message including the remaining time of the timer "T1", and may synchronize the timers of the plurality of UEs.

This request message may be the match report message described in 1.3.4. Thus, the identification information may be included in the match report message described in 1.3.4.

Whether to transmit the old application code or the new application code may be determined based on the configuration of the ProSe server 7. For example, the configuration of the ProSe server may be determined by the policy of the application operator or the policy of the communication operator that operates the ProSe server 7, and the configuration may be performed.

The configuration thereof may be determined by combining the above-described conditions or processes, or may be determined based on another method.

Thereafter, the UE_A 8 receives the response message. The UE_A 8 acquires the ProSe application code and the timer included in the response message.

In a case where the new ProSe application code "C2" is acquired, the UE_A 8 may stop the use of the old ProSe application code "C1", and may a process corresponding to the "updating" for starting the use of the new ProSe application code "C2" (S1312).

For example, as the specific process of the "updating" in the UE_A 8, the old ProSe application code "C1" may be invalidated, and the new ProSe application code "C2" may be validated.

The UE may stop the counting of the timer "T1" corresponding to the old ProSe application code "C1", and may start to count the timer "T2" corresponding to the new ProSe application code "C2".

The old ProSe application code "C1" and timer "T1" may be removed from the storage unit.

The UE_A 8 may perform the configuration such that the announcement or the monitoring using the old ProSe application code "C1" is stopped and then the announcement or the monitoring using the ProSe application code "C1" is not performed.

The UE_A 8 may perform the announcement or the monitoring using the new ProSe application code "C2" until the timer "T2" corresponding to the new ProSe application code "C2" is expired.

The "updating" process performed by the UE_A 8 may be performed by acquiring the new ProSe application code "C2" from the ProSe server 7, or may be performed based on the reception of the response message transmitted from the ProSe server 7.

The UE_A 8 may perform the "updating" process based on the identification information included in the response message. For example, the ProSe server 7 may transmit the response message including identification information for requesting that the "updating" process is performed. The UE_A 8 may receive the identification information, and may perform the "updating" process based on the fact that the received identification information requests the execution of the "updating" process. As mentioned above, the UE_A 8 may perform the "updating" process based on the identification information included in the response message.

Such identification information may be an information element such as a flag included in the response message, or may be an information element indicating the message type of the control message. The identification information may be updating identification information indicating the "updating", "non-updating" or "parallel". The updating identification information in this case may indicate the "updating".

This response message may be the match report response message described in 1.3.4. Thus, the identification information may be included in the match report response described in 1.3.4.

Whether or not to perform the "updating" process may be determined based on the configuration of the UE_A 8. For example, the configuration of the UE_A 8 may be determined by the user policy, the policy of the communication operator that operates the ProSe server 7 or the policy of the application operator, and the configuration may be performed.

The configuration thereof may be determined by combining the above-described conditions or processes, or may be determined based on another method.

In a case where the "updating" process is not performed, the UE_A 8 may continue the announcement or the monitoring using the old ProSe application code. For example, in a case where the old ProSe application code "C1" is acquired by receiving the response message, the UE_A 8 may continue the announcement or the monitoring using the old ProSe application code "C1" until the timer "T1" being counted is expired. The UE_A 8 may update the remaining time of the timer "T1" to the received value of the timer, and may continue the counting.

Alternatively, in a case where the "updating" process is not performed, the UE_A 8 may stop all the announcement or the monitoring using the old ProSe application code and the announcement or the monitoring using the new ProSe application code.

Through the above-described procedure, the UE_A 8 can continue the announcement or the monitoring corresponding to the ProSe application ID.

As described in the match reporting procedure of 1.3.4, the ProSe application code "C1" or the ProSe application code "C2" may be the mask value for identifying a part of the ProSe application code.

Although it has been described above that the UE_A 8 performs the update procedure of the ProSe application code, the UE_B 9 may perform the same procedure as that of the UE_A 8.

[1.3.5.4 First Procedure Example of Update Procedure of ProSe Application Code Through "Non-Updating"]

Figure 14:
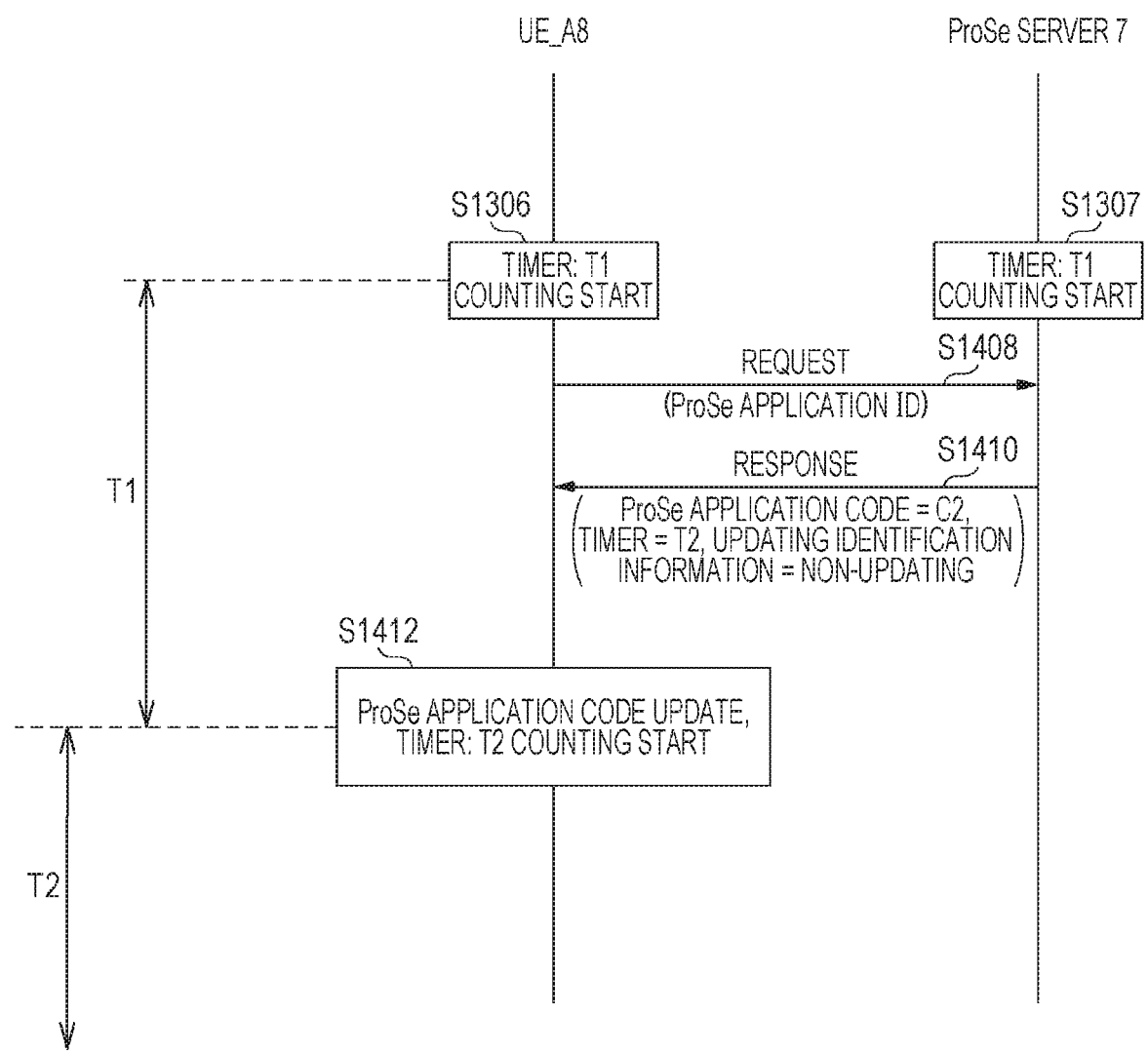
FIG. 14 is a diagram for describing a second processing example according to the first embodiment.

An example of a procedure for performing the "non-updating" described in 1.3.5 will be described with reference to FIG. 14. An initial state of the present procedure may be a state in which the announcement request procedure described in 1.3.2 is completed.

That is, the initial state of the present procedure may be a state in which the UE_A 8 acquires "C1" as the ProSe application code and "T1" as the timer from the ProSe server 7 through the announcement request procedure described in 1.3.2. Based on the announcement request procedure, the UE_A 8 starts to count the timer "T1" and validates the ProSe application code "C1" (S1306). The ProSe server 7 transmits the response message, starts to count the timer "T1", and then validates the ProSe application code "C1" (S1307).

As described in the announcement procedure of 1.3.2, the UE_A 8 may transmit the announcement signal to perform the announcement for a period during which the counting of the timer "T1" is performed.

The UE_A 8 may request the ProSe application code and the timer for the same ProSe application ID from the ProSe server 7 for a period during which the counting of the timer "T1" is performed. In other words, the UE_A 8 may newly request the ProSe application code and the timer for the same ProSe application ID from the ProSe server 7 until the timer "T1" is expired.

Such re-requesting performed by the UE_A 8 may be performed based on the fact that the remaining time of the timer becomes less. More specifically, the UE_A 8 may previously retain a threshold value, and may perform the re-requesting in a case where the remaining time of the timer becomes equal to the threshold value or is less than the threshold. The trigger of the re-requesting is not limited thereto, and the re-requesting may be performed by another condition or may be performed in an arbitrary timing.

The UE_A 8 may transmit the request message to the ProSe server 7 in order to re-request the ProSe application code and the timer for the same ProSe application ID (S1408).

Here, the request message may be a discovery request message for requesting the announcement. The discovery request message for the announcement may be a discovery request message (S1004) which is described in the announcement request procedure of 1.3.2 and is transmitted from the UE_A 8. The process related to the transmission of the UE_A 8, the structure of the discovery request message, or the information element included in the request message may be the same, and thus, the detailed description thereof will be omitted now.

Subsequently, the ProSe server 7 receives the request message. The ProSe server transmits the response message to the UE_A 8 (S1410). The response message including the ProSe application code and the timer may be transmitted.

Here, as the condition in which the response message is transmitted, the response message may be transmitted based on the reception of the request message, or may be transmitted based on the authentication. Here, the specific method of the authentication may be performed by the method described in the announcement request procedure of 1.3.2.

The application code and the timer included in the response message may include the old ProSe application code "C1" and the remaining time of the timer "T1" corresponding to the old ProSe application code which are already assigned. Alternatively, the application code and the timer included in the response message may include a new ProSe application code "C2" different from the ProSe application code "C1" and a timer "T2" corresponding to the new ProSe application code.

Here, the old ProSe application code "C1" and the new ProSe application code "C2" may be associated with the single application ID.

Whether to transmit the old application code or the new application code may be determined based on the following conditions or processes.

The ProSe server 7 may transmit the response message including the new application code "C2" and timer "T2" based on the fact that the remaining time of the timer T1 is less. More specifically, the ProSe server 7 may previously retain the threshold, and may transmit the response message including the new application code "C2" and timer "T2" in a case where the remaining time of the timer is equal to the threshold or is less than the threshold.

In a case where the remaining time of the timer T1 is sufficient, the ProSe server 7 may transmit the response message including the old application code "C1" and timer "T1". More specifically, the ProSe server 7 may previously retain the threshold, and may transmit the response message including the new application code "C1" and the remaining time of the timer "T1" in a case where the remaining time of the timer is greater than the threshold or is equal to the threshold.

Alternatively, the ProSe server 7 may perform the determination based on the received request message. For example, the UE_A 8 may transmit the request message including identification information.

This identification information may be identification information indicating that the old application code is requested or the new application code is requested.

The ProSe server 7 may transmit the response message including the new application code "C2" and timer "T2" based on the identification information. The ProSe server may transmit the response message including the old application code "C1" and the remaining time of the timer "T1" based on the identification information.

The ProSe server 7 may perform the determination based on the presence or absence of the identification information. That is, the identification information may be identification information indicating that the new application code is requested. For example, the UE_A 8 may transmit the request message that does not including the identification information, and may request the old application request. The UE_A 8 may transmit the request message including the identification information, and may request the new application code.

The ProSe server may transmit the response message including the old application code "C1" and the remaining time of the timer "T1" based on the fact that the identification information is not included in the request message. The ProSe server 7 may transmit the response message including the new application code "C2" and timer "T2" based on the fact that the request message includes the identification information.

Alternatively, the identification information may be identification information indicating that the old application code is requested. For example, the UE_A 8 may transmit the request message that does not include the identification information, and may request the new application code. The UE_A 8 may transmit the request message including the identification information, and may request the old application.

The ProSe server 7 may transmit the response message including the new application code "C2" and timer "T2" based on the fact that the identification information is not included in the request message. The ProSe server may transmit the response message including the old application code "C1" and the remaining time of the timer "T1" based on the fact that the identification information is included in the request message.

Such identification information may be an information element such as a flag included in the request message, or may be an information element indicating the message type of the control message.

As mentioned above, the ProSe server 7 may transmit the response message including the remaining time of the timer "T1", and may synchronize the timers of the plurality of UEs.

This request message may be the discovery request message for requesting the announcement described in 1.3.2. Thus, the identification information may be included in the discovery request message for requesting the announcement described in 1.3.2.

Whether to transmit the old application code or the new application code may be determined based on the configuration of the ProSe server 7. For example, the configuration of the ProSe server may be determined by the policy of the application operator or the policy of the communication operator that operates the ProSe server 7, and the configuration may be performed.

The configuration thereof may be determined by combining the above-described conditions or processes, or may be determined based on another method.

Thereafter, the UE_A 8 receives the response message. The UE_A 8 acquires the ProSe application code and the timer included in the response message.

In a case where the new ProSe application code "C2" is acquired, the UE_A 8 may perform a process corresponding to the "non-updating" such as a process of continuing the use of the old ProSe application code "C1" until the timer "T1" corresponding to the old ProSe application code "C1" is expired, stopping the use of the old ProSe application code "C1", and starting the use of the new ProSe application code "C2" (S1412).

For example, as the specific process of the "non-updating" in the UE_A 8, even in a case where the new ProSe application code "C2" is received using the response message, the UE_A 8 may continue the validation of the old ProSe application code "C1", and may continue an announcement process of transmitting the announcement signal including the old ProSe application code "C1".

In a case where the timer "T1" corresponding to the old ProSe application code "C1" becomes zero and is expired, the UE may perform the invalidation of the old ProSe application code "C1".

In the invalidation, the ProSe server 7 may remove the old ProSe application code "C1" and timer "T1" from the storage unit.

In the invalidation, the UE_A 8 may perform the configuration such that the transmission of the announcement signal using the old ProSe application code "C1" is stopped and then the announcement using the ProSe application code "C1" is not performed.

The UE_A 8 may perform the validation of the new ProSe application code "C2" in response to such invalidation.

In the validation, the UE_A 8 may start to count the timer "T2" corresponding to the new ProSe application code "C2".

Alternatively, the UE_A 8 may start to count the timer "T2" corresponding to the new ProSe application code "C2" in response to the reception of the response message transmitted from the ProSe server 7.

The UE_A 8 may transmit the announcement signal using the new ProSe application code "C2" until the timer "T2" corresponding to the new ProSe application code "C2" is expired.

The UE_A 8 may perform the "non-updating" process based on the acquisition of the new ProSe application code "C2" from the ProSe server 7, or may perform the non-updating process based on the reception of the response message transmitted from the ProSe server 7.

Alternatively, the UE_A 8 may perform the "non-updating" process based on the identification information included in the response message. For example, the ProSe server 7 may transmit the response message including the identification information for requesting that the "non-updating" process is performed. The UE_A 8 may receive the identification information, and may perform the "non-updating" process based on the fact that the received identification information requests the execution of the "non-updating" process. Alternatively, the UE_A 8 may perform the "non-updating" process based on the identification information included in the response message.

Such identification information may be an information element such as a flag included in the response message, or may be an information element indicating the message type of the control message. The identification information may be updating identification information indicating the "updating", "non-updating" or "parallel". The updating identification information in this case may indicate the "non-updating".

The response message may be the discovery response message for requesting the announcement described in 1.3.2 (S1010). Thus, the identification information may be included in the discovery response message for requesting the announcement described in 1.3.2.

Whether or not to perform the "non-updating" process may be determined based on the configuration of the UE_A 8. For example, the configuration of the UE_A 8 may be determined by the user policy, the policy of the communication operator that operates the ProSe server 7 or the policy of the application operator, and the configuration may be performed.

The configuration thereof may be determined by combining the above-described conditions or processes, or may be determined based on another method.

The UE_A 8 may acquire the old ProSe application code "C1" by receiving the response message. In this case, the UE may continue the announcement by using the old ProSe application code "C1" until the timer "T1" being counted is expired. The UE_A 8 may update the remaining time of the timer "T1" to the received value of the timer, and may continue the counting.

Alternatively, in a case where the "non-updating" process is not performed, the UE_A 8 may stop all the announcement using the old ProSe application code and the announcement using the new ProSe application code.

Through the above-described procedure, the UE_A 8 can continue the announcement corresponding to the ProSe application ID.

Although it has been described above that the UE_A 8 performs the update procedure of the ProSe application code, the UE_B 9 may perform the same procedure as that of the UE_A 8.

[1.3.5.5 Second Procedure Example of Update Procedure of ProSe Application Code Through "Non-Updating"]

In the first procedure example of the update procedure of the ProSe application code through the "non-updating" described in 1.3.5.4, the procedure example in which the UE_A 8 continues the announcement with the state in which the announcement request procedure described in 1.3.2 is completed as the initial state has been described.

The initial state is not limited to the above-described example, and may be a state in which the monitoring request procedure described in 1.3.3 is completed.

That is, the initial state may be a state in which the UE_A 8 acquires "C1" as the ProSe application code and "T1" as the timer from the ProSe server 7 through the monitoring request procedure described in 1.3.3.

Hereinafter, the details thereof will be described with reference to FIG. 14. Based on the monitoring request procedure, the UE_A 8 starts to count the timer "T1", and validates the ProSe application code "C1" (S1306). The ProSe server 7 transmits the response message, starts to count the timer "T1", and then validates the ProSe application code "C1" (S1307).

As described in the monitoring procedure of 1.3.3, the UE_A 8 may perform the monitoring for receiving the announcement signal for a period during which the counting of the timer "T1" is performed.

The UE_A 8 may request the ProSe application code and the timer for the same ProSe application ID from the ProSe server 7 for a period during which the counting of the timer "T1" is performed. In other words, the UE_A 8 may newly request the ProSe application code and the timer for the same ProSe application ID from the ProSe server 7 until the timer "T1" is expired.

Such re-requesting performed by the UE_A 8 may be performed based on the fact that the remaining time of the timer becomes less. More specifically, the UE_A 8 may previously retain a threshold value, and may perform the re-requesting in a case where the remaining time of the timer becomes equal to the threshold value or is less than the threshold. The trigger of the re-requesting is not limited thereto, and the re-requesting may be performed by another condition or may be performed in an arbitrary timing.

The UE_A 8 may transmit the request message to the ProSe server 7 in order to re-request the ProSe application code and the timer for the same ProSe application ID (S1408).

Here, the request message may be a discovery request message for requesting the monitoring. The discovery request message for the monitoring is the discovery request message (S1104) which is described in the monitoring request procedure of 1.3.3 and is transmitted from the UE_A 8. The process related to the transmission of the UE_A 8, the structure of the discovery request message, or the information element included in the request message may be the same, and thus, the detailed description thereof will be omitted now.

Subsequently, the ProSe server 7 receives the request message. The ProSe server transmits the response message to the UE_A 8 (S1410). The response message including the ProSe application code and the timer may be transmitted.

Here, as the condition in which the response message is transmitted, the response message may be transmitted based on the reception of the request message, or may be transmitted based on the authentication. Here, the specific method of the authentication may be performed by the method described in the monitoring request procedure of 1.3.3.

The application code and the timer included in the response message may include the old ProSe application code "C1" and the remaining time of the timer "T1" corresponding to the old ProSe application code which are already assigned.

Alternatively, the application code and the timer included in the response message may include a new ProSe application code "C2" different from the ProSe application code "C1" and a timer "T2" corresponding to the new ProSe application code.

Here, the old ProSe application code "C1" and the new ProSe application code "C2" may be associated with the single application ID.

Whether to transmit the old application code or the new application code may be determined based on the following conditions or processes.

The ProSe server 7 may transmit the response message including the new application code "C2" and timer "T2" based on the fact that the remaining time of the timer T1 is less. More specifically, the ProSe server 7 may previously retain the threshold, and may transmit the response message including the new application code "C2" and timer "T2" in a case where the remaining time of the timer is equal to the threshold or is less than the threshold.

In a case where the remaining time of the timer T1 is sufficient, the ProSe server 7 may transmit the response message including the old application code "C1" and timer "T1". More specifically, the ProSe server 7 may previously retain the threshold, and may transmit the response message including the new application code "C1" and the remaining time of the timer "T1" in a case where the remaining time of the timer is greater than the threshold or is equal to the threshold.

Alternatively, the ProSe server 7 may perform the determination based on the received request message. For example, the UE_A 8 may transmit the request message including identification information.

This identification information may be identification information indicating that the old application code is requested or the new application code is requested.

The ProSe server 7 may transmit the response message including the new application code "C2" and timer "T2" based on the identification information. The ProSe server may transmit the response message including the old application code "C1" and the remaining time of the timer "T1" based on the identification information.

The ProSe server 7 may perform the determination based on the presence or absence of the identification information. That is, the identification information may be identification information indicating that the new application code is requested. For example, the UE_A 8 may transmit the request message that does not including the identification information, and may request the old application request. The UE_A 8 may transmit the request message including the identification information, and may request the new application code.

The ProSe server may transmit the response message including the old application code "C1" and the remaining time of the timer "T1" based on the fact that the identification information is not included in the request message. The ProSe server 7 may transmit the response message including the new application code "C2" and timer "T2" based on the fact that the request message includes the identification information.

Alternatively, the identification information may be identification information indicating that the old application code is requested. For example, the UE_A 8 may transmit the request message that does not include the identification information, and may request the new application code. The UE_A 8 may transmit the request message including the identification information, and may request the old application.

The ProSe server 7 may transmit the response message including the new application code "C2" and timer "T2" based on the fact that the identification information is not included in the request message. The ProSe server may transmit the response message including the old application code "C1" and the remaining time of the timer "T1" based on the fact that the identification information is included in the request message.

Such identification information may be an information element such as a flag included in the request message, or may be an information element indicating the message type of the control message.

As mentioned above, the ProSe server 7 may transmit the response message including the remaining time of the timer "T1", and may synchronize the timers of the plurality of UEs.

This request message may be the discovery request message for requesting the monitoring described in 1.3.3. Thus, the identification information may be included in the discovery request message for requesting the monitoring described in 1.3.3.

Whether to transmit the old application code or the new application code may be determined based on the configuration of the ProSe server 7. For example, the configuration of the ProSe server may be determined by the policy of the application operator or the policy of the communication operator that operates the ProSe server 7, and the configuration may be performed.

The configuration thereof may be determined by combining the above-described conditions or processes, or may be determined based on another method.

Thereafter, the UE_A 8 receives the response message. The UE_A 8 acquires the ProSe application code and the timer included in the response message.

In a case where the new ProSe application code "C2" is acquired, the UE_A 8 may perform a process corresponding to the "non-updating" such as a process of continuing the use of the old ProSe application code "C1" until the timer "T1" corresponding to the old ProSe application code "C1" is expired, stopping the use of the old ProSe application code "C1", and starting the use of the new ProSe application code "C2" (S1412).

For example, as the specific process of the "non-updating" in the UE_A 8, even in a case where the new ProSe application code "C2" is received using the response message, the UE_A 8 may continue the validation of the old ProSe application code "C1", and may continue a monitoring process of receiving the announcement signal including the old ProSe application code "C1".

In a case where the timer "T1" corresponding to the old ProSe application code "C1" becomes zero and is expired, the UE may perform the invalidation of the old ProSe application code "C1".

In the invalidation, the ProSe server 7 may remove the old ProSe application code "C1" and timer "T1" from the storage unit.

In the invalidation, the UE_A 8 may perform the configuration such that the reception of the announcement signal using the old ProSe application code "C1" is stopped and then the monitoring using the ProSe application code "C1" is not performed.

The UE_A 8 may perform the validation of the new ProSe application code "C2" by performing such invalidation.

In the validation, the UE_A 8 may start to count the timer "T2" corresponding to the new ProSe application code "C2".

Alternatively, the UE_A 8 may start to count the timer "T2" corresponding to the new ProSe application code "C2" in response to the reception of the response message transmitted from the ProSe server 7.

The UE_A 8 may receive the announcement signal using the new ProSe application code "C2" until the timer "T2" corresponding to the new ProSe application code "C2" is expired.

The UE_A 8 may perform the "non-updating" process based on the acquisition of the new ProSe application code "C2" from the ProSe server 7, or may perform the non-updating process based on the reception of the response message transmitted from the ProSe server 7.

Alternatively, the UE_A 8 may perform the "non-updating" process based on the identification information included in the response message. For example, the ProSe server 7 may transmit the response message including the identification information for requesting that the "non-updating" process is performed. The UE_A 8 may receive the identification information, and may perform the "non-updating" process based on the fact that the received identification information requests the execution of the "non-updating" process. Alternatively, the UE_A 8 may perform the "non-updating" process based on the identification information included in the response message.

Such identification information may be an information element such as a flag included in the response message, or may be an information element indicating the message type of the control message. The identification information may be updating identification information indicating the "updating", "non-updating" or "parallel". The updating identification information in this case may indicate the "non-updating".

This response message may the discovery response message for requesting the monitoring described in 1.3.3 (S1110). Thus, the identification information may be included in the discovery response message for requesting the monitoring described in 1.3.3.

Whether or not to perform the "non-updating" process may be determined based on the configuration of the UE_A 8. For example, the configuration of the UE_A 8 may be determined by the user policy, the policy of the communication operator that operates the ProSe server 7 or the policy of the application operator, and the configuration may be performed.

The configuration thereof may be determined by combining the above-described conditions or processes, or may be determined based on another method.

The UE_A 8 may acquire the old ProSe application code "C1" by receiving the response message. In this case, the UE may continue the announcement by using the old ProSe application code "C1" until the timer "T1" being counted is expired. The UE_A 8 may update the remaining time of the timer "T1" to the received value of the timer, and may continue the counting.

Alternatively, in a case where the "updating" process is not performed, the UE_A 8 may stop all the monitoring using the old ProSe application code and the monitoring using the new ProSe application code.

Through the above-described procedure, the UE_A 8 can continue the monitoring corresponding to the ProSe application ID.

As described in the monitoring procedure of 1.3.3, the ProSe application code "C1" or the ProSe application code "C2" may be the mask value for identifying a part of the ProSe application code.

As also described in the monitoring procedure of 1.3.3, the UE_A 8 may acquire the ProSe application code and the timer by receiving the discovery filter.

Although it has been described above that the UE_A 8 performs the update procedure of the ProSe application code, the UE_B 9 may perform the same procedure as that of the UE_A 8.

[1.3.5.6 Third Procedure Example of Update Procedure of ProSe Application Code Through "Non-Updating"]

In the first procedure example of the update procedure of the ProSe application code through the "non-updating" described in 1.3.5.1, the procedure example in which the UE_A 8 continues the announcement with the state in which the announcement request procedure described in 1.3.2 is completed as the initial state has been described.

The initial state is not limited to the above-described example, and may be a state in which the match reporting procedure described in 1.3.4 is completed.

That is, the initial state may be a state in which the UE_A 8 acquires "C1" as the ProSe application code and "T1" as the timer from the ProSe server 7 through the match reporting procedure described in 1.3.4. Hereinafter, the details thereof will be described with reference to FIG. 14. Based on the match reporting procedure, the UE_A 8 starts to count the timer "T1" and validates the ProSe application code "C1" (S1306). The ProSe server 7 transmits the response message, starts to count the timer "T1", and then validates the ProSe application code "C1" (S1307).

As described in the match reporting procedure of 1.3.4, the UE_A 8 may perform the announcement or the monitoring for a period during which the counting of the timer "T1" is performed.

The UE_A 8 may request the ProSe application code and the timer for the same ProSe application ID from the ProSe server 7 for a period during which the counting of the timer "T1" is performed. In other words, the UE_A 8 may newly request the ProSe application code and the timer for the same ProSe application ID from the ProSe server 7 until the timer "T1" is expired.

Such re-requesting performed by the UE_A 8 may be performed based on the fact that the remaining time of the timer becomes less. More specifically, the UE_A 8 may previously retain a threshold value, and may perform the re-requesting in a case where the remaining time of the timer becomes equal to the threshold value or is less than the threshold. The trigger of the re-requesting is not limited thereto, and the re-requesting may be performed by another condition or may be performed in an arbitrary timing.

The UE_A 8 may transmit the request message to the ProSe server 7 in order to re-request the ProSe application code and the timer for the same ProSe application ID (S1408).

Here, the request message may be a match report message. The match report message may be the match report message (S1202) which is described in the match reporting procedure of 1.3.4 and is transmitted from the UE_A 8. The process related to the transmission of the UE_A 8, the structure of the discovery request message, or the information element included in the request message may be the same, and thus, the detailed description thereof will be omitted now.

Subsequently, the ProSe server 7 receives the request message. The ProSe server transmits the response message to the UE_A 8 (S1410). The response message including the ProSe application code and the timer may be transmitted.

Here, as the condition in which the response message is transmitted, the response message may be transmitted based on the reception of the request message, or may be transmitted based on the authentication. Here, the specific method of the authentication may be performed by the method described in the monitoring request procedure of 1.3.3.

The application code and the timer included in the response message may include the old ProSe application code "C1" and the remaining time of the timer "T1" corresponding to the old ProSe application code which are already assigned.

Alternatively, the application code and the timer included in the response message may include a new ProSe application code "C2" different from the ProSe application code "C1" and a timer "T2" corresponding to the new ProSe application code.

Here, the old ProSe application code "C1" and the new ProSe application code "C2" may be associated with the single application ID.

Whether to transmit the old application code or the new application code may be determined based on the following conditions or processes.

The ProSe server 7 may transmit the response message including the new application code "C2" and timer "T2" based on the fact that the remaining time of the timer T1 is less. More specifically, the ProSe server 7 may previously retain the threshold, and may transmit the response message including the new application code "C2" and timer "T2" in a case where the remaining time of the timer is equal to the threshold or is less than the threshold.

In a case where the remaining time of the timer T1 is sufficient, the ProSe server 7 may transmit the response message including the old application code "C1" and timer "T1". More specifically, the ProSe server 7 may previously retain the threshold, and may transmit the response message including the new application code "C1" and the remaining time of the timer "T1" in a case where the remaining time of the timer is greater than the threshold or is equal to the threshold.

Alternatively, the ProSe server 7 may perform the determination based on the received request message. For example, the UE_A 8 may transmit the request message including identification information.

This identification information may be identification information indicating that the old application code is requested or the new application code is requested.

The ProSe server 7 may transmit the response message including the new application code "C2" and timer "T2" based on the identification information. The ProSe server may transmit the response message including the old application code "C1" and the remaining time of the timer "T1" based on the identification information.

The ProSe server 7 may perform the determination based on the presence or absence of the identification information. That is, the identification information may be identification information indicating that the new application code is requested. For example, the UE_A 8 may transmit the request message that does not including the identification information, and may request the old application request. The UE_A 8 may transmit the request message including the identification information, and may request the new application code.

The ProSe server may transmit the response message including the old application code "C1" and the remaining time of the timer "T1" based on the fact that the identification information is not included in the request message. The ProSe server 7 may transmit the response message including the new application code "C2" and timer "T2" based on the fact that the request message includes the identification information.

Alternatively, the identification information may be identification information indicating that the old application code is requested. For example, the UE_A 8 may transmit the request message that does not include the identification information, and may request the new application code. The UE_A 8 may transmit the request message including the identification information, and may request the old application.

The ProSe server 7 may transmit the response message including the new application code "C2" and timer "T2" based on the fact that the identification information is not included in the request message. The ProSe server may transmit the response message including the old application code "C1" and the remaining time of the timer "T1" based on the fact that the identification information is included in the request message.

Such identification information may be an information element such as a flag included in the request message, or may be an information element indicating the message type of the control message.

As mentioned above, the ProSe server 7 may transmit the response message including the remaining time of the timer "T1", and may synchronize the timers of the plurality of UEs.

This request message may be the match report message described in 1.3.4. Thus, the identification information may be included in the match report message described in 1.3.4.

Whether to transmit the old application code or the new application code may be determined based on the configuration of the ProSe server 7. For example, the configuration of the ProSe server may be determined by the policy of the application operator or the policy of the communication operator that operates the ProSe server 7, and the configuration may be performed.

The configuration thereof may be determined by combining the above-described conditions or processes, or may be determined based on another method.

Thereafter, the UE_A 8 receives the response message. The UE_A 8 acquires the ProSe application code and the timer included in the response message.

In a case where the new ProSe application code "C2" is acquired, the UE_A 8 may perform a process corresponding to the "non-updating" such as a process of continuing the use of the old ProSe application code "C1" until the timer "T1" corresponding to the old ProSe application code "C1" is expired, stopping the use of the old ProSe application code "C1", and starting the use of the new ProSe application code "C2" (S1412).

For example, as the specific process of the "non-updating" in the UE_A 8, even in a case where the new ProSe application code "C2" is received using the response message, the UE_A 8 may continue the validation of the old ProSe application code "C1", and may continue the announcement process of transmitting the announcement signal including the old ProSe application code "C1" or the monitoring process of receiving the announcement signal including the old ProSe application code "C1".

In a case where the timer "T1" corresponding to the old ProSe application code "C1" becomes zero and is expired, the UE may perform the invalidation of the old ProSe application code "C1".

In the invalidation, the ProSe server 7 may remove the old ProSe application code "C1" and timer "T1" from the storage unit 507.

In the invalidation, the UE_A 8 may perform the configuration such that the transmission of the announcement signal using the old ProSe application code "C1" is stopped and then the announcement using the ProSe application code "C1" is not performed.

The UE_A 8 may perform the validation of the new ProSe application code "C2" by performing such invalidation.

In the validation, the UE_A 8 may start to count the timer "T2" corresponding to the new ProSe application code "C2".

Alternatively, the UE_A 8 may start to count the timer "T2" corresponding to the new ProSe application code "C2" in response to the reception of the response message transmitted from the ProSe server 7.

The UE_A 8 may transmit the announcement signal using the new ProSe application code "C2" or may receive the announcement signal using the new ProSe application code "C2" until the timer "T2" corresponding to the new ProSe application code "C2" is expired.

The UE_A 8 may perform the "non-updating" process based on the acquisition of the new ProSe application code "C2" from the ProSe server 7, or may perform the non-updating process based on the reception of the response message transmitted from the ProSe server 7.

Alternatively, the UE_A 8 may perform the "non-updating" process based on the identification information included in the response message. For example, the ProSe server 7 may transmit the response message including the identification information for requesting that the "non-updating" process is performed. The UE_A 8 may receive the identification information, and may perform the "non-updating" process based on the fact that the received identification information requests the execution of the "non-updating" process. Alternatively, the UE_A 8 may perform the "non-updating" process based on the identification information included in the response message.

Such identification information may be an information element such as a flag included in the response message, or may be an information element indicating the message type of the control message. The identification information may be updating identification information indicating the "updating", "non-updating" or "parallel". The updating identification information in this case may indicate the "non-updating".

This response message may be the match report response message described in 1.3.4. Thus, the identification information may be included in the match report response described in 1.3.4.

Whether or not to perform the "non-updating" process may be determined based on the configuration of the UE_A 8. For example, the configuration of the UE_A 8 may be determined by the user policy, the policy of the communication operator that operates the ProSe server 7 or the policy of the application operator, and the configuration may be performed.

The configuration thereof may be determined by combining the above-described conditions or processes, or may be determined based on another method.

The UE_A 8 may acquire the old ProSe application code "C1" by receiving the response message. In this case, the UE may continue the announcement by using the old ProSe application code "C1" until the timer "T1" being counted is expired. The UE_A 8 may update the remaining time of the timer "T1" to the received value of the timer, and may continue the counting.

Alternatively, in a case the "non-updating" process is not performed, the UE_A 8 may stop all the announcement or the monitoring using the old ProSe application code and the announcement or the monitoring using the new ProSe application code.

Through the above-described procedure, the UE_A 8 can continue the announcement or the monitoring corresponding to the ProSe application ID.

As described in the match reporting procedure of 1.3.4, the ProSe application code "C1" or the ProSe application code "C2" may be the mask value for identifying a part of the ProSe application code.

Although it has been described above that the UE_A 8 performs the update procedure of the ProSe application code, the UE_B 9 may perform the same procedure as that of the UE_A 8.

[1.3.5.7 First Procedure Example of Update Procedure of ProSe Application Code Through "Parallel"]

Figure 15:
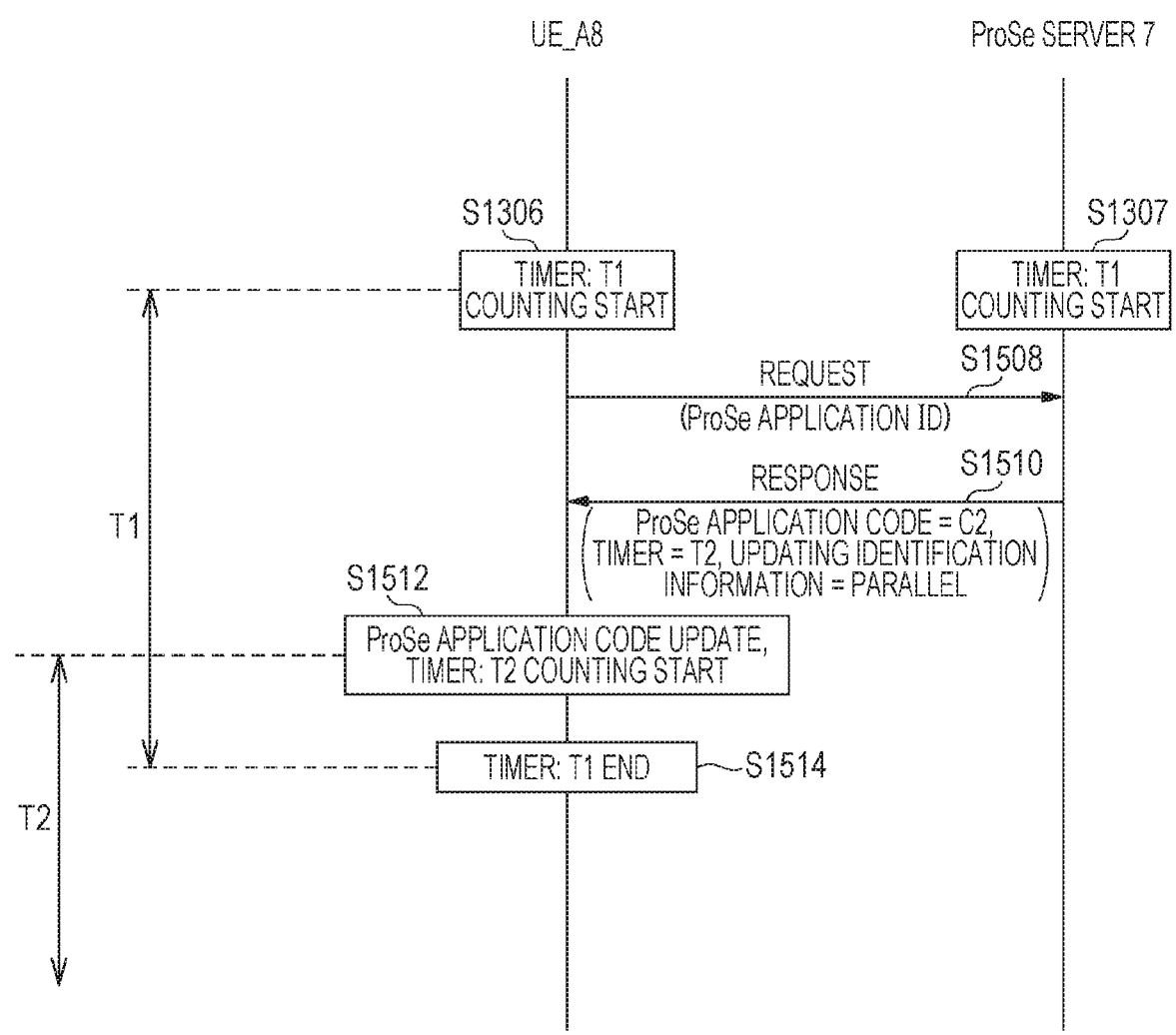
FIG. 15 is a diagram for describing a third processing example according to the first embodiment.

An example of a procedure for performing the "non-updating" described in 1.3.5 will be described with reference to FIG. 15.

An initial state of the present procedure may be a state in which the announcement request procedure described in 1.3.2 is completed.

That is, the initial state of the present procedure may be a state in which the UE_A 8 acquires "C1" as the ProSe application code and "T1" as the timer from the ProSe server 7 through the announcement request procedure described in 1.3.2. Hereinafter, the details thereof will be described with reference to FIG. 15. Based on the announcement request procedure, the UE_A 8 starts to count the timer "T1" and validates the ProSe application code "C1" (S1306). The ProSe server 7 transmits the response message, starts to count the timer "T1", and then validates the ProSe application code "C1" (S1307).

As described in the announcement procedure of 1.3.2, the UE_A 8 may transmit the announcement signal to perform the announcement for a period during which the counting of the timer "T1" is performed.

The UE_A 8 may request the ProSe application code and the timer for the same ProSe application ID from the ProSe server 7 for a period during which the counting of the timer "T1" is performed. In other words, the UE_A 8 may newly request the ProSe application code and the timer for the same ProSe application ID from the ProSe server 7 until the timer "T1" is expired.

Such re-requesting performed by the UE_A 8 may be performed based on the fact that the remaining time of the timer becomes less. More specifically, the UE_A 8 may previously retain a threshold value, and may perform the re-requesting in a case where the remaining time of the timer becomes equal to the threshold value or is less than the threshold. The trigger of the re-requesting is not limited thereto, and the re-requesting may be performed by another condition or may be performed in an arbitrary timing.

The UE_A 8 may transmit the request message to the ProSe server 7 in order to re-request the ProSe application code and the timer for the same ProSe application ID (S1508).

Here, the request message may be a discovery request message for requesting the announcement. The discovery request message for the announcement may be a discovery request message (S1004) which is described in the announcement request procedure of 1.3.2 and is transmitted from the UE_A 8. The process related to the transmission of the UE_A 8, the structure of the discovery request message, or the information element included in the request message may be the same, and thus, the detailed description thereof will be omitted now.

Subsequently, the ProSe server 7 receives the request message. The ProSe server transmits the response message to the UE_A 8 (S1510). The response message including the ProSe application code and the timer may be transmitted.

Here, as the condition in which the response message is transmitted, the response message may be transmitted based on the reception of the request message, or may be transmitted based on the authentication. Here, the specific method of the authentication may be performed by the method described in the announcement request procedure of 1.3.2.

The application code and the timer included in the response message may include the old ProSe application code "C1" and the remaining time of the timer "T1" corresponding to the old ProSe application code which are already assigned.

Alternatively, the application code and the timer included in the response message may include a new ProSe application code "C2" different from the ProSe application code "C1" and a timer "T2" corresponding to the new ProSe application code.

Here, the old ProSe application code "C1" and the new ProSe application code "C2" may be associated with the single application ID.

Whether to transmit the old application code or the new application code may be determined based on the following conditions or processes.

The ProSe server 7 may transmit the response message including the new application code "C2" and timer "T2" based on the fact that the remaining time of the timer T1 is less. More specifically, the ProSe server 7 may previously retain the threshold, and may transmit the response message including the new application code "C2" and timer "T2" in a case where the remaining time of the timer is equal to the threshold or is less than the threshold.

In a case where the remaining time of the timer T1 is sufficient, the ProSe server 7 may transmit the response message including the old application code "C1" and timer "T1". More specifically, the ProSe server 7 may previously retain the threshold, and may transmit the response message including the new application code "C1" and the remaining time of the timer "T1" in a case where the remaining time of the timer is greater than the threshold or is equal to the threshold.

Alternatively, the ProSe server 7 may perform the determination based on the received request message. For example, the UE_A 8 may transmit the request message including identification information.

This identification information may be identification information indicating that the old application code is requested or the new application code is requested.

The ProSe server 7 may transmit the response message including the new application code "C2" and timer "T2" based on the identification information. The ProSe server may transmit the response message including the old application code "C1" and the remaining time of the timer "T1" based on the identification information.

The ProSe server 7 may perform the determination based on the presence or absence of the identification information. That is, the identification information may be identification information indicating that the new application code is requested. For example, the UE_A 8 may transmit the request message that does not including the identification information, and may request the old application request. The UE_A 8 may transmit the request message including the identification information, and may request the new application code.

The ProSe server may transmit the response message including the old application code "C1" and the remaining time of the timer "T1" based on the fact that the identification information is not included in the request message. The ProSe server 7 may transmit the response message including the new application code "C2" and timer "T2" based on the fact that the request message includes the identification information.

Alternatively, the identification information may be identification information indicating that the old application code is requested. For example, the UE_A 8 may transmit the request message that does not include the identification information, and may request the new application code. The UE_A 8 may transmit the request message including the identification information, and may request the old application.

The ProSe server 7 may transmit the response message including the new application code "C2" and timer "T2" based on the fact that the identification information is not included in the request message. The ProSe server may transmit the response message including the old application code "C1" and the remaining time of the timer "T1" based on the fact that the identification information is included in the request message.

Such identification information may be an information element such as a flag included in the request message, or may be an information element indicating the message type of the control message.

As mentioned above, the ProSe server 7 may transmit the response message including the remaining time of the timer "T1", and may synchronize the timers of the plurality of UEs.

This request message may be the discovery request message for requesting the announcement described in 1.3.2. Thus, the identification information may be included in the discovery request message for requesting the announcement described in 1.3.2.

Whether to transmit the old application code or the new application code may be determined based on the configuration of the ProSe server 7. For example, the configuration of the ProSe server may be determined by the policy of the application operator or the policy of the communication operator that operates the ProSe server 7, and the configuration may be performed.

The configuration thereof may be determined by combining the above-described conditions or processes, or may be determined based on another method.

Thereafter, the UE_A 8 receives the response message. The UE_A 8 acquires the ProSe application code and the timer included in the response message.

In a case where the new ProSe application code "C2" is acquired, the UE_A 8 may perform a process corresponding to the "parallel" such as a process of continuing the use of the old ProSe application code "C1" until the timer "T1" corresponding to the old ProSe application code "C1" is expired and starting the old ProSe application code "C1" (S1512).

For example, as the specific process of the "parallel" in the UE_A 8, even in a case where the new ProSe application code "C2" is received using the response message, the UE_A 8 may continue the validation of the old ProSe application code "C1", and may continue an announcement process of transmitting the announcement signal including the old ProSe application code "C1".

In a case where the timer "T1" corresponding to the old ProSe application code "C1" becomes zero and is expired, the UE may perform the invalidation of the old ProSe application code "C1".

In the invalidation, the ProSe server 7 may remove the old ProSe application code "C1" and timer "T1" from the storage unit.

In the invalidation, the UE_A 8 may perform the configuration such that the transmission of the announcement signal using the old ProSe application code "C1" is stopped and then the announcement using the ProSe application code "C1" is not performed.

The UE_A 8 may validate the new ProSe application code "C2" while maintaining the validation of the old application code "C1" in response to the reception of the response message transmitted from the ProSe server 7.

In the validation, the UE_A 8 may start to count the timer "T2" corresponding to the new ProSe application code "C2".

The UE_A 8 may transmit the announcement signal using the new ProSe application code "C2" until the timer "T2" corresponding to the new ProSe application code "C2" is expired.

The UE_A 8 may perform the "parallel" process based on the acquisition of the new ProSe application code "C2" from the ProSe server 7, or may perform the non-updating process based on the reception of the response message transmitted from the ProSe server 7.

Alternatively, the UE_A 8 may perform the "parallel" process based on the identification information included in the response message. For example, the ProSe server 7 may transmit the response message including the identification information for requesting that the "parallel" process is performed. The UE_A 8 may receive the identification information, and may perform the "parallel" process based on the fact that the received identification information requests the execution of the "parallel" process. As stated above, the UE_A 8 may perform the "parallel" process based on the identification information included in the response message.

Such identification information may be an information element such as a flag included in the response message, or may be an information element indicating the message type of the control message. The identification information may be updating identification information indicating the "updating", "non-updating" or "parallel". The updating identification information in this case may indicate the "parallel".

The response message may be the discovery response message for requesting the announcement described in 1.3.2 (S1010). Thus, the identification information may be included in the discovery response message for requesting the announcement described in 1.3.2.

Whether or not to perform the "parallel" process may be determined based on the configuration of the UE_A 8. For example, the configuration of the UE_A 8 may be determined by the user policy, the policy of the communication operator that operates the ProSe server 7 or the policy of the application operator, and the configuration may be performed.

The configuration thereof may be determined by combining the above-described conditions or processes, or may be determined based on another method.

The UE_A 8 may acquire the old ProSe application code "C1" by receiving the response message. In this case, the UE may continue the announcement by using the old ProSe application code "C1" until the timer "T1" being counted is expired. The UE_A 8 may update the remaining time of the timer "T1" to the received value of the timer, and may continue the counting.

Alternatively, in a case where the "parallel" process is not performed, the UE_A 8 may stop all the announcement using the old ProSe application code and the announcement using the new ProSe application code.

Through the above-described procedure, the UE_A 8 can continue the announcement corresponding to the ProSe application ID.

Although it has been described above that the UE_A 8 performs the update procedure of the ProSe application code, the UE_B 9 may perform the same procedure as that of the UE_A 8.

[1.3.5.8 Second Procedure Example of Update Procedure of ProSe Application Code Through "Parallel"]

In the first procedure example of the update procedure of the ProSe application code through the "parallel" described in 1.3.5.7, the procedure example in which the UE_A 8 continues the announcement with the state in which the announcement request procedure described in 1.3.2 is completed as the initial state has been described.

The initial state is not limited to the above-described example, and may be a state in which the monitoring request procedure described in 1.3.3 is completed.

That is, the initial state may be a state in which the UE_A 8 acquires "C1" as the ProSe application code and "T1" as the timer from the ProSe server 7 through the monitoring request procedure described in 1.3.3. Hereinafter, the details thereof will be described with reference to FIG. 15. Based on the monitoring request procedure, the UE_A 8 starts to count the timer "T1", and validates the ProSe application code "C1" (S1306). The ProSe server 7 transmits the response message, starts to count the timer "T1", and then validates the ProSe application code "C1" (S1307).

As described in the monitoring procedure of 1.3.3, the UE_A 8 may perform the monitoring for receiving the announcement signal for a period during which the counting of the timer "T1" is performed.

The UE_A 8 may request the ProSe application code and the timer for the same ProSe application ID from the ProSe server 7 for a period during which the counting of the timer "T1" is performed. In other words, the UE_A 8 may newly request the ProSe application code and the timer for the same ProSe application ID from the ProSe server 7 until the timer "T1" is expired.

Such re-requesting performed by the UE_A 8 may be performed based on the fact that the remaining time of the timer becomes less. More specifically, the UE_A 8 may previously retain a threshold value, and may perform the re-requesting in a case where the remaining time of the timer becomes equal to the threshold value or is less than the threshold. The trigger of the re-requesting is not limited thereto, and the re-requesting may be performed by another condition or may be performed in an arbitrary timing.

The UE_A 8 may transmit the request message to the ProSe server 7 in order to re-request the ProSe application code and the timer for the same ProSe application ID (S1508).

Here, the request message may be a discovery request message for requesting the monitoring. The discovery request message for the monitoring is the discovery request message (S1104) which is described in the monitoring request procedure of 1.3.3 and is transmitted from the UE_A 8. The process related to the transmission of the UE_A 8, the structure of the discovery request message, or the information element included in the request message may be the same, and thus, the detailed description thereof will be omitted now.

Subsequently, the ProSe server 7 receives the request message. The ProSe server transmits the response message to the UE_A 8 (S1510). The response message including the ProSe application code and the timer may be transmitted.

Here, as the condition in which the response message is transmitted, the response message may be transmitted based on the reception of the request message, or may be transmitted based on the authentication. Here, the specific method of the authentication may be performed by the method described in the monitoring request procedure of 1.3.3.

The application code and the timer included in the response message may include the old ProSe application code "C1" and the remaining time of the timer "T1" corresponding to the old ProSe application code which are already assigned.

Alternatively, the application code and the timer included in the response message may include a new ProSe application code "C2" different from the ProSe application code "C1" and a timer "T2" corresponding to the new ProSe application code.

Here, the old ProSe application code "C1" and the new ProSe application code "C2" may be associated with the single application ID.

Whether to transmit the old application code or the new application code may be determined based on the following conditions or processes.

The ProSe server 7 may transmit the response message including the new application code "C2" and timer "T2" based on the fact that the remaining time of the timer T1 is less. More specifically, the ProSe server 7 may previously retain the threshold, and may transmit the response message including the new application code "C2" and timer "T2" in a case where the remaining time of the timer is equal to the threshold or is less than the threshold.

In a case where the remaining time of the timer T1 is sufficient, the ProSe server 7 may transmit the response message including the old application code "C1" and timer "T1". More specifically, the ProSe server 7 may previously retain the threshold, and may transmit the response message including the new application code "C1" and the remaining time of the timer "T1" in a case where the remaining time of the timer is greater than the threshold or is equal to the threshold.

Alternatively, the ProSe server 7 may perform the determination based on the received request message. For example, the UE_A 8 may transmit the request message including identification information.

This identification information may be identification information indicating that the old application code is requested or the new application code is requested.

The ProSe server 7 may transmit the response message including the new application code "C2" and timer "T2" based on the identification information. The ProSe server may transmit the response message including the old application code "C1" and the remaining time of the timer "T1" based on the identification information.

The ProSe server 7 may perform the determination based on the presence or absence of the identification information. That is, the identification information may be identification information indicating that the new application code is requested. For example, the UE_A 8 may transmit the request message that does not including the identification information, and may request the old application request. The UE_A 8 may transmit the request message including the identification information, and may request the new application code.

The ProSe server may transmit the response message including the old application code "C1" and the remaining time of the timer "T1" based on the fact that the identification information is not included in the request message. The ProSe server 7 may transmit the response message including the new application code "C2" and timer "T2" based on the fact that the request message includes the identification information.

Alternatively, the identification information may be identification information indicating that the old application code is requested. For example, the UE_A 8 may transmit the request message that does not include the identification information, and may request the new application code. The UE_A 8 may transmit the request message including the identification information, and may request the old application.

The ProSe server 7 may transmit the response message including the new application code "C2" and timer "T2" based on the fact that the identification information is not included in the request message. The ProSe server may transmit the response message including the old application code "C1" and the remaining time of the timer "T1" based on the fact that the identification information is included in the request message.

Such identification information may be an information element such as a flag included in the request message, or may be an information element indicating the message type of the control message.

As mentioned above, the ProSe server 7 may transmit the response message including the remaining time of the timer "T1", and may synchronize the timers of the plurality of UEs.

This request message may be the discovery request message for requesting the monitoring described in 1.3.3. Thus, the identification information may be included in the discovery request message for requesting the monitoring described in 1.3.3.

Whether to transmit the old application code or the new application code may be determined based on the configuration of the ProSe server 7. For example, the configuration of the ProSe server may be determined by the policy of the application operator or the policy of the communication operator that operates the ProSe server 7, and the configuration may be performed.

The configuration thereof may be determined by combining the above-described conditions or processes, or may be determined based on another method.

Thereafter, the UE_A 8 receives the response message. The UE_A 8 acquires the ProSe application code and the timer included in the response message.

In a case where the new ProSe application code "C2" is acquired, the UE_A 8 may perform a process corresponding to the "parallel" such as a process of continuing the use of the old ProSe application code "C1" until the timer "T1" corresponding to the old ProSe application code "C1" is expired and starting the old ProSe application code "C1" (S1512).

For example, as the specific process of the "parallel" in the UE_A 8, even in a case where the new ProSe application code "C2" is received using the response message, the UE_A 8 may continue the validation of the old ProSe application code "C1", and may continue a monitoring process of receiving the announcement signal including the old ProSe application code "C1".

In a case where the timer "T1" corresponding to the old ProSe application code "C1" becomes zero and is expired, the UE may perform the invalidation of the old ProSe application code "C1".

In the invalidation, the ProSe server 7 may remove the old ProSe application code "C1" and timer "T1" from the storage unit 507.

In the invalidation, the UE_A 8 may perform the configuration such that the transmission of the announcement signal using the old ProSe application code "C1" is stopped and then the announcement using the ProSe application code "C1" is not performed.

The UE_A 8 may validate the new ProSe application code "C2" while maintaining the validation of the old application code "C1" in response to the reception of the response message transmitted from the ProSe server 7.

In the validation, the UE_A 8 may start to count the timer "T2" corresponding to the new ProSe application code "C2".

The UE_A 8 may receive the announcement signal using the new ProSe application code "C2" until the timer "T2" corresponding to the new ProSe application code "C2" is expired.

The UE_A 8 may perform the "parallel" process based on the acquisition of the new ProSe application code "C2" from the ProSe server 7, or may perform the non-updating process based on the reception of the response message transmitted from the ProSe server 7.

Alternatively, the UE_A 8 may perform the "parallel" process based on the identification information included in the response message. For example, the ProSe server 7 may transmit the response message including the identification information for requesting that the "parallel" process is performed. The UE_A 8 may receive the identification information, and may perform the "parallel" process based on the fact that the received identification information requests the execution of the "parallel" process. As stated above, the UE_A 8 may perform the "parallel" process based on the identification information included in the response message.

Such identification information may be an information element such as a flag included in the response message, or may be an information element indicating the message type of the control message. The identification information may be updating identification information indicating the "updating", "non-updating" or "parallel". The updating identification information in this case may indicate the "parallel".

This response message may the discovery response message for requesting the monitoring described in 1.3.3 (S1110). Thus, the identification information may be included in the discovery response message for requesting the monitoring described in 1.3.3.

Whether or not to perform the "parallel" process may be determined based on the configuration of the UE_A 8. For example, the configuration of the UE_A 8 may be determined by the user policy, the policy of the communication operator that operates the ProSe server 7 or the policy of the application operator, and the configuration may be performed.

The configuration thereof may be determined by combining the above-described conditions or processes, or may be determined based on another method.

The UE_A 8 may acquire the old ProSe application code "C1" by receiving the response message. In this case, the UE may continue the announcement by using the old ProSe application code "C1" until the timer "T1" being counted is expired. The UE_A 8 may update the remaining time of the timer "T1" to the received value of the timer, and may continue the counting.

Alternatively, in a case where the "parallel" process is not performed, the UE_A 8 may stop all the monitoring using the old ProSe application code and the monitoring using the new ProSe application code.

Through the above-described procedure, the UE_A 8 can continue the monitoring corresponding to the ProSe application ID.

As described in the monitoring procedure of 1.3.3, the ProSe application code "C1" or the ProSe application code "C2" may be the mask value for identifying a part of the ProSe application code.

As also described in the monitoring procedure of 1.3.3, the UE_A 8 may acquire the ProSe application code and the timer by receiving the discovery filter.

Although it has been described above that the UE_A 8 performs the update procedure of the ProSe application code, the UE_B 9 may perform the same procedure as that of the UE_A 8.

[1.3.5.9 Third Procedure Example of Update Procedure of ProSe Application Code Through "Parallel"]

In the first procedure example of the update procedure of the ProSe application code through the "non-updating" described in 1.3.5.1, the procedure example in which the UE_A 8 continues the announcement with the state in which the announcement request procedure described in 1.3.2 is completed as the initial state has been described.

The initial state is not limited to the above-described example, and may be a state in which the match reporting procedure described in 1.3.4 is completed.

That is, the initial state may be a state in which the UE_A 8 acquires "C1" as the ProSe application code and "T1" as the timer from the ProSe server 7 through the match reporting procedure described in 1.3.4.

Hereinafter, the details thereof will be described with reference to FIG. 15. Based on the match reporting procedure, the UE_A 8 starts to count the timer "T1" and validates the ProSe application code "C1" (S1306). The ProSe server 7 transmits the response message, starts to count the timer "T1", and then validates the ProSe application code "C1" (S1307).

As described in the match reporting procedure of 1.3.4, the UE_A 8 may perform the announcement or the monitoring for a period during which the counting of the timer "T1" is performed.

The UE_A 8 may request the ProSe application code and the timer for the same ProSe application ID from the ProSe server 7 for a period during which the counting of the timer "T1" is performed. In other words, the UE_A 8 may newly request the ProSe application code and the timer for the same ProSe application ID from the ProSe server 7 until the timer "T1" is expired.

Such re-requesting performed by the UE_A 8 may be performed based on the fact that the remaining time of the timer becomes less. More specifically, the UE_A 8 may previously retain a threshold value, and may perform the re-requesting in a case where the remaining time of the timer becomes equal to the threshold value or is less than the threshold. The trigger of the re-requesting is not limited thereto, and the re-requesting may be performed by another condition or may be performed in an arbitrary timing.

The UE_A 8 may transmit the request message to the ProSe server 7 in order to re-request the ProSe application code and the timer for the same ProSe application ID (S1508).

Here, the request message may be a match report message. The match report message may be the match report message (S1202) which is described in the match reporting procedure of 1.3.4 and is transmitted from the UE_A 8. The process related to the transmission of the UE_A 8, the structure of the discovery request message, or the information element included in the request message may be the same, and thus, the detailed description thereof will be omitted now.

Subsequently, the ProSe server 7 receives the request message. The ProSe server transmits the response message to the UE_A 8 (S1510). The response message including the ProSe application code and the timer may be transmitted.

Here, as the condition in which the response message is transmitted, the response message may be transmitted based on the reception of the request message, or may be transmitted based on the authentication. Here, the specific method of the authentication may be performed by the method described in the monitoring request procedure of 1.3.3.

The application code and the timer included in the response message may include the old ProSe application code "C1" and the remaining time of the timer "T1" corresponding to the old ProSe application code which are already assigned. Alternatively, the application code and the timer included in the response message may include a new ProSe application code "C2" different from the ProSe application code "C1" and a timer "T2" corresponding to the new ProSe application code.

Here, the old ProSe application code "C1" and the new ProSe application code "C2" may be associated with the single application ID.

Whether to transmit the old application code or the new application code may be determined based on the following conditions or processes.

The ProSe server 7 may transmit the response message including the new application code "C2" and timer "T2" based on the fact that the remaining time of the timer T1 is less. More specifically, the ProSe server 7 may previously retain the threshold, and may transmit the response message including the new application code "C2" and timer "T2" in a case where the remaining time of the timer is equal to the threshold or is less than the threshold.

In a case where the remaining time of the timer T1 is sufficient, the ProSe server 7 may transmit the response message including the old application code "C1" and timer "T1". More specifically, the ProSe server 7 may previously retain the threshold, and may transmit the response message including the new application code "C1" and the remaining time of the timer "T1" in a case where the remaining time of the timer is greater than the threshold or is equal to the threshold.

Alternatively, the ProSe server 7 may perform the determination based on the received request message. For example, the UE_A 8 may transmit the request message including identification information.

This identification information may be identification information indicating that the old application code is requested or the new application code is requested.

The ProSe server 7 may transmit the response message including the new application code "C2" and timer "T2" based on the identification information. The ProSe server may transmit the response message including the old application code "C1" and the remaining time of the timer "T1" based on the identification information.

The ProSe server 7 may perform the determination based on the presence or absence of the identification information. That is, the identification information may be identification information indicating that the new application code is requested. For example, the UE_A 8 may transmit the request message that does not including the identification information, and may request the old application request. The UE_A 8 may transmit the request message including the identification information, and may request the new application code.

The ProSe server may transmit the response message including the old application code "C1" and the remaining time of the timer "T1" based on the fact that the identification information is not included in the request message. The ProSe server 7 may transmit the response message including the new application code "C2" and timer "T2" based on the fact that the request message includes the identification information.

Alternatively, the identification information may be identification information indicating that the old application code is requested. For example, the UE_A 8 may transmit the request message that does not include the identification information, and may request the new application code. The UE_A 8 may transmit the request message including the identification information, and may request the old application.

The ProSe server 7 may transmit the response message including the new application code "C2" and timer "T2" based on the fact that the identification information is not included in the request message. The ProSe server may transmit the response message including the old application code "C1" and the remaining time of the timer "T1" based on the fact that the identification information is included in the request message.

Such identification information may be an information element such as a flag included in the request message, or may be an information element indicating the message type of the control message.

As mentioned above, the ProSe server 7 may transmit the response message including the remaining time of the timer "T1", and may synchronize the timers of the plurality of UEs.

This request message may be the match report message described in 1.3.4. Thus, the identification information may be included in the match report message described in 1.3.4.

Whether to transmit the old application code or the new application code may be determined based on the configuration of the ProSe server 7. For example, the configuration of the ProSe server may be determined by the policy of the application operator or the policy of the communication operator that operates the ProSe server 7, and the configuration may be performed.

The configuration thereof may be determined by combining the above-described conditions or processes, or may be determined based on another method.

Thereafter, the UE_A 8 receives the response message. The UE_A 8 acquires the ProSe application code and the timer included in the response message.

In a case where the new ProSe application code "C2" is acquired, the UE_A 8 may perform a process corresponding to the "parallel" such as a process of continuing the use of the old ProSe application code "C1" until the timer "T1" corresponding to the old ProSe application code "C1" is expired and starting the old ProSe application code "C1" (S1512).

For example, as the specific process of the "parallel" in the UE_A 8, even in a case where the new ProSe application code "C2" is received using the response message, the UE_A 8 may continue the validation of the old ProSe application code "C1", and may continue an announcement process of transmitting the announcement signal including the old ProSe application code "C1" or the monitoring process of receiving the announcement signal including the ProSe application code "C1".

In a case where the timer "T1" corresponding to the old ProSe application code "C1" becomes zero and is expired, the UE may perform the invalidation of the old ProSe application code "C1".

In the invalidation, the ProSe server 7 may remove the old ProSe application code "C1" and timer "T1" from the storage unit 313.

In the invalidation, the UE_A 8 may perform the configuration such that the transmission of the announcement signal using the old ProSe application code "C1" is stopped and then the announcement using the ProSe application code "C1" is not performed.

In the invalidation, the UE_A 8 may perform the configuration such that the reception of the announcement signal using the old ProSe application code "C1" is stopped and then the monitoring using the ProSe application code "C1" is not performed.

The UE_A 8 may validate the new ProSe application code "C2" while maintaining the validation of the old application code "C1" in response to the reception of the response message transmitted from the ProSe server 7.

In the validation, the UE_A 8 may start to count the timer "T2" corresponding to the new ProSe application code "C2".

The UE_A 8 may transmit the announcement signal using the new ProSe application code "C2" until the timer "T2" corresponding to the new ProSe application code "C2" is expired.

Alternatively, the UE_A 8 may receive the announcement signal using the new ProSe application code "C2" until the timer "T2" corresponding to the new ProSe application code "C2" is expired.

The UE_A 8 may perform the "parallel" process based on the acquisition of the new ProSe application code "C2" from the ProSe server 7, or may perform the non-updating process based on the reception of the response message transmitted from the ProSe server 7.

Alternatively, the UE_A 8 may perform the "parallel" process based on the identification information included in the response message. For example, the ProSe server 7 may transmit the response message including the identification information for requesting that the "parallel" process is performed. The UE_A 8 may receive the identification information, and may perform the "parallel" process based on the fact that the received identification information requests the execution of the "parallel" process. As stated above, the UE_A 8 may perform the "parallel" process based on the identification information included in the response message.

Such identification information may be an information element such as a flag included in the response message, or may be an information element indicating the message type of the control message. The identification information may be updating identification information indicating the "updating", "non-updating" or "parallel". The updating identification information in this case may indicate the "parallel".

This response message may be the match report response message described in 1.3.4. Thus, the identification information may be included in the match report response described in 1.3.4.

Whether or not to perform the "parallel" process may be determined based on the configuration of the UE_A 8. For example, the configuration of the UE_A 8 may be determined by the user policy, the policy of the communication operator that operates the ProSe server 7 or the policy of the application operator, and the configuration may be performed.

The configuration thereof may be determined by combining the above-described conditions or processes, or may be determined based on another method.

The UE_A 8 may acquire the old ProSe application code "C1" by receiving the response message. In this case, the UE may continue the announcement by using the old ProSe application code "C1" until the timer "T1" being counted is expired. The UE_A 8 may update the remaining time of the timer "T1" to the received value of the timer, and may continue the counting.

Alternatively, in a case the "parallel" process is not performed, the UE_A 8 may stop all the announcement or the monitoring using the old ProSe application code and the announcement or the monitoring using the new ProSe application code.

Through the above-described procedure, the UE_A 8 can continue the announcement or the monitoring corresponding to the ProSe application ID.

As described in the match reporting procedure of 1.3.4, the ProSe application code "C1" or the ProSe application code "C2" may be the mask value for identifying a part of the ProSe application code.

Although it has been described above that the UE_A 8 performs the update procedure of the ProSe application code, the UE_B 9 may perform the same procedure as that of the UE_A 8.

[1.3.5.10 Modification Example of Update Procedure of ProSe Application Code]

Although the examples of the procedure in which the UE_A 8 updates the ProSe application code have been described in 1.3.5.1 to 1.3.5.9, the specific procedure is not limited to the embodiment, and designs or combinations within a range without departing from the gist of the present invention are included in the present invention.

The example in which the UE_A 8 stops the announcement using the old ProSe application ID by receiving the response message has been described in the first procedure example of the update procedure of the ProSe application code through the "updating" of 1.3.5.1, but the UE may continue the monitoring.

The identification information which is included in the response message and is transmitted from the ProSe server 7 may be identification information for requesting that the monitoring using the old ProSe application code is continued in addition to requesting the "updating" process. In this case, the UE_A 8 may continue the monitoring using the old ProSe application code "C1" based on the identification information included in the response message until the timer "T1" corresponding to the old ProSe application code "C1" is expired in addition to the process described in 1.3.5.1.

The example in which the UE_A 8 stops the monitoring using the old ProSe application ID by receiving the response message has been described in the second procedure example of the update procedure of the ProSe application code through the "updating" of 1.3.5.2, but the UE may continue the announcement.

The identification information which is included in the response message and is transmitted from the ProSe server 7 may be identification information for requesting that the monitoring using the old ProSe application code is continued in addition to requesting the "updating" process. In this case, the UE_A 8 may continue the announcement using the old ProSe application code "C1" based on the identification information included in the response message until the timer "T1" corresponding to the old ProSe application code "C1" is expired in addition to the process described in 1.3.5.2.

The example in which the UE_A 8 continues the monitoring using the old ProSe application ID by receiving the response message has been described in the second procedure example of the update procedure of the ProSe application code through the "non-updating" of 1.3.5.5, but the UE may stop the announcement.

The identification information which is included in the response message and is transmitted from the ProSe server 7 may be identification information for requesting that the announcement using the old ProSe application code is stopped in addition to requesting the "non-updating" process. In this case, the UE_A 8 may stop the announcement using the old ProSe application code "C1" based on the identification information included in the response message in addition to the process described in 1.3.5.5.

The identification information which is included in the response message and is transmitted from the ProSe server 7 may include at least Public Land Mobile Network (PLMN), or may be identification information of the PLMN. Here, the PLMN may be information for identifying the communication operator or the communication operator network.

The UE_A 8 may detect that the communication operator by which the UE is managed or the communication operator network to which the UE is connected is changed from the fact that the identification information included in the previously received response message and the identification information included in the newly received response message are different from each other based on the reception of the identification information included in the response message transmitted from the ProSe server 7, and may perform the processes such as the "updating", "non-updating" and the "parallel" described in 1.3.5.1 to 1.3.5.9.

Meanwhile, the ProSe server 7 may transmit the response message including the identification information different from the previously transmitted identification information to the UE_A 8, may notify that the communication operator by which the UE is managed or the communication operator network to which the UE is connected is changed, and may request the "updating", "non-updating" and the "parallel" described in 1.3.5.1 to 1.3.5.9.

2. Second Embodiment

Hereinafter, a second embodiment will be described. The functional structures of the systems according to the second embodiment and the first embodiment are the same, and thus, a process flow different from that in the first embodiment will be mainly described.

In the first embodiment, it has been described that the ProSe server 7 transmits the response including the new ProSe application code and the timer corresponding to the ProSe application code in response to the discovery request or the match report from the terminal device.

In the second embodiment, a process in which the ProSe server 7 configures a new timer for the ProSe application code currently used by the terminal device for the terminal device will be described.

[2.1 Description of Process]

[2.1.1 Update Procedure of ProSe Application Code]

Figure 16:
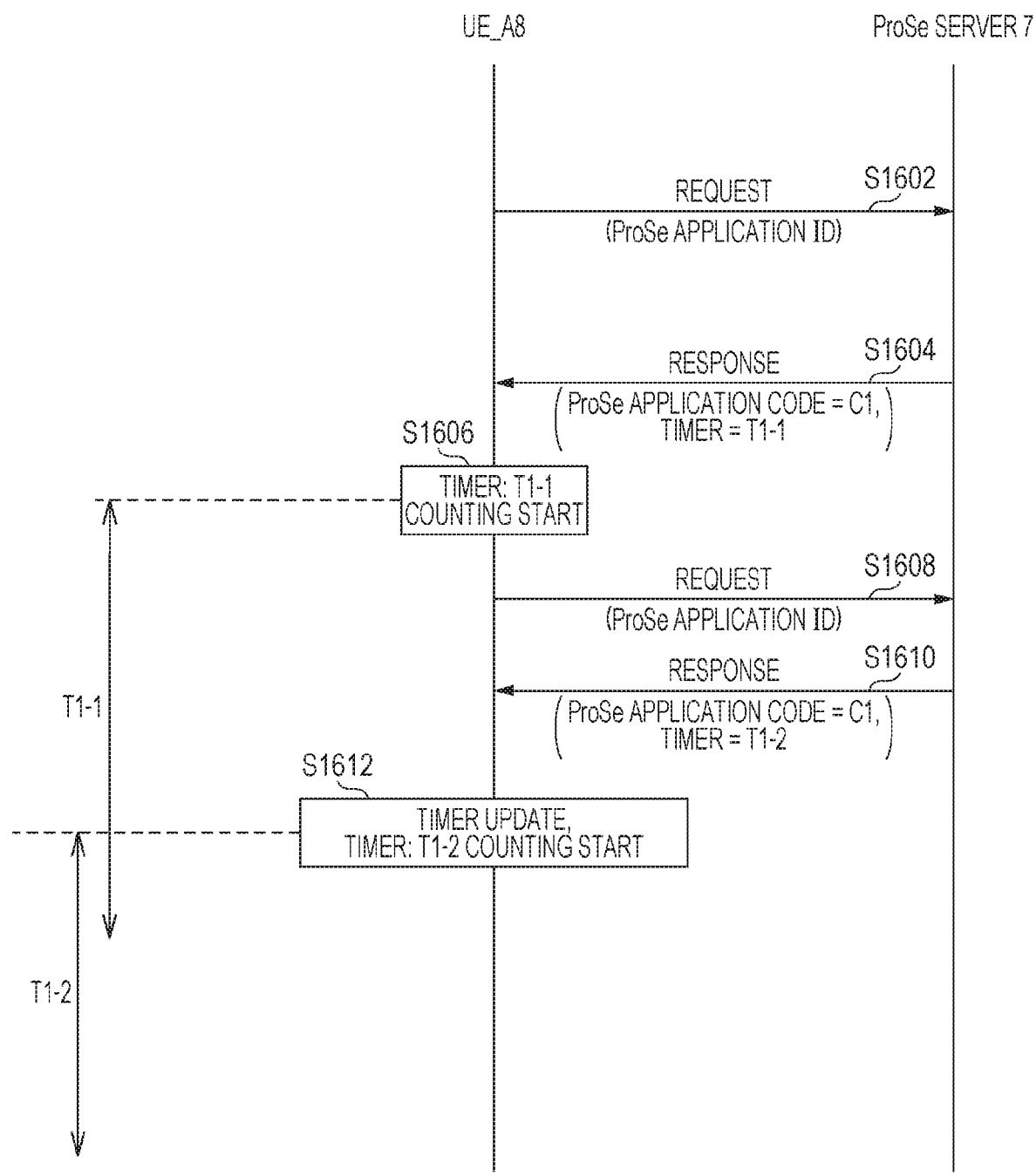
FIG. 16 is a diagram for describing a processing example according to a second embodiment.

Hereinafter, an update procedure of the ProSe application code using a request (a discovery request or a match report) will be described with reference to FIG. 16.

In the following description, a case where the UE_A 8 that starts to count the timer and performs the announcement or the monitoring transmits the request including the same ProSe application ID or ProSe application code to the ProSe server 7 again before the timer is expired by transmitting the request to the ProSe server 7 and receiving the response including the ProSe application, the mask value, the ProSe application code or the timer from the ProSe server 7, and thus, the UE_A 8 acquires the new timer associated with the same ProSe application code from the ProSe server 7 will be described.

A case where the UE_A 8 performs the update procedure of the ProSe application code will be described in the following description, the UE_B 9 may update the timer through the same procedure as that of the UE_A 8.

Initially, the UE_A 8 transmits the request (discovery request or match report) to the ProSe server 7 (S1602). The request may include the ProSe application ID, the mask value or the ProSe application code. The request may be a request including the same information element as that of the discovery request or the match report transmitted in S1002 of FIG. 10, S1102 of FIG. 11 or S1202 of FIG. 12.

Subsequently, the ProSe server 7 receives the request from the UE_A 8. Based on the request, the ProSe server 7 performs an authentication process for the request, and transmits the response to the request to the UE_A 8 (S1604).

The response may include the ProSe application code or the timer. The response may be a response including the same information element as that of the discovery response transmitted in S1010 of FIG. 10 or S1110 of FIG. 11 or the match report response transmitted in S1210 of FIG. 12. In the example of FIG. 13, the response includes "C1" as the ProSe application code or "T1-1" as the timer.

In the authentication process for the request, it is assumed that the ProSe server 7 performs a process such as an authentication request with the HSS 11 or a ProSe server of another PLMN, but such a process is described in the description of the announcement request procedure, the monitoring request procedure or the match reporting procedure, and thus, the description thereof will be omitted.

Subsequently, the UE_A 8 receives the response from the ProSe server 7. The UE_A 8 starts the announcement or monitoring process based on the response. In this case, the UE starts to count the timer T1-1 (S1606).

The UE_A 8 transmits the request to the ProSe server 7 before the counting of the timer T1-1 is expired (S1608). The request may include the ProSe application ID, the mask value or the ProSe application code. The request may be a request including the same information element as that of the discovery request or the match report transmitted in S1002 of FIG. 10, S1102 of FIG. 11 or S1202 of FIG. 12. The request may include an information element indicating the request related to the updating of the timer.

Subsequently, the ProSe server 7 receives the request from the UE_A 8. Based on the request, the ProSe server 7 performs the authentication process for the request, and transmits the response to the request to the UE_A 8 (S1610).

In the authentication process for the request, the ProSe server 7 may assign the new timer to the UE_A 8 without the changing the ProSe application code.

Here, the ProSe server 7 may assign, as a timer, a value different from the timer T1-1 to the ProSe application code: C1.

For example, the ProSe server may assign a value longer than T1-1. Accordingly, the ProSe server may request that the UE_A 8 extends the available time of the ProSe application code. Alternatively, the ProSe server may assign a remaining value of the timer T1-1 at the current point of time. In the example shown in FIG. 16, the ProSe server may assign T1-2 as a new timer.

Subsequently, the UE_A 8 receives the response from the ProSe server 7. The response includes at least a new timer: T1-2. The UE_A 8 updates the timer based on the response (S1612).

As described above, the UE_A 8 may perform only the updating of the timer in a case where the ProSe application code re-acquired from the ProSe server 7 has the same value as that of the ProSe application code before the re-reacquisition.

Although it has been described that the UE_A 8 performs the update procedure, the UE_B 9 may update the timer through the same procedure as that in the UE_A 8. Through the above-described procedure, the ProSe 7 may synchronize the timers of the plurality of UEs.

3. Modification Example

Although the embodiment of the present invention has been described with reference to the drawings, the specific structure is not limited to this embodiment, and designs within a scope without departing from the gist of the present invention are included in the present invention.

In each embodiment, the programs operated in each device are programs (programs causing a computer to function) that control a CPU such that the functions of the above-described embodiment are realized. The information items treated by these devices are temporally accumulated in a temporal storage device (for example, RAM) during the processing, are stored in storage devices such as various ROMs or HDDs, are read by the CPU if necessary, and are modified and rewritten.

Here, as a recording medium that stores the programs, any one of a semiconductor medium (for example, ROM or non-volatile memory card), an optical recording medium and magneto-optical medium (for example, digital versatile disc (DVD), magneto optical disc (MO), mini disc (MD), compact disc (CD), and BD), a magnetic recording medium (for example, magnetic tape and flexible disk) may be used. The functions of the above-described embodiment may be realized by executing the loaded program, or the functions of the present invention may be realized by processing the loaded program in cooperation with an operating system or another application program based on an instruction of the program.

In a case where the program is distributed to the market, the program may be distributed while being stored in a portable recording medium, and may be transmitted to a server computer connected via a network such as the Internet. In this case, a storage device of the server computer may also be included in the present invention.

Some or all of the devices of the above-described embodiment may be typically realized as large scale integration (LSI) which is integrated circuit. The functional blocks of the devices may be separately realized as chips, or some or all thereof may be integrated and realized as chips. The method of realizing the functional blocks as the integrated circuit is not limited to the LSI, and the functional blocks may be realized as a dedicated circuit or a general-purpose processor. In a case where a technology of realizing the functional blocks as the integrated circuit replaced as the LSI appears by the advance of a semiconductor technology, it may be possible to use an integrated circuit produced using this technology.

Although LTE and WLAN (for example, IEEE802.11a/b/n or the like) have been described as an example of a radio access network in the above-described embodiment, these devices and apparatuses may be connected by WiMAX instead of WLAN.

REFERENCE SIGNS LIST

1 Communication system
2 Core network
3 IP mobile communication network
5 PDN
7 ProSe server 7
8 UE_A
9 UE_B
11 HSS
13 PCRF
15 AAA
17 PGW
19 ePDG
21 SGW
23 MME
25 LTE_AN
27 WLAN_ANb
29 WLAN_ANa
31 eNB
33 WLAN_APb
35 WLAN APa
37 GW

The invention claimed is:

1. A User Equipment (UE) comprising:
reception circuitry configured for receiving a first ProSe application code and a first timer value as a value of a first timer; and
a controller configured for:
  starting a second timer;
  stopping the second timer based on a reception of the first timer value; and
  starting the first timer based on a reception of the first ProSe application code,
wherein
  the first timer value is associated with the first ProSe application code for a ProSe application ID, and indicates for how long the first ProSe application code is valid,
  a second timer value as a value of the second timer is associated with a second ProSe application code for the same ProSe application ID as the ProSe application ID, and indicates for how long the second ProSe application code is valid, and
  the first ProSe application code and the second ProSe application code are codes used by the UE to perform announcement to a proximity UE.

2. The UE according to claim 1,
wherein the controller starts announcement of the first ProSe application code to the proximity UE after the reception of the first ProSe application code and the first timer value.

3. The UE according to claim 2,
wherein the controller stops the announcement of the first ProSe application code in a case where the first timer is expired.

4. The UE according to claim 1, further comprising:
transmission circuitry configured for transmitting a first request message to a server device,
wherein the reception circuitry receives, as a response to the first request message, the second ProSe application code and the second timer value from the server device,
the transmission circuitry transmits, before the second timer expires, a second request message to the server device in order to receive the first ProSe application code from the server device,
the controller starts the second timer based on a reception of the second ProSe application code and the second timer value,
the first request message contains at least the ProSe application ID, identification information of the UE, and a command indicating announcement, and
the second request message contains at least the ProSe application ID, the identification information of the UE, and a command indicating announcement.

5. A User Equipment (UE) comprising:
reception circuitry configured for receiving a first discovery filter; and
a controller configured for:
  starting a second timer;
  stopping the second timer based on a reception of a first timer value as a value of a first timer; and
  starting the first timer based on a reception of the first discovery filter,
wherein
  the first timer value is associated with a first ProSe application code for a ProSe application ID, and indicates for how long the first ProSe application code is valid,
  the first discovery filter contains the first ProSe application code and the first timer value,
  a second timer value as a value of the second timer is associated with a second ProSe application code for the same ProSe application ID as the ProSe application ID, and indicates for how long the second ProSe application code is valid, and
  the first ProSe application code and the second ProSe application code are codes used by the UE to perform monitoring of a signal from a proximity UE.

6. The UE according to claim 5,
wherein the controller starts monitoring using the first discovery filter after the reception of the first discovery filter.

7. The UE according to claim 6,
wherein the controller stops the monitoring of the second ProSe application code in a case where the second timer is expired.

8. The UE according to claim 5, further comprising:
transmission circuitry configured for transmitting a first request message to a server device, wherein the reception circuitry receives, as a response to the first request message, the second ProSe application code and a second discovery filter containing the second timer value from the server device, the transmission circuitry transmits, before the second timer expires, a second request message to the server device in order to receive the first ProSe application code from the server device, the controller starts the second timer based on a reception of the second discovery filter, the first request message contains at least the ProSe application ID, identification information of the UE, and a command indicating monitoring, and the second request message contains at least the ProSe application ID, the identification information of the UE, and a command indicating monitoring.

9. A communication control method of a User Equipment (UE), the method comprising:
starting a second timer;
receiving a first ProSe application code and a first timer value as a value of a first timer;
stopping the second timer based on a reception of the first timer value; and
starting the first timer based on a reception of the first ProSe application code,
wherein
the first timer value is associated with the first ProSe application code for a ProSe application ID, and indicates for how long the first ProSe application code is valid,
a second timer value as a value of the second timer is associated with a second ProSe application code for the same ProSe application ID as the ProSe application ID, and indicates for how long the second ProSe application code is valid, and
the first ProSe application code and the second ProSe application code are codes used by the UE to perform announcement to a proximity UE.

10. The communication control method of the UE according to claim 9, further comprising:
starting announcement of the first ProSe application code to the proximity UE after the reception of the first ProSe application code and the first timer value.

11. The communication control method of the UE according to claim 10, further comprising:
stopping the announcement of the first ProSe application code in a case where the first timer is expired.

12. The communication control method of the UE according to claim 9, further comprising:
transmitting a first request message to a server device;
receiving, as a response to the first request message, the second ProSe application code and the second timer value from the server device;
transmitting, before the second timer expires, a second request message to the server device in order to receive the first ProSe application code from the server device; and
starting the second timer based on a reception of the second ProSe application code and the second timer value, wherein
the first request message contains at least the ProSe application ID, identification information of the UE, and a command indicating announcement, and
the second request message contains at least the ProSe application ID, the identification information of the UE, and a command indicating announcement.

13. A communication control method of a User Equipment (UE), the method comprising:
starting a second timer;
receiving a first discovery filter;
stopping the second timer based on a reception of a first timer value as a value of a first timer; and
starting the first timer based on a reception of the first discovery filter,
wherein
the first timer value is associated with a first ProSe application code for a ProSe application ID, and indicates for how long the first ProSe application code is valid,
the first discovery filter contains the first ProSe application code and the first timer value,
a second timer value as a value of the second timer is associated with a second ProSe application code for the same ProSe application ID as the ProSe application ID, and indicates for how long the second ProSe application code is valid, and
the first ProSe application code and the second ProSe application code are codes used by the UE to perform monitoring of a signal from a proximity UE.

14. The communication control method of the UE according to claim 13, further comprising:
starting monitoring using the first discovery filter after the reception of the first discovery filter.

15. The communication control method of the UE according to claim 14, further comprising:
stopping the monitoring of the second ProSe application code in a case where the second timer is expired.

16. The communication control method of the UE according to claim 13, further comprising:
transmitting a first request message to a server device;
receiving, as a response to the first request message, the second ProSe application code and a second discovery filter containing the second timer value from the server device;
transmitting, before the second timer expires, a second request message to the server device in order to receive the first ProSe application code from the server device; and
starting the second timer based on a reception of the second discovery filter,
wherein
the first request message contains at least the ProSe application ID, identification information of the UE, and a command indicating monitoring, and
the second request message contains at least the ProSe application ID, the identification information of the UE, and a command indicating monitoring.

* * * * *